US012070940B2

(12) United States Patent
Nakano et al.

(10) Patent No.: US 12,070,940 B2
(45) Date of Patent: Aug. 27, 2024

(54) PRINTHEAD CONTROL CIRCUIT AND LIQUID EJECTING APPARATUS

(71) Applicant: SEIKO EPSON CORPORATION, Tokyo (JP)

(72) Inventors: Shuichi Nakano, Shiojiri (JP); Motonori Chikamoto, Shiojiri (JP); Jun Sato, Shiojiri (JP); Toshihito Takagi, Chino (JP)

(73) Assignee: SEIKO EPSON CORPORATION (JP)

( * ) Notice: Subject to any disclaimer, the term of this patent is extended or adjusted under 35 U.S.C. 154(b) by 137 days.

(21) Appl. No.: 17/859,035

(22) Filed: Jul. 7, 2022

(65) Prior Publication Data

US 2023/0010396 A1 Jan. 12, 2023

(30) Foreign Application Priority Data

Jul. 8, 2021 (JP) ................................. 2021-113637
Dec. 29, 2021 (JP) ................................. 2021-215408

(51) Int. Cl.
*B41J 2/045* (2006.01)
*B41J 2/14* (2006.01)

(52) U.S. Cl.
CPC ....... *B41J 2/04541* (2013.01); *B41J 2/04581* (2013.01); *B41J 2/14201* (2013.01); *B41J 2002/14491* (2013.01)

(58) Field of Classification Search
CPC ................ B41J 2/04541; B41J 2/04581; B41J 2/14201; B41J 2002/14491; B41J 2/045;
(Continued)

(56) References Cited

U.S. PATENT DOCUMENTS

2019/0009531 A1 1/2019 Furukawa
2021/0094276 A1 4/2021 Takagi et al.

FOREIGN PATENT DOCUMENTS

JP H05212905 A * 8/1993
JP 2017-114020 A 6/2017

OTHER PUBLICATIONS

Murano, Shunji et al. (JP H05212905A), Image Forming Device, Aug. 2, 19934, [Abstract and Paragraph 0014] (Year: 1993).*

* cited by examiner

*Primary Examiner* — Lisa Solomon
(74) *Attorney, Agent, or Firm* — Harness, Dickey & Pierce, P.L.C.

(57) ABSTRACT

In a printhead control circuit causing a printhead to execute printing, the printhead performing abnormality detection in response to a first signal inputted to a second terminal in a state in which the potential of a first terminal is a first potential and a second signal inputted to the second terminal in a state in which the potential of the first terminal is a second potential, one of the first and second potentials is higher than the potentials of the first and second signals, and a signal circuit is configured to output the first and second signals. The signal circuit outputs the first signal to the second wire electrically coupled to the second terminal in a state in which the first wire is being supplied with a first voltage signal at the first potential and outputs the second signal to the second wire after outputting the first signal in a state in which the first wire is being supplied with a second voltage signal at the second potential, which is different from the first potential, to cause the printhead to execute the abnormality detection in response to the first signal, the second signal, the first voltage signal, and the second voltage signal.

20 Claims, 27 Drawing Sheets

(58) Field of Classification Search
CPC .... B41J 2/04555; B41J 2/0457; B41J 29/393; B41J 2/01
See application file for complete search history.

| [SIH, SIL] | | [1, 1] (LD) | [1, 0] (MD) | [0, 1] (SD) | [0, 0] (ND) |
|---|---|---|---|---|---|
| S1 | T1 | H | H | H | L |
| | T2 | H | L | L | L |
| S2 | T1 | L | L | L | H |
| | T2 | L | H | L | L |

PRINTHEAD CONTROL CIRCUIT AND LIQUID EJECTING APPARATUS

The present application is based on, and claims priority from JP Application Serial Number 2021-113637, filed Jul. 8, 2021 and JP Application Serial Number 2021-215408, filed Dec. 29, 2021, the disclosures of which are hereby incorporated by reference herein in their entirety.

BACKGROUND

1. Technical Field

The present disclosure relates to a printhead control circuit and a liquid ejecting apparatus.

2. Related Art

A liquid ejecting apparatus, such as an ink jet printer, drives a piezoelectric element provided for a printhead by using a drive signal and thereby ejects liquid, such as ink, charged in a cavity, through a nozzle, thus forming characters and images on a medium. In such a liquid ejecting apparatus, a malfunction of the printhead reduces the accuracy of ejecting liquid and degrades the quality of the characters and images formed on a medium.

As a technique to detect a malfunction of the printhead that will reduce the accuracy of ejection in such a manner, JP-A-2017-114020 discloses a technique with which the printhead itself determines the presence of an abnormality based on a control signal inputted to the printhead.

One of the factors that cause a malfunction in a printhead of the liquid ejecting apparatus is poor accuracy of signals supplied to the printhead. In the liquid ejecting apparatus, the printhead receives low-voltage signals to control the operation of the printhead as well as high-voltage signals to drive a drive element enough to eject liquid. In terms of reducing the likelihood of the printhead malfunctioning, the printhead needs to be normally supplied with both the high- and low-voltage signals. The disclosure according to JP-A-2017-114020 does not describe about any technique to detect whether both the high- and low-voltage signals supplied to the printhead are normal for the purpose of reducing the likelihood of the printhead malfunctioning. This leaves room for improvement in terms of reducing the likelihood of the printhead malfunctioning.

In a liquid ejecting apparatus, the liquid ejected from the nozzle to form an image on a medium may partially turn into mist before landing on the medium and float within the liquid ejecting apparatus as liquid mist particles. In addition, after the liquid ejected from the nozzle lands on the medium, the liquid on the medium may float again within the liquid ejecting apparatus as liquid mist particles due to air stream caused by transportation of media or the like. The liquid mist particles floating within the liquid ejecting apparatus are very small and are therefore charged due to the Lenard effect. The charged liquid mist particles are attracted to conductors including traces and terminals transmitting various signals. Since the printhead of the liquid ejecting apparatus ejects liquid toward a medium, a lot of liquid mist particles float especially around the printhead. Therefore, a lot of liquid mist particles adhere to cables and terminals that transmit various signals to the printhead, increasing the likelihood of a short circuit or any other failures occurring due to the liquid mist particles. In terms of reducing the likelihood of the printhead malfunctioning, there is a strong demand for controlling the printhead by accurately detecting whether both the high- and low-voltage signals supplied to the printhead are normal in the liquid ejecting apparatus that can be affected by the liquid mist particles.

SUMMARY

An aspect of the present disclosure is a printhead control circuit causing a printhead to execute printing, the printhead performing abnormality detection in response to a first signal inputted to a second terminal in a state in which a potential of a first terminal is a first potential and a second signal inputted to the second terminal in a state in which the potential of the first terminal is a second potential, the printhead control circuit including: a signal circuit configured to output the first and second signals; a first wire electrically coupled to the first terminal; and a second wire electrically coupled to the second terminal. Here, at least one of the first and second potentials is higher than potentials of the first and second signals, and the signal circuit outputs the first signal to the second wire in a state in which the first wire is being supplied with a first voltage signal at the first potential and outputs the second signal to the second wire after outputting the first signal in a state in which the first wire is being supplied with a second voltage signal at the second potential, which is different from the first potential, to cause the printhead to execute the abnormality detection in response to the first signal, the second signal, the first voltage signal, and the second voltage signal.

Another aspect of the present disclosure is a liquid ejecting apparatus, including: a printhead configured to perform printing; and a printhead control circuit configured to cause the printhead to execute printing. Here, the printhead performs abnormality detection in response to a first signal inputted to a second terminal in a state in which a potential of a first terminal is a first potential and a second signal inputted to the second terminal in a state in which the potential of the first terminal is a second potential. The printhead control circuit includes a signal circuit outputting the first and second signals, a first wire electrically coupled to the first terminal, and a second wire electrically coupled to the second terminal, at least one of the first and second potentials is higher than potentials of the first and second signals. The signal circuit outputs the first signal to the second wire in a state in which the first wire is being supplied with a first voltage signal at the first potential and outputs the second signal to the second wire after outputting the first signal in a state in which the first wire is being supplied with a second voltage signal at the second potential, which is different from the first potential, to cause the printhead to execute the abnormality detection in response to the first signal, the second signal, the first voltage signal, and the second voltage signal.

DESCRIPTION OF EXEMPLARY EMBODIMENTS

Hereinafter, preferred embodiments of the present disclosure are described using the drawings. The drawings are for convenience of explanation. The embodiments described below do not unreasonably limit the contents of the present disclosure described in the claims. All the configurations described below are unnecessarily essential constituent features of the present disclosure.

Hereinafter, a so-called ink jet printer that ejects ink as an example of liquid, toward a medium to form a desired image on the medium is described as an example of a liquid ejecting apparatus. However, the liquid ejecting apparatus is not limited to an ink jet printer and may be, for example, a color material ejecting apparatus used to manufacture color filters of liquid-crystal displays and the like, an electrode material ejecting apparatus used to form electrodes of organic EL displays, surface-emission displays, and the like, a bio-organic material ejecting apparatus used to manufacture biochips, or the like.

In the following, furthermore, the ink jet printer as the liquid ejecting apparatus of the embodiments is described as a so-called line-head ink jet printer in which printheads configured to eject ink are arranged so as to cover the width of a transported medium and the printheads eject ink in synchronization with transportation of the medium to form a desired image on the medium. The ink jet printer as the liquid ejecting apparatus may be a serial-head ink jet printer in which a printhead configured to eject ink is mounted on a carriage and reciprocating movement of the carriage in synchronization with transportation of the medium intersecting the transporting direction of the medium forms a desired image on the medium.

In the description of the embodiments, the logic level of a digital signal on the high potential side is referred to as high level or high while the logic level of a digital signal on the low potential side is referred to as low level or low.

1. First Embodiment

1. 1 Functional Configuration of Liquid Ejecting Apparatus

Figure 1A:
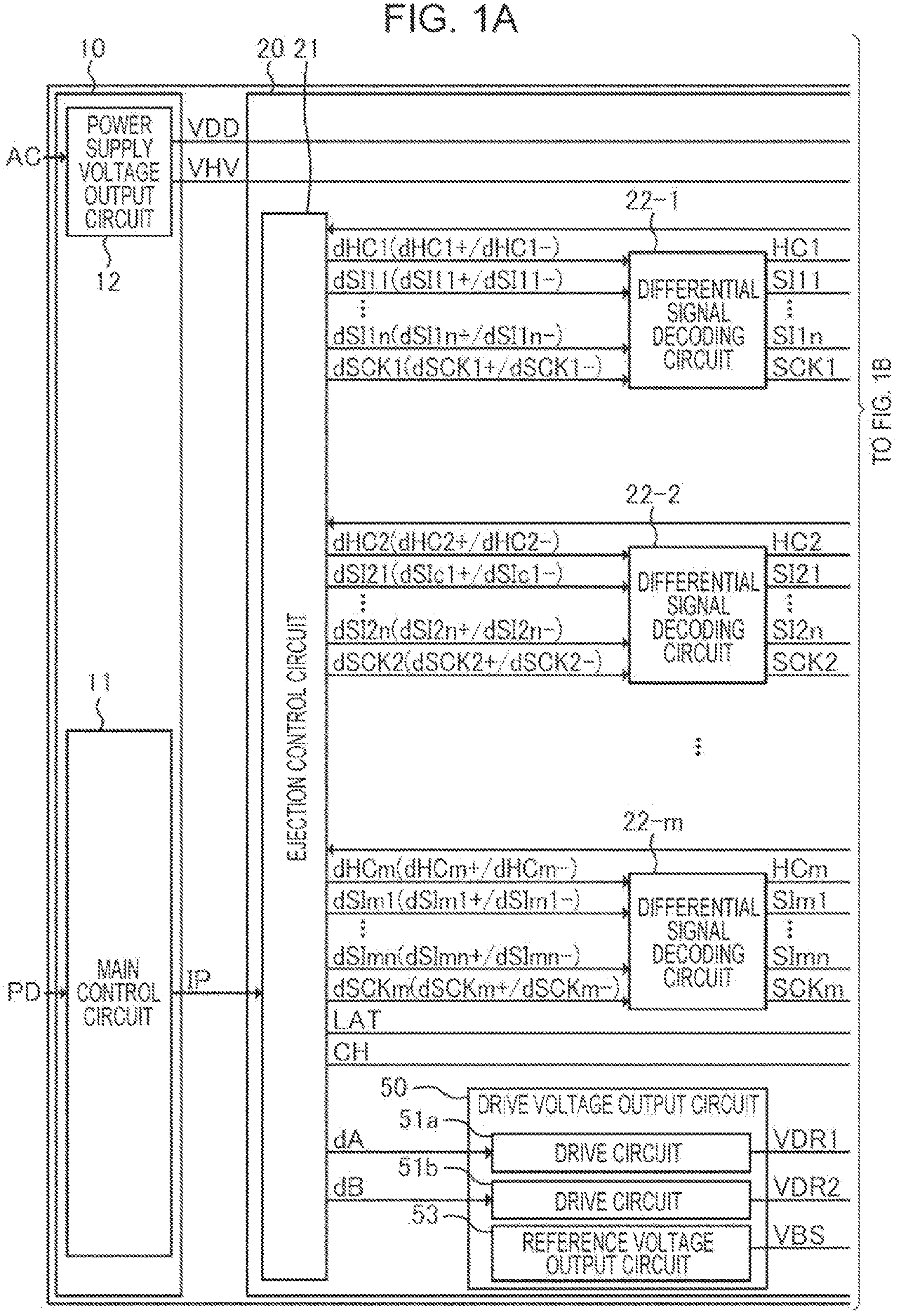
FIGS. 1A and 1B are diagrams illustrating a functional configuration of a liquid ejecting apparatus.
Figure 1B:
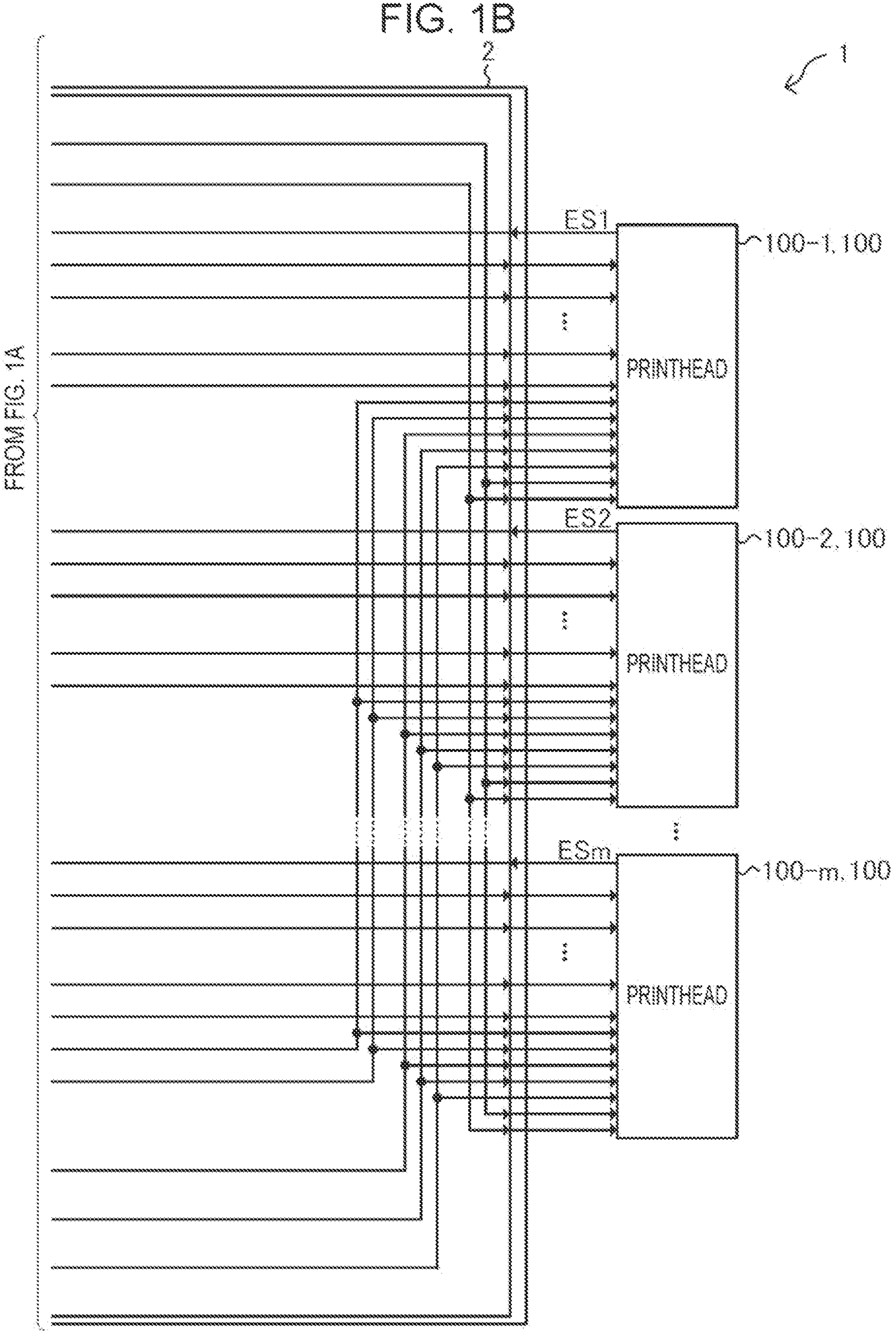

The functional configuration of a liquid ejecting apparatus 1 is described using FIGS. 1A and 1B. FIGS. 1A and 1B are diagrams illustrating the functional configuration of the liquid ejecting apparatus 1. As illustrated in FIGS. 1A and 1B, the liquid ejecting apparatus 1 includes a printhead drive circuit 2 and m printheads 100. The printhead drive circuit 2 includes a main control unit 10 receiving various signals from the outside of the liquid ejecting apparatus 1 and an ejection control unit 20 outputting various signals to the m printheads 100. The printhead drive circuit 2 drives the m printheads 100 based on the signals received from the outside of the liquid ejecting apparatus 1. When it is necessary to distinguish the m printheads 100 in the following description, the m printheads 100 are sometimes referred to as printheads 100-1 to 100-*m*. Herein, m corresponds to the number of printheads 100 included in the liquid ejecting apparatus 1, which is an integer not less than 1.

The main control unit 10 includes a main control circuit 11 and a power supply voltage output circuit 12.

The power supply voltage output circuit 12 receives alternating-current voltage AC as a commercial alternating-current voltage from a not-illustrated commercial alternating-current power supply provided outside of the liquid ejecting apparatus 1. The power supply voltage output circuit 12, based on the received alternating-current voltage AC, generates a voltage VHV which is a direct-current voltage having a voltage value of 42 V and a voltage VDD which is a direct-current voltage having a voltage value of 3.3 V. The power supply voltage output circuit 12 is an AC/DC converter configured to convert the alternating-current voltage AC to the voltage VHV as the direct-current voltage. The power supply voltage output circuit 12 includes, for example, an isolated flyback circuit and the like for generating the voltage VHV and a buck converter for stepping down the voltage VHV to generate the voltage VDD. The power supply voltage output circuit 12 supplies the generated voltages VHV and VDD to each section of the liquid ejecting apparatus 1, including the main control unit 10, ejection control unit 20, and m printheads 100.

The power supply voltage output circuit 12 may generate direct-current voltages having different voltage values in addition to the voltages VHV and VDD and supply the generated voltages to each section of the liquid ejecting apparatus 1, including the main control unit 10, ejection control unit 20, and m printheads 100. The main control unit 10, ejection control unit 20, and m printheads 100 operate using the voltages VHV and VDD as the power supply voltage or control voltage.

The main control circuit 11 receives from an external device such as a host computer provided outside of the liquid ejecting apparatus 1, image data PD including information of an image to be formed on a medium. The main control circuit 11 performs certain image processing for the received image data PD to generate an image information signal IP. The main control circuit 11 outputs the generated image information signal IP to the ejection control unit 20. The image information signal IP outputted from the main control circuit 11 may be, for example, an electric signal suitable for high-speed communications, such as a differential signal, or an optical signal for optical communications. The image processing executed by the main control circuit 11 includes, for example, color conversion processing that converts the received image signal to color information of red, green, and blue and then translates the color information to color information corresponding to colors of ink to be ejected from the liquid ejecting apparatus 1, halftone processing that binarizes the color information generated by the color conversion processing, and the like. The image processing executed by the main control circuit 11 is not limited to the aforementioned color conversion processing and halftone processing. The thus-configured main control circuit 11 may be composed of one or plural semiconductor devices including multiple functions, including, for example, a system-on-chip (SoC).

The ejection control unit 20 includes an ejection control circuit 21, differential signal decoding circuits 22-1 to 22-*m*, and a drive voltage output circuit 50.

The ejection control circuit 21 receives the image information signal IP outputted by the main control circuit 11. Based on the image information signal IP received from the main control circuit 11, the ejection control circuit 21 generates and outputs various signals to control operations of each section of the ejection control unit 20 and the m printheads 100.

Specifically, the ejection control circuit 21, based on the image information signal IP, generates differential signals dHC1 to dHCm, differential signals dSI11 to dSI1*n*, . . . , and dSIm1 to dSImn, and differential signals dSCK1 to dSCKm that correspond to control signals controlling ejection of ink from the m printheads 100. The ejection control circuit 21 outputs the generated differential signals dHC1 to dHCm, differential signals dSI11 to dSI1*n*, . . . , and dSIm1 to dSImn, and differential signals dSCK1 to dSCKm to the differential signal decoding circuits 22-1 to 22-*m*, respectively.

The differential signal decoding circuits 22-1 to 22-*m* decode the inputted differential signals dHC1 to dHCm, differential signals dSI11 to dSI1*n*, . . . , and dSIm1 to dSImn, and differential signals dSCK1 to dSCKm to generate single-ended diagnosis control signals HC1 to HCm, print data signals SI11 to SI1*n*, . . . , and SIm1 to SImn, and clock signals SCK1 to SCKm, respectively. The differential signal decoding circuits 22-1 to 22-*m* output the generated diagnosis control signals HC1 to HCm, print data signals SI11 to SI1*n*, . . . , and SIm1 to SImn, and clock signals SCK1 to SCKm to the m printheads 100, respectively.

To be specific, the ejection control circuit 21 generates, based on the image information signal IP, the differential signal dHC1 including a pair of signals dHC1+ and dHC1−, the differential signals dSI1 to dSIln including pairs of dSI11+ to dSI1*n*+ and dSI11− to dSIln−, and the differential signal dSCK1 including a pair of signals dSCK1+ and dSCK1− and outputs the generated differential signals to the differential signal decoding circuit 22-1. The differential signal decoding circuit 22-1 decodes the differential signal dHC1 to generate the diagnosis control signal HC1 as a single-ended signal, decodes the dSCK1 to generate the clock signal SCK1 as a single-ended signal, and decodes the differential signals dSI11 to dSI1*n* to generate the print data signals SI11 to SI1*n* as single-ended signals. The differential signal decoding circuit 22-1 outputs the generated diagnosis control signal HC1, clock signal SCK1, and print data signals SI11 to SI1*n* to the printhead 100-1.

The ejection control circuit 21 generates, based on the image information signal IP, the differential signal dHCm including a pair of signals dHCm+ and dHCm−, the differential signals dSIm1 to dSImn including pairs of dSIm1+ to dSImn+ and dSIm1− to dSImn−, and the differential signal dSCKm including a pair of signals dSCKm+ and dSCKm− and outputs the generated differential signals to the differential signal decoding circuit 22-*m*. The differential signal decoding circuit 22-*m* decodes the differential signal dHCm to generate the diagnosis control signal HCm as a single-ended signal, decodes the dSCKm to generate the clock signal SCKm as a single-ended signal, and decodes the differential signals dSIm1 to dSImn to generate the print data signals SIm1 to SImn as single-ended signals. The differential signal decoding circuit 22-*m* outputs the generated diagnosis control signal HCm, clock signal SCKm, and print data signals SIm1 to SImn to the printhead 100-*m*.

The ejection control circuit 21 generates, based on the image information signal IP, the differential signal dHCi (i is an integer from 1 to m) including a pair of signals dHCi+ and dHCi−, the differential signals dSIi1 to dSIin including pairs of dSIi1+ to dSIin+ and dSIi1− to dSIin−, and the differential signal dSCKi including a pair of signals dSCKi+ and dSCKi− and outputs the generated differential signals to the differential signal decoding circuit 22-*i*. The differential signal decoding circuit 22-*i* decodes the differential signal dHCi to generate the diagnosis control signal HCi as a single-ended signal, decodes the dSCKi to generate the clock signal SCKi as a single-ended signal, and decodes the differential signals dSIi1 to dSIin to generate the print data signals SIi1 to SIin as single-ended signals. The differential signal decoding circuit 22-*i* outputs the generated diagnosis control signal HCi, clock signal SCKi, and print data signals SIi1 to SIin to the printhead 100-*i*.

The differential signals dHC1 to dHCm, differential signals dSI11 to dSI1*n*, . . . , and dSIm1 to dSImn, and differential signals dSCK1 to dSCKm that are outputted from the ejection control circuit 21 are differential signals compliant with high-speed signaling standards and may be, for example, differential signals compliant with low voltage differential signaling (LVDS), low voltage positive emitter coupled logic (LVPECL), current mode logic (CML), or the like. In the example illustrated in FIGS. 1A and 1B, the differential signal decoding circuits 22-1 to 22-*m* correspond one-to-one to the m printheads 100. However, the liquid ejecting apparatus 1 is not limited to the configuration in which the differential signal decoding circuits 22-1 to 22-*m* correspond one-to-one to the m printheads 100. For example, one differential signal decoding circuit 22-*i* may decode differential signals corresponding to some of the printheads 100 and output the decoded single-ended signals to the corresponding printheads 100.

Herein, n corresponds to the number of head chips 300 included in each of the printheads 100-1 to 100-*m*, which is an integer not less than 1. The print data signal Slij (j is an integer from 1 to n) among the aforementioned print data signals SI11 to SI1*n*, . . . , and SIm1 to SImn corresponds to the print data signal SI inputted to the head chip 300-*j* included in the printhead 100-*i*, and differential signal dSIij corresponds to the print data signal SIij.

The ejection control circuit 21 generates, based on the image information signal IP received from the main control circuit 11, a latch signal LAT and a change signal CH as control signals to control the timing to eject ink from the m printheads 100 and outputs the generated latch signal LAT and change signal CH to the m printheads 100.

The ejection control circuit 21 further generates, based on the image information signal IP received from the main control circuit 11, base-drive signals dA and dB as the basis of drive voltage signals VDR1 and VDR2 for driving the printheads 100 and outputs the generated base-drive signals dA and dB to the drive voltage output circuit 50.

The drive voltage output circuit 50 includes drive circuits 51*a* and 51*b* and a reference voltage output circuit 53. The drive voltage output circuit 50 generates the drive voltage signals VDR1 and VDR2 based on the base-drive signals dA and dB and outputs the generated drive voltage signals VDR1 and VDR2 to the corresponding m printheads 100.

To be specific, the base-drive signal dA is inputted to the drive circuit 51*a*. The drive circuit 51*a* converts the inputted base-drive signal dA to an analog signal and then class-D amplifies the resultant analog signal based on the voltage VHV to generate the drive voltage signal VDR1. The drive circuit 51*a* outputs the generated drive voltage signal VDR1 to the m printheads 100. The base-drive signal dB is inputted to the drive circuit 51*b*. The drive circuit 51*b* converts the inputted base-drive signal dB to an analog signal and then class-D amplifies the resultant analog signal based on the voltage VHV to generate the drive voltage signal VDR2. The drive circuit 51*b* outputs the generated drive voltage signal VDR2 to the m printheads 100. Specific configuration examples and operations of the drive circuits 51*a* and 51*b* are described later.

In the example illustrated in FIG. 1A, the drive voltage output circuit 50 includes the single drive circuit 51*a* outputting the drive voltage signal VDR1 and the single drive circuit 51*b* outputting the drive voltage signal VDR2. The drive voltage output circuit 50 may include plural drive circuits 51*a* each outputting the drive voltage signal VDR1 and plural drive circuits 51*b* each outputting the drive voltage signal VDR2. In this case, each of the plural drive circuits 51*a* may generate the drive voltage signal VDR1 and output the generated drive voltage signal VDR1 to the corresponding printhead 100, and each of the plural drive circuits 51*b* may generate the drive voltage signal VDR2 and output the generated drive voltage signal VDR2 to the corresponding printhead 100.

When the drive voltage output circuit 50 includes two drive circuits 51*a* each outputting the drive voltage signal VDR1 and two drive circuits 51*b* each outputting the drive voltage signal VDR2, for example, one of the two drive circuits 51*a* each generating the drive voltage signal VDR1 outputs the drive voltage signal VDR1 to the printheads 100-1 to 100-*i* while the other one of the two drive circuits 51*a* each generating the drive voltage signal VDR1 outputs the drive voltage signal VDR1 to the printheads 100-*i*+1 to 100-*m*. In a similar manner, one of the two drive circuits 51*b* each generating the drive voltage signal VDR2 outputs the drive voltage signal VDR2 to the printheads 100-1 to 100-*i* while the other one of the two drive circuits 51*b* each generating the drive voltage signal VDR2 outputs the drive voltage signal VDR2 to the printheads 100-*i*+1 to 100-*m*.

The reference voltage output circuit 53 is supplied with the voltage VDD. The reference voltage output circuit 53 steps up or down the supplied voltage VDD to generate a reference voltage signal VBS that serves as the reference potential at ejection of ink from the individual m printheads 100. The reference voltage output circuit 53 then outputs the generated reference voltage signal VBS to the m printheads 100.

As described above, the printhead drive circuit 2 generates the voltages VHV and VDD, diagnosis control signals HC1 to HCm, print data signals SI11 to SI1*n*, . . . , and SIm1 to SImn, clock signals SCK1 to SCKm, latch signal LAT, change signal CH, drive voltage signals VDR1 and VDR2, and reference voltage signal VBS based on the alternating-current voltage AC supplied from the commercial alternating-current power supply and the image data PD supplied from the external device. The printhead drive circuit 2 outputs the generated voltages and signals to the m printheads 100.

Using the voltages VHV and VDD as the power supply voltage, the m printheads 100 switch whether or not to supply the drive voltage signals VDR1 and VDR2 to later-described piezo elements 60 at the timing specified by the control signals HC1 to HCm, print data signals SI11 to SI1*n*, . . . , and SIm1 to SImn, clock signals SCK1 to SCKm, latch signal LAT, and change signal CH. Each of the m printheads 100 thereby ejects a given amount of ink at a given timing. In other words, the m printheads 100 are individually controlled by the printhead drive circuit 2.

The printheads 100-1 to 100-*m* generate judgment result signals ES1 to ESm respectively indicating whether there is an abnormality in the printheads 100-1 to 100-*m* and output the generated judgment result signals ES1 to ESm to the ejection control circuit 21 included in the ejection control unit 20 of the printhead drive circuit 2. The ejection control circuit 21 is thereby able to drive or stop the printheads 100-1 to 100-*m* depending on the status of the printheads 100-1 to 100-*m*. A specific configuration example and operations of the m printheads 100 are described later.

1. 2 Configuration and Operation of Drive Circuit

Next, the configuration and operation of the drive circuits 51*a* and 51*b* included in the drive voltage output circuit 50 are described. The drive circuits 51*a* and 51*b* are different only in inputted and outputted signals and are the same in terms of the configuration and operation. In the following, the configuration and operation of the drive circuit 51*a* outputting the drive voltage signal VDR1 based on the base-drive signal dA are described, and the configuration and operation of the drive circuit 51*b* outputting the drive voltage signal VDR2 based on the base-drive signal dB are not described.

Figure 2:
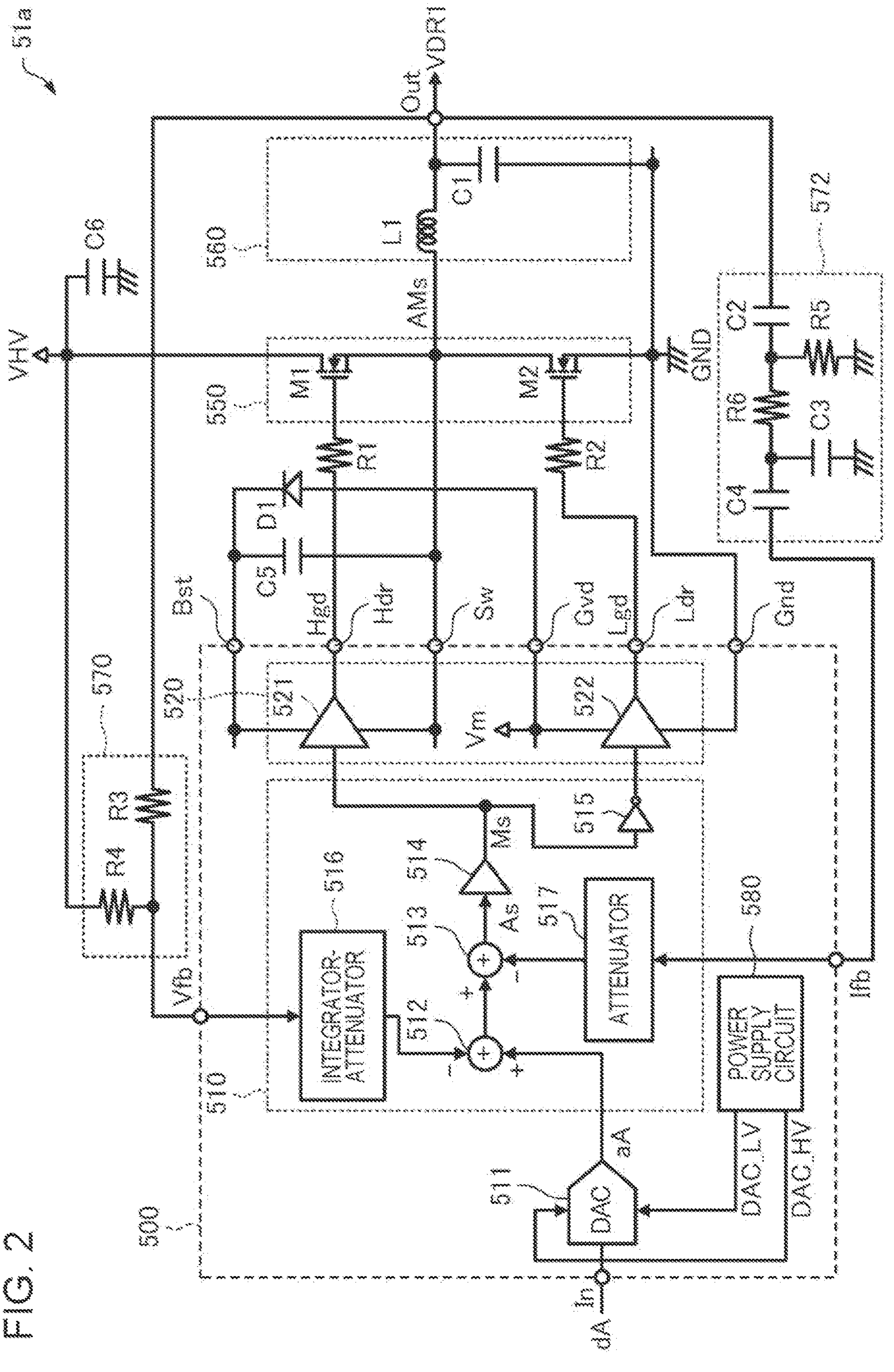
FIG. 2 is a diagram illustrating a functional configuration of a drive circuit.

FIG. 2 is a diagram illustrating the functional configuration of the drive circuit 51*a*. As illustrated in FIG. 2, the drive circuit 51*a* includes an integrated circuit 500 including a modulation circuit 510, an amplification circuit 550, a smoothing circuit 560, feedback circuits 570 and 572, and other plural circuit devices.

The integrated circuit 500 is electrically coupled to the outside of the integrated circuit 500 through plural terminals including a terminal In, a terminal Bst, a terminal Hdr, a terminal Sw, a terminal Gvd, a terminal Ldr, a terminal Gnd, a terminal Ifb, and a terminal Vfb. The integrated circuit 500 generates, based on the base-drive signal dA inputted through the terminal In, a gate signal Hgd driving a transistor M1 included in the amplification circuit 550 and a gate signal Lgd driving a transistor M2 included in the amplification circuit 550 and outputs the generated gate signals Hgd and Lgd.

The integrated circuit 500 includes a digital-to-analog converter (DAC) 511, the modulation circuit 510, a gate drive circuit 520, and a power supply circuit 580.

The power supply circuit 580 generates voltage signals DAC_HV and DAC_LV and outputs the generated voltage signals DAC_HV and DAC_LV to the DAC 511.

The DAC 511 receives the digital base-drive signal dA. The DAC 511 converts the base-drive signal dA to an analog signal with a voltage value between the voltage signals DAC_HV and DAC_LV and outputs the resultant analog signal to the modulation circuit 510 as a base-drive signal aA. Herein, the maximum value of the voltage amplitude of the base-drive signal aA is specified by the voltage signal DAC_HV while the minimum value of the voltage amplitude of the base-drive signal aA is specified by the voltage signal DAC_LV. This means that the voltage signal DAC_HV is the reference voltage on the high-voltage side in the DAC 511 while the voltage signal DAC_LV is the reference voltage on the low-voltage side in the DAC 511. The base-drive signal aA is amplified with the voltage VHV into the drive voltage signal VDR1. This means that the base-drive signal aA corresponds to a signal of a pre-amplification target waveform of the drive voltage signal VDR1, and the base-drive signal dA corresponds to a digital signal defining the waveform of the drive voltage signal VDR1. The voltage amplitude of the base-drive signal aA in the first embodiment is, for example, 1 to 2 V.

The modulation circuit 510 receives the base-drive signal aA. The modulation circuit 510 modulates the received base-drive signal aA to generate a modulated signal Ms and outputs the modulated signal Ms to the gate drive circuit 520. The modulation circuit 510 includes adders 512 and 513, a comparator 514, an inverter 515, an integrator-attenuator 516, and an attenuator 517.

The integrator-attenuator 516 receives a voltage at a terminal Out, that is the drive voltage signal VDR1, through the terminal Vfb. The integrator-attenuator 516 attenuates and integrates the drive voltage signal VDR1 and supplies the resultant signal to the negative input terminal of the adder 512. The positive input terminal of the adder 512 receives the base-drive signal aA. The adder 512 subtracts the voltage inputted to the negative input terminal from the voltage inputted to the positive input terminal and integrates the resultant voltage. The adder 512 supplies the integrated voltage to the positive input terminal of the adder 513.

Herein, while the voltage amplitude of the base-drive signal aA is about 1 to 2 V as described above, the maximum value of the voltage of the drive voltage signal VDR1, which depends on the voltage value of the voltage VHV, sometimes exceeds 40 V. The integrator-attenuator 516 therefore attenuates the voltage of the drive voltage signal VDR1 inputted through the terminal Vfb so that the amplitude ranges of the both voltages match each other for calculation of the deviation therebetween.

The attenuator 517 receives through the terminal Ifb, the voltage of the drive voltage signal VDR1 with the high-frequency components attenuated. The attenuator 517 supplies the voltage of the drive voltage signal VDR1 with the high-frequency components attenuated, to the negative input terminal of the adder 513. The positive input terminal of the adder 513 receives the voltage outputted from the adder 512. The adder 513 subtracts the voltage supplied to the negative input terminal from the voltage received through to the positive input terminal and outputs the resultant voltage to the comparator 514 as a voltage signal As.

The voltage signal As outputted from the adder 513 is a voltage obtained by subtracting the voltage of the signal supplied to the terminal Vfb from the voltage of the base-drive signal aA and further subtracting the voltage of the signal supplied to the terminal Ifb. In other words, the voltage signal As outputted from the adder 513 is a signal obtained by correcting the deviation of the attenuated voltage of the drive voltage signal VDR1 from the voltage of the base-drive signal aA as the target, with the high-frequency components of the drive-voltage signal VDR1.

The comparator 514 outputs the modulated signal Ms that is pulse-modulated based on the voltage signal As outputted from the adder 513. Specifically, the comparator 514 generates the modulated signal Ms that is high level when the voltage of the voltage signal As increases to a predetermined threshold or higher and is low level when the voltage of the voltage signal As falls below a predetermined threshold. The modulated signal Ms varies in frequency and duty ratio depending on the base-drive signals dA and aA. The frequency and duty ratio of the modulated signal Ms can be adjusted by the attenuator 517 adjusting the modulation gain that is equivalent to the sensitivity.

The modulated signal Ms is inputted to the gate drive circuit 520. The gate drive circuit 520 includes gate drivers 521 and 522. Specifically, the modulated signal Ms outputted from the comparator 514 is supplied to the gate driver 521. The modulated signal Ms is also supplied to the gate driver 522 after the logic level thereof is inverted by the inverter 515. This means that the gate drivers 521 and 522 receive the modulated signals Ms with the logic levels being exclusive to each other.

Herein, the exclusive logic level relationship between the signals supplied to the gate drivers 521 and 522, to be strict, includes a situation where the logic levels of the signals supplied to the gate driver 521 and 522 are simultaneously high level. This means that the transistors M1 and M2 included in the later-described amplification circuit 550 are not simultaneously on.

The gate driver 521 shifts the level of the inputted modulated signal Ms and outputs the resultant signal as the gate signal Hgd through the terminal Hdr. The gate driver 521 is supplied with a voltage through the terminal Bst as the high potential-side power supply voltage and is supplied with a voltage through the terminal Sw as the low potential-side power supply voltage. The terminal Bst is coupled to one end of a capacitor C5 and a cathode of a diode D1. The terminal Sw is coupled to the other end of the capacitor C5. The anode of the diode D1 is coupled to the terminal Gvd. The anode of the diode D1 is thereby supplied with a voltage Vm. Thus the capacitor C5 and diode D1 constitutes a bootstrap circuit. The potential difference between the terminals Bst and Sw is substantially equal to the potential difference across the capacitor C5, or the voltage Vm. The gate driver 521 generates the gate signal Hgd that follows the inputted modulated signal Ms and has a voltage which is the voltage Vm higher than that of the terminal Sw and outputs the gate signal Hgd from the integrated circuit 500 through the terminal Hdr.

The gate driver 522 shifts the level of the inputted modulated signal Ms with the logic level inverted and outputs the resultant signal through the terminal Ldr as the gate signal Lgd. The gate driver 522 operates at lower potentials than the gate driver 521. The gate driver 522 is supplied with the voltage Vm as the high potential-side power supply voltage and is supplied with the ground potential through the terminal Gnd as the low potential-side power supply voltage. The gate driver 522 generates the gate signal Lgd that follows the inputted modulated signal Ms with the logic level inverted and has a voltage which is the voltage Vm higher than that of the terminal Gnd. The gate driver 522 outputs the generated gate signal Lgd from the integrated circuit 500 through the terminal Ldr.

The gate signals Hgd and Lgd outputted from the integrated circuit 500 are inputted to the amplification circuit 550. The amplification circuit 550 includes the transistors M1 and M2. The drain of the transistor M1 is supplied with the voltage VHV. The gate of the transistor M1 is electrically coupled to one end of a resistor R1, and the other end of the resistor R1 is electrically coupled to the terminal Hdr of the integrated circuit 500. The gate of the transistor M1 is supplied with the gate signal Hgd outputted through the terminal Hdr of the integrated circuit 500. The source of the transistor M1 is electrically coupled to the terminal Sw of the integrated circuit 500.

The drain of the transistor M2 is electrically coupled to the terminal Sw of the integrated circuit 500. The drain of the transistor M2 and the source of the transistor M1 are therefore electrically coupled. The gate of the transistor M2 is electrically coupled to one end of a resistor R2, and the other end of the resistor R2 is electrically coupled to the terminal Ldr of the integrated circuit 500. The gate of the transistor M2 is therefore supplied with the gate signal Lgd outputted through the terminal Ldr of the integrated circuit 500. The source of the transistor M2 is supplied with the ground potential.

In the following description, controlling the transistors M1 and M2 to the conducting state between the drain and source is sometimes referred to as controlling the transistors M1 and M2 on. Controlling the transistors M1 and M2 to the non-conducting state between the drain and source is sometimes referred to as controlling the transistors M1 and M2 off.

In the thus-configured amplification circuit 550, when the transistor M1 is controlled off while the transistor M2 is controlled on, the potential at the node coupled to the terminal Sw is the ground potential. The terminal Bst is therefore supplied with the voltage Vm. When the transistor M1 is controlled on while the transistor M2 is controlled off, the potential at the node coupled to the terminal Sw is the voltage VHV. The terminal Bst is therefore supplied with a voltage signal at a potential of the voltage VHV+Vm. The gate driver 521 configured to drive the transistor M1 generates, using the capacitor C5 as a floating power supply, the gate signal Hgd with the low level being the potential of the voltage VHV or 0 V and the high level being the potential of the voltage VHV+Vm, depending on the potential of the terminal Sw that changes to 0 V or the voltage VHV in response to the operations of the transistors M1 and M2. The gate driver 521 supplies the generated gate signal Hgd to the gate of the transistor M1 through the terminal Hdr.

On the other hand, the gate driver 522 configured to drive the transistor M2 supplies to the gate of the transistor M2, the gate signal Lgd with the low level being the ground potential and the high level being the potential of the voltage Vm independently of the operations of the transistors M1 and M2.

By the operation of the transistors M1 and M2 based on the modulated signal Ms obtained by modulating the base-drive signals dA and aA, the amplification circuit 550 configured as described above amplifies the modulated signal Ms based on the voltage VHV to generate an amplified modulated signal AMs at the junction coupled in common to the source of the transistor M1 and the drain of the transistor M2. The amplification circuit 550 then outputs the generated amplified modulated signal AMs to the smoothing circuit 560. The amplified modulated signal AMs is a signal having a voltage value varying in a range from the voltage VHV to the ground potential depending on the logic level of the modulated signal Ms.

To the path for supplying the voltage VHV to the amplification circuit 550, a capacitor C6 is electrically coupled. Specifically, one end of the capacitor C6 is supplied with the voltage VHV while the other end is supplied with the ground potential. The capacitor C6 reduces potential fluctuations of the voltage VHV that can be caused by switching operation of the transistors M1 and M2 included in the amplification circuit 550. The capacitor C6 preferably has a large capacitance and, for example, is an electrolytic capacitor.

The smoothing circuit 560 smooths the amplified modulated signal AMs received from the amplification circuit 550 to generate the drive voltage signal VDR1 and outputs the generated drive voltage signal VDR1 from the drive circuit 51*a* through the terminal Out.

Specifically, the smoothing circuit 560 includes a coil L1 and a capacitor C1. One end of the coil L1 receives the amplified modulated signal AMs outputted from the amplification circuit 550, and the other end thereof is coupled to the terminal Out as the output of the drive circuit 51*a*. The other end of the coil L1 is also coupled to one end of the capacitor C1. The other end of the capacitor C1 is supplied with the ground potential. The coil L1 and capacitor C1 thus constitute a low pass filter. By using the low pass filter to smooth the amplified modulated signal AMs outputted from the amplification circuit 550, the smoothing circuit 560 demodulates the amplified modulated signal AMs and outputs the resultant signal as the drive voltage signal VDR1.

The feedback circuit 570 includes resistors R3 and R4. One end of the resistor R3 is coupled to the terminal Out through which the drive voltage signal VDR1 is outputted, and the other end of the resistor R3 is coupled to the terminal Vfb and one end of the resistor R4. The other end of the resistor R4 is supplied with the voltage VHV. The drive voltage signal VDR1 traveling from the terminal Out through the feedback circuit 570 is pulled up and is fed back to the terminal Vfb.

The feedback circuit 572 includes capacitors C2, C3, and C4 and resistors R5 and R6. One end of the capacitor C2 is coupled to the terminal Out through which the drive voltage signal VDR1 is outputted, and the other end of the capacitor C2 is coupled to one end of the resistor R5 and one end of the resistor R6. The other end of the resistor R5 is supplied with the ground potential. The capacitor C2 and resistor R5 thus serve as a high pass filter. Herein, the cutoff frequency of the high pass filter is set to, for example, about 9 MHz. The other end of the resistor R6 is coupled to one end of the capacitor C4 and one end of the capacitor C3. The other end of the capacitor C3 is supplied with the ground potential. The resistor R6 and capacitor C3 thus serve as a low pass filter. The cutoff frequency of the low pass filter is set to, for example, about 160 MHz.

The thus-configured feedback circuit 572 includes the high and low pass filters and thereby serves as a band pass filter allowing passage of a predetermined range of frequencies of the drive voltage signal VDR1. The other end of the capacitor C4 is coupled to the terminal Ifb of the integrated circuit 500. The terminal Ifb thereby receives a feedback signal obtained by removing the direct component from the high-frequency components of the drive voltage signal VDR1 having passed through the feedback circuit 572, which serves as the band pass filter allowing passage of predetermined frequency components.

The drive voltage signal VDR1 outputted from the terminal Out is a signal obtained by smoothing the amplified modulated signal AMs based on the base-drive signal dA with the smoothing circuit 560. The drive voltage signal VDR1 is fed back to the adder 512 through the terminal Vfb after integrated and attenuated. The drive circuit 51*a* self-oscillates with a frequency determined by the feedback delay and the feedback transfer function. However, the signal delay is large along the feedback path passing through the terminal Vfb, and the frequency of self-oscillation cannot be increased high enough to ensure high accuracy of the drive voltage signal VDR1 with the feedback through the terminal Vfb only. The drive circuit 51*a* is therefore provided with the path to feed back the high-frequency components of the drive voltage signal VDR1 through the terminal Ifb, separately from the path passing through the terminal Vfb, thus reducing the delay as the entire circuit. This can increase the frequency of the voltage signal As high enough to ensure high accuracy of the drive voltage signal VDR1, compared to that without the feedback path passing through the terminal Ifb.

The thus-configured drive circuit 51*a* amplifies the modulated signal Ms based on the base-drive signal dA with the voltage VHV to generate the amplified modulated signal AMs and smooths the amplified modulated signal AMs to generate the drive voltage signal VDR1. In other words, as the drive voltage signal VDR1, the drive circuit 51*a* is able to output based on the base-drive signals dA and aA, a signal of any waveform that includes direct-current voltage and has voltage values in a range from 0 V as the ground potential to the voltage VHV. In a similar manner, the drive circuit 51*b* of the first embodiment amplifies the modulated signal Ms based on the base-drive signal dB with the voltage VHV to generate the amplified modulated signal AMs and smooths the amplified modulated signal AMs to generate the drive voltage signal VDR2. In other words, as the drive voltage signal VDR2, the drive circuit 51*b* is able to output based on the base-drive signal dB, a signal of any waveform that includes direct-current voltage and has voltage values in a range from 0 V as the ground potential to the voltage VHV.

1. 3 Configuration and Operation of Printhead

Next, the configuration and operation of the printheads 100 are described. The m printheads 100 included in the liquid ejecting apparatus 1 are different only in inputted signals and are the same in the configuration and operation. In the following, the configuration and operation of one of the printheads 100 are described, and the configuration and operation of the other printheads 100 are not described. The following description assumes that the printhead 100 receives the voltages VHV and VDD, the diagnosis control signal HC as the diagnosis control signals HC1 to HCm, the print data signals SI1 to SIn as the print data signals SI11 to SI1*n*, . . . , and SIm1 to SImn, the clock signal SCK as the clock signals SCK1 to SCKm, the latch signal LAT, the change signal CH, the drive voltage signals VDR1 and VDR2, and the reference voltage signal VBS.

Figure 3:
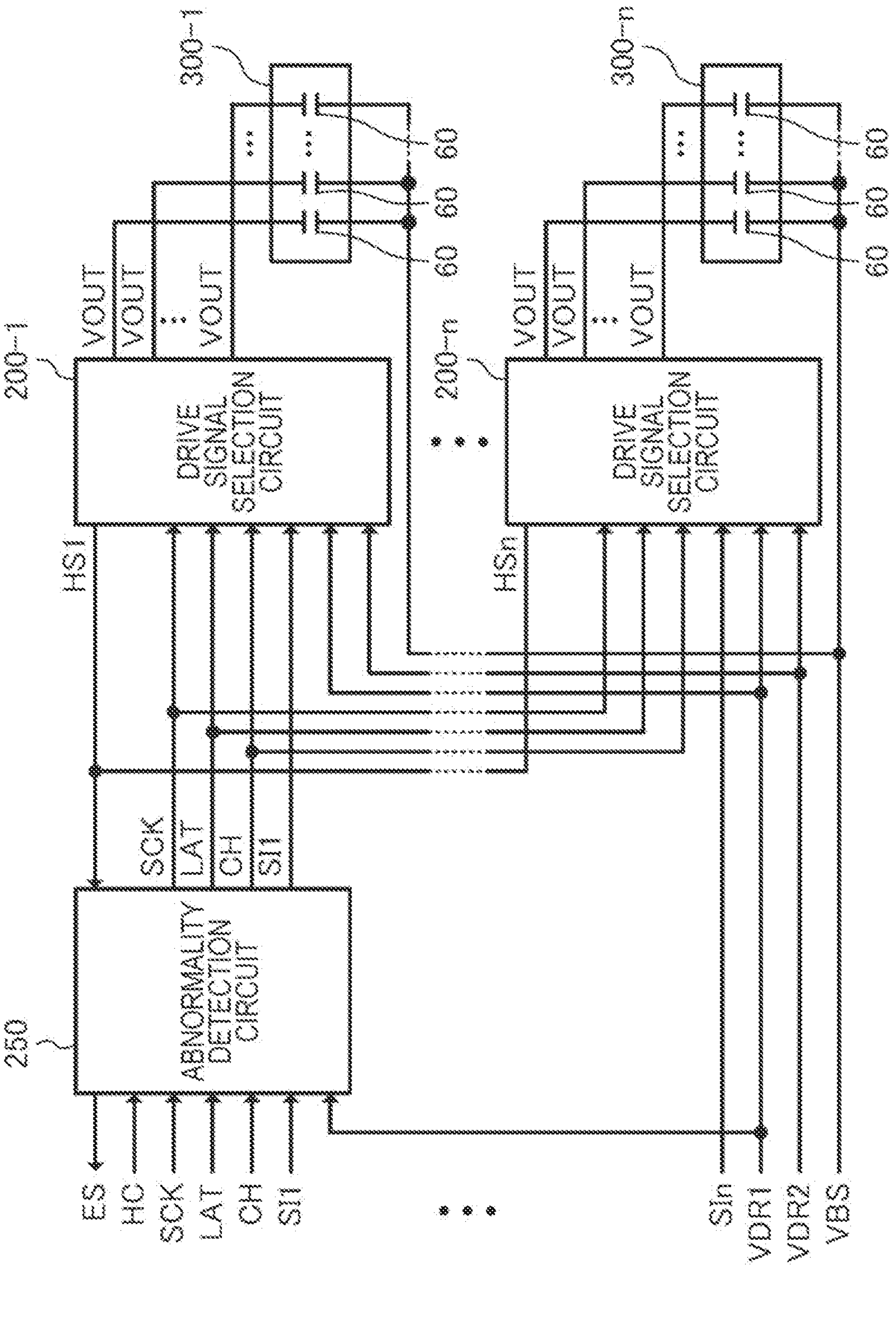
FIG. 3 is a diagram illustrating a functional configuration of a printhead.

FIG. 3 is a diagram illustrating the functional configuration of the printhead 100. As illustrated in FIG. 3, the printhead 100 includes an abnormality detection circuit 250, drive signal selection circuits 200-1 to 200-*n*, and head chips 300-1 to 300-*n*. Each of the head chips 300-1 to 300-*n* includes p piezo elements 60. FIG. 3 does not illustrate the voltages VHV and VDD used as the power supply voltage or control voltage and the like. Herein, p corresponds to the number of ejecting sections 600 and piezo elements 60 included in each head chip 300, which is an integer not less than 1.

The abnormality detection circuit 250 receives the diagnosis control signal HC, print data signal SI1, clock signal SCK, latch signal LAT, change signal CH, and drive voltage signal VDR1. The abnormality detection circuit 250 determines based on the diagnosis control signal HC and drive voltage signal VDR1, whether the signals transmitted to the printhead 100 are normal. The printhead 100 includes the abnormality detection circuit 250 performing abnormality detection. When determining that the signals transmitted to the printhead 100 are normal, the abnormality detection circuit 250 outputs the print data signal SI1 to the drive signal selection circuit 200-1 as well as outputs the clock signal SCK, latch signal LAT, and change signal CH to the drive signal selection circuits 200-1 to 200-*n*. The abnormality detection circuit 250 generates a judgment result signal ES including the result of determination whether the signals transmitted to the printhead 100 are normal and outputs the judgment result signal ES to the ejection control unit 20 included in the printhead drive circuit 2.

The abnormality detection circuit 250 may receive print data signal SIj instead of the print data signal SI1 and may receive the drive voltage signal VDR2 instead of the drive voltage signal VDR1. In this case, the abnormality detection circuit 250 outputs the print data signal SIj to the corresponding drive signal selection circuit 200-*j*. The configuration and operation of the abnormality detection circuit 250 are described in detail later.

The drive signal selection circuits 200-1 to 200-*n* and the head chips 300-1 to 300-*n* are provided so as to correspond one-to-one to each other. Specifically, the drive signal selection circuit 200-1 outputs various signals to the head chip 300-1; the drive signal selection circuit 200-*n* outputs various signals to the head chip 300-*n*; and the drive signal selection circuit 200-*j* outputs various signals to the head chip 300-*j*.

To be specific, the drive signal selection circuit 200-1 receives the print data signal SI1, clock signal SCK, latch signal LAT, change signal CH, and drive voltage signals VDR1 and VDR2. The drive signal selection circuit 200-1 sets the signal waveforms of the drive voltage signals VDR1 and VDR2 as selected or unselected based on the print data signal SI1 at the timing specified by the latch signal LAT and change signal CH to generate p drive signals VOUT corresponding to the respective p piezo elements 60 included in the head chip 300-1.

The p drive signals VOUT generated by the drive signal selection circuit 200-1 are inputted to the head chip 300-1. The head chip 300-1 also receives the reference voltage signal VBS. Each of the p drive signals VOUT is supplied to one end of the corresponding piezo element 60. The reference voltage signal VBS is supplied in common to the other end of each p piezo element 60. Each of the p piezo elements 60 is driven depending on the potential difference between the drive signal VOUT individually supplied to the one end and the reference voltage signal VBS supplied in common to the other end. This causes not-illustrated nozzles corresponding to the p piezo elements 60 to eject respective amounts of ink in response to the drive of the corresponding piezo elements 60.

The drive signal selection circuit 200-1 generates a head status signal HS1 indicating the status of the head chip 300-1 based on the temperatures of the drive signal selection circuit 200-1 and head chip 300-1, residual vibration caused after the drive signals VOUT are supplied to the piezo elements 60, and the like. The drive signal selection circuit 200-1 outputs the generated head status signal HS1 to the abnormality detection circuit 250. The abnormality detection circuit 250 determines based on the received head status signal HS1 whether the drive signal selection circuit 200-1 is normal. The abnormality detection circuit 250 outputs the result of determination whether the drive signal selection circuit 200-1 is normal to the ejection control unit 20 as the judgment result signal ES.

The drive signal selection circuit **200-*n* receives the print data signal SIn, clock signal SCK, latch signal LAT, change signal CH, and drive voltage signals VDR1 and VDR2. The drive signal selection circuit 200-*n* sets the signal waveforms of the drive voltage signals VDR1 and VDR2 as selected or unselected based on the print data signal SIn at the timing specified by the latch signal LAT and change signal CH to generate p drive signals VOUT corresponding to the respective p piezo elements 60 included in the head chip 300-*n***.

The p drive signals VOUT generated by the drive signal selection circuit **200-*n* are inputted to the head chip 300-*n*. The head chip 300-*n* also receives the reference voltage signal VBS. Each of the p drive signals VOUT is supplied to one end of the corresponding piezo element 60. The reference voltage signal VBS is supplied in common to the other end of each of the p piezo elements 60. Each of the p piezo elements 60 is driven depending on the potential difference between the drive signal VOUT individually supplied to the one end and the reference voltage signal VBS supplied in common to the other end. This causes not-illustrated nozzles corresponding to the p piezo elements 60 to eject respective amounts of ink in response to the drive of the corresponding piezo elements 60**.

The drive signal selection circuit **200-*n* generates a head status signal HSn indicating the status of the head chip 300-*n* based on the temperatures of the drive signal selection circuit 200-*n* and head chip 300-*n*, residual vibration caused after the drive signals VOUT are supplied to the piezo elements 60, and the like. The drive signal selection circuit 200-*n* outputs the generated head status signal HSn to the abnormality detection circuit 250. The abnormality detection circuit 250 determines based on the received head status signal HSn whether the drive signal selection circuit 200-*n* is normal. The abnormality detection circuit 250 outputs the result of determination whether the drive signal selection circuit 200-*n* is normal to the ejection control unit 20** as the judgment result signal ES.

As described above, the abnormality detection circuit 250 in the printhead 100 determines whether the signals transmitted to the printhead 100 are normal and whether the head chip 300 and the like are normal. When determining that the signals transmitted to the printhead 100 are normal, the abnormality detection circuit 250 outputs the SI1 to the drive signal selection circuit 200-1 and outputs the clock signal SCK, latch signal LAT, and change signal CH to the drive signal selection circuits 200-1 to **200-*n*. The drive signal selection circuits 200-1 to 200-*n* generate the drive signals VOUT based on the received print data signals SI1 to SIn, clock signal SCK, latch signal LAT, change signal CH, and drive voltage signals VDR1 and VDR2 and output the generated drive signals VOUT to the head chips 300-1 to 300-*n*, respectively. The head chips 300-1 to 300-*n*** eject respective amounts of ink depending on the received drive signals VOUT.

In the following description, the process of the abnormality detection circuit 250 determining whether the signals transmitted to the printhead 100 are normal is sometimes referred to as a diagnosis process. The process of the drive signal selection circuits 200-1 to **200-*n* generating the drive signals VOUT based on the drive voltage signals VDR1 and VDR2 and outputting the drive signals VOUT to the respective head chips 300-1 to 300-*n* so that the head chips 300-1 to 300-*n*** eject ink is sometimes referred to as a print process.

The head status signals HS1 to HSn may be inputted to the abnormality detection circuit 250 through a same line of a wired-OR connection or may be inputted to the abnormality detection circuit 250 through plural lines individually provided. The head status signals HS1 to HSn may include various information representing the statuses of the drive signal selection circuits 200-1 to **200-*n* and the head chips 300-1 to 300-*n*** instead of or in addition to the information on the temperatures and residual vibration.

1. 4 Configuration of Drive Signal Selection Circuit and Operation of Drive Signal Selection Circuit in Print Process Next, the configuration of the drive signal selection circuits 200-1 to **200-*n* and the operation of the drive signal selection circuits 200-1 to 200-*n* in the print process are described. Herein, the drive signal selection circuits 200-1 to 200-*n* are of the same configuration, and the head chips 300-1 to 300-*n* are of the same configuration. In the following description, the drive signal selection circuits 200-1 to 200-*n* are sometimes just referred to as the drive signal selection circuits 200 when it is unnecessary to distinguish the same. The head chips 300-1 to 300-*n* are sometimes just referred to as the head chips 300 when it is unnecessary to distinguish the same. In this case, the description assumes that each drive signal selection circuit 200 receives the print data signal SI, clock signal SCK, latch signal LAT, change signal CH, and drive voltage signals VDR1 and VDR2**.

For explanation of the configuration of the drive signal selection circuit 200 and the operation of the drive signal selection circuit 200 in the print process, first, the description is given of example signal waveforms of the drive voltage signals VDR1 and VDR2 inputted to the drive signal selection circuit 200 in the print process and example signal waveforms of the drive signal VOUT outputted from the drive signal selection circuit 200 in the print process. In the following description, the signal outputted as the drive voltage signal VDR1 from the ejection control unit 20 in the print process is referred to as a drive signal COMA, and the signal outputted as the drive voltage signal VDR2 is referred to as a drive signal COMB.

Figure 4:
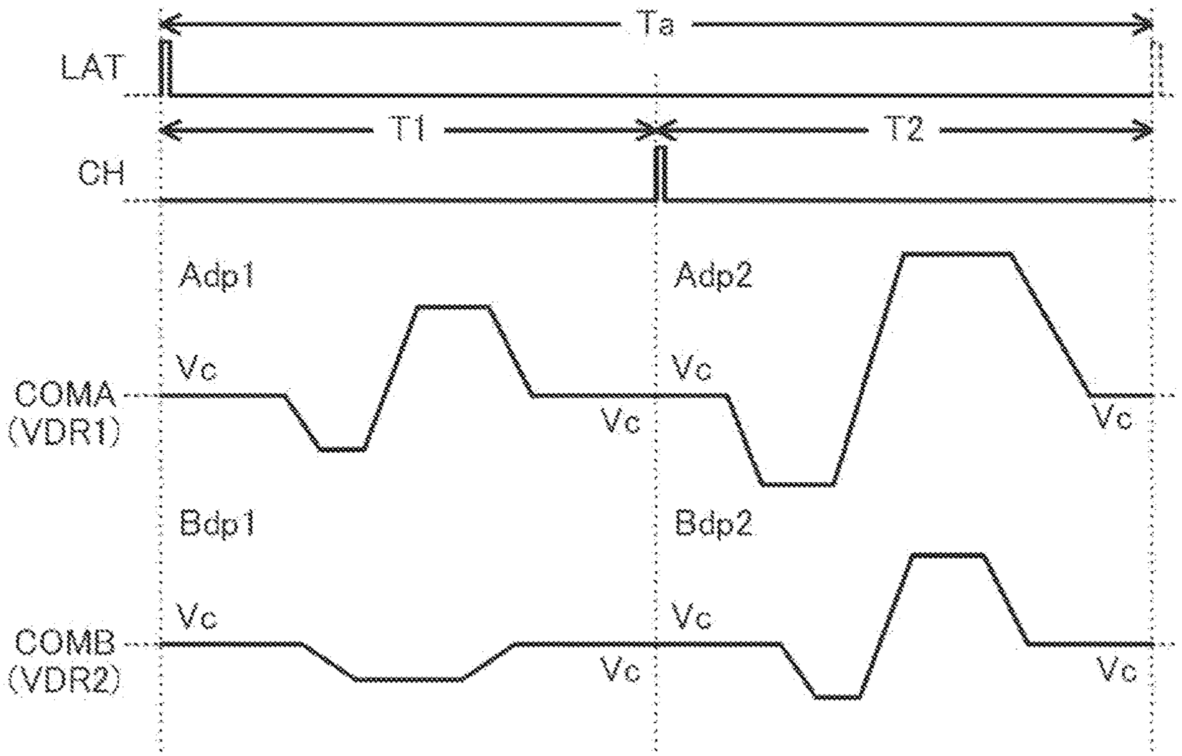
FIG. 4 is a diagram illustrating example signal waveforms of a drive signal.

FIG. 4 is a diagram illustrating example signal waveforms of the drive signals COMA and COMB. As illustrated in FIG. 4, the drive signal COMA has a signal waveform including a sequence of a trapezoidal waveform Adp1 and a trapezoidal waveform Adp2. The trapezoidal waveform Adp1 is located in a time period T1 from when the latch signal LAT rises to when the change signal CH rises. The trapezoidal waveform Adp2 is located in a time period T2 from when the change signal CH rises to when the latch signal LAT rises. When the trapezoidal waveform Adp1 is supplied to the head chip 300, the corresponding nozzle included in the head chip 300 ejects a predetermined amount of ink. When the trapezoidal waveform Adp2 is supplied to the head chip 300, the corresponding nozzle included in the head chip 300 ejects a greater amount of ink than the predetermined amount. In the following description, the amount of ink ejected when the trapezoidal waveform Adp1 is supplied to the head chip 300 is sometimes referred to as a small-sized amount, and the amount of ink ejected when the trapezoidal waveform Adp2 is supplied to the head chip 300 is sometimes referred to as a medium-sized amount.

As illustrated in FIG. 4, the drive signal COMB has a signal waveform including a sequence of a trapezoidal waveform Bdp1 located in the time period T1 and a trapezoidal waveform Bdp2 located in the time period T2. When the trapezoidal waveform Bdp1 is supplied to the head chip 300, the corresponding nozzle included in the head chip 300 do not eject any ink. The trapezoidal waveform Bdp1 is a waveform that slightly vibrates ink in the vicinity of the orifice of the corresponding nozzle so that the ink cannot be ejected, thereby preventing the ink viscosity from increasing. When the trapezoidal waveform Bdp2 is supplied to the head chip 300, the corresponding nozzle included in the head chip 300 ejects a small-sized amount of ink, which is the same amount as the amount of ink ejected when the trapezoidal waveform Adp1 is supplied.

As illustrated in FIG. 4, the voltage values of the trapezoidal waveforms Adp1, Adp2, Bdp1, and Bdp2 are the same voltage Vc at the start and end timings; that is, each of the trapezoidal waveforms Adp1, Adp2, Bdp1, and Bdp2 is a signal waveform starting with the voltage Vc and ending with the voltage Vc. The cycle Ta composed of the time periods T1 and T2 corresponds to a print cycle for forming a new dot on a medium.

In FIG. 4, the trapezoidal waveforms Adp1 and Bdp2 are the same in signal waveform. However, the trapezoidal waveforms Adp1 and Bdp2 may be different in signal waveform. In the following description, a small-sized amount of ink is ejected from a nozzle when the trapezoidal waveform Adp1 is supplied to the head chip 300 as well as when the trapezoidal waveform Bdp2 is supplied to the head chip 300. However, the configuration of the head chip 300 is not limited thereto. Specifically, the signal waveforms of the drive signals COMA and COMB are not limited to the signal waveforms illustrated in FIG. 4 and may be a combination of signal waveforms of different shapes depending on the properties of ink ejected from the nozzles included in the head chip 300, the material of the medium that the ink lands on, and the like.

In FIG. 4, the timing to switch from the trapezoidal waveform Adp1 to the trapezoidal waveform Adp2 in the drive signal COMA and the timing to switch from the trapezoidal waveform Bdp1 to the trapezoidal waveform Bdp2 in the drive signal COMB are specified by the single change signal CH. However, the timing to switch from the trapezoidal waveform Adp1 to the trapezoidal waveform Adp2 in the drive signal COMA and the timing to switch from the trapezoidal waveform Bdp1 to the trapezoidal waveform Bdp2 in the drive signal COMB may be specified by different change signals CH individually provided.

Figure 5:
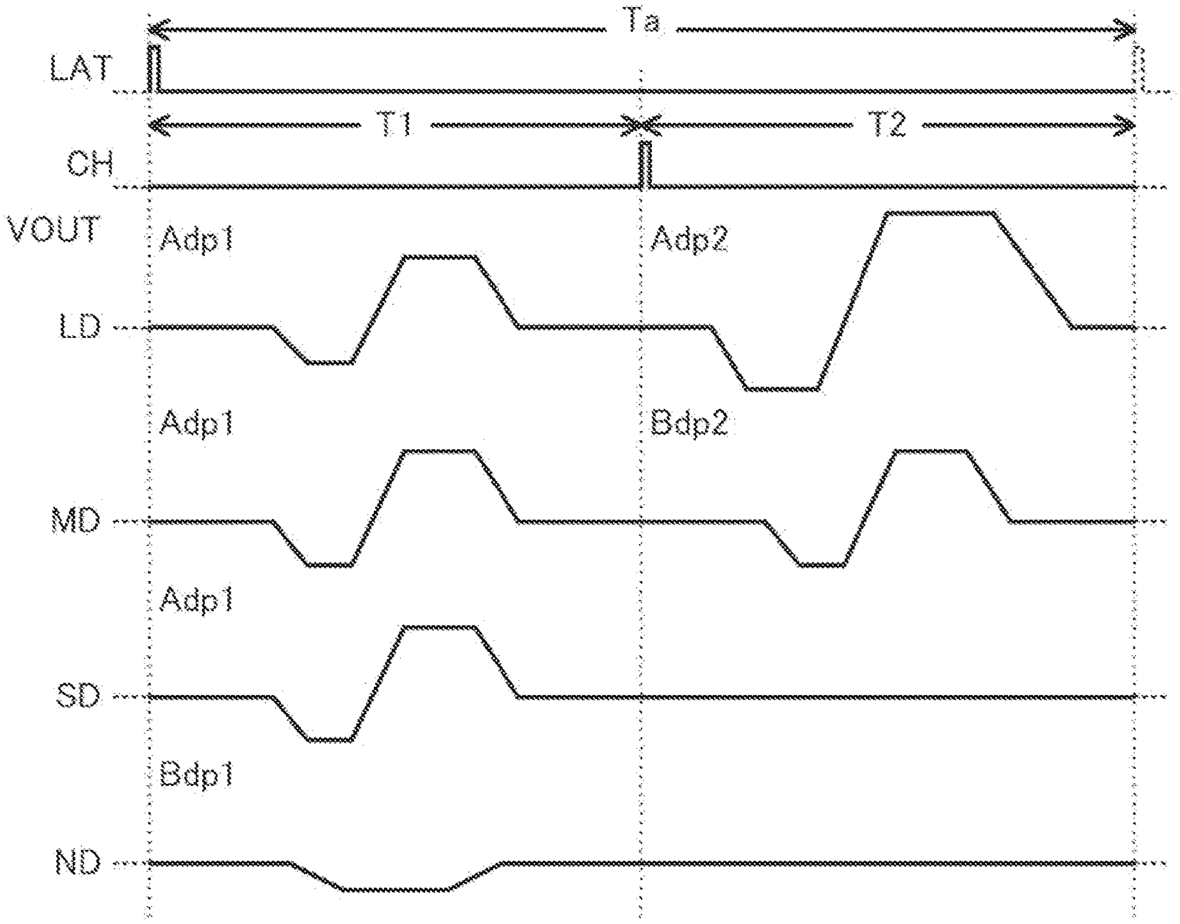
FIG. 5 is a diagram illustrating example signal waveforms of the drive signal.

FIG. 5 is a diagram illustrating example signal waveforms of the drive signal VOUT when the dot formed on the medium in the print process is a large-sized dot LD, a medium-sized dot MD, a small-sized dot SD, or a non-recorded dot ND.

As illustrated in FIG. 5, the drive signal VOUT for forming the large-sized dot LD on a medium has a signal waveform including in the cycle Ta, a sequence of the trapezoidal waveform Adp1 located in the time period T1 and the trapezoidal waveform Adp2 located in the time period T2. When this drive signal VOUT is supplied to the head chip 300, the corresponding nozzle ejects a small-sized amount of ink and then a medium-sized amount of ink. In the cycle Ta, the small-sized amount of ink and the medium-sized amount of ink land on the medium and are joined with each other, forming the large-sized dot LD on the medium.

The drive signal VOUT for forming the medium-sized dot MD on a medium has a signal waveform including in the cycle Ta, a sequence of the trapezoidal waveform Adp1 located in the time period T1 and the trapezoidal waveform Bdp2 located in the time period T2. When this drive signal VOUT is supplied to the head chip 300, the corresponding nozzle ejects a small-sized amount of ink twice. In the cycle Ta, the small-sized amounts of ink land on the medium and are joined with each other, forming the medium-sized dot MD on the medium.

The drive signal VOUT for forming the small-sized dot SD on a medium has a signal waveform including in the cycle Ta, a sequence of the trapezoidal waveform Adp1 located in the time period T1 and a signal waveform that is consistent at the voltage Vc and is located in the time period T2. When this drive signal VOUT is supplied to the head chip 300, the corresponding nozzle ejects a small-sized amount of ink once. In the cycle Ta, the small-sized amount of ink lands on the medium, forming the small-sized dot SD on the medium.

The drive signal VOUT corresponding to the non-recorded dot ND, that is, forming no dot on a medium, has a signal waveform including in the cycle Ta, a sequence of the trapezoidal waveform Bdp1 located in the time period T1 and a signal waveform that is consistent at the voltage Vc and is located in the time period T2. When this drive signal VOUT is supplied to the head chip 300, ink just vibrates slightly in the vicinity of the orifice of the corresponding nozzle and is not ejected. In the cycle Ta, therefore, no ink lands on the medium, not forming any dot on the medium.

The signal waveform that is consistent at the voltage Vc in the drive signal VOUT is a signal waveform with a voltage value holding the last voltage Vc of the trapezoidal waveform Adp1, Adp2, Bdp1, or Bdp2 when none of the trapezoidal waveforms Adp1, Adp2, Bdp1, and Bdp2 is selected as the drive signal VOUT. In other words, when none of the trapezoidal waveforms Adp1, Adp2, Bdp1, and Bdp2 is selected as the drive signal VOUT, the last voltage Vc is supplied to the head chip 300 as the drive signal VOUT.

The drive signal selection circuit 200 sets as selected or unselected, the trapezoidal waveforms Adp1 and Adp2 included in the drive signal COMA as the drive voltage signal VDR1 in the print process and the trapezoidal waveforms Bdp1 and Bdp2 included in the drive signal COMB as the drive voltage signal VDR2 in the print process, generating the drive signal VOUT corresponding to each of the p piezo elements 60. The drive signal selection circuit 200 outputs the generated drive signal VOUT to the corresponding piezo element 60.

Figure 6:
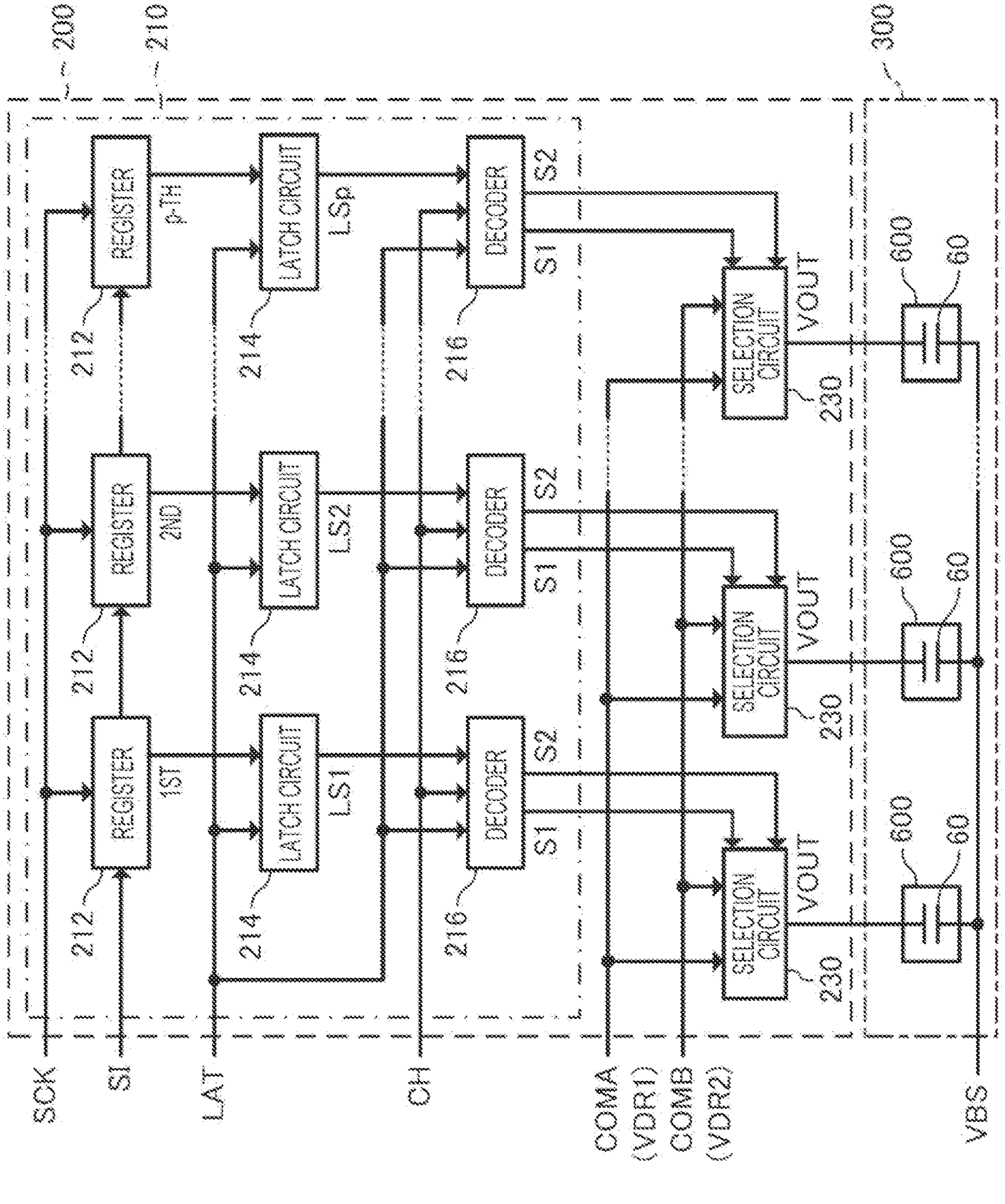
FIG. 6 is a diagram illustrating a functional configuration of a drive signal selection circuit.

FIG. 6 is a diagram illustrating the functional configuration of the drive signal selection circuit 200. As illustrated in FIG. 6, the drive signal selection circuit 200 includes a selection control circuit 210 and plural selection circuits 230. FIG. 6 illustrates an example of the head chip 300 supplied with the drive signals VOUT outputted from the drive signal selection circuit 200 together. The head chip 300 includes the p ejecting sections 600, corresponding to the respective p piezo elements 60.

The selection control circuit 210 receives the print data signal SI, clock signal SCK, latch signal LAT, and change signal CH. The selection control circuit 210 includes combinations of a register 212, a latch circuit 214, and a decoder 216, which are provided corresponding to the respective p ejecting sections 600 included in the head chip 300. This means that the number of combinations of the register 212, latch circuit 214 and decoder 216, which are included in the selection control circuit 210, is the same as the number of the p ejecting sections 600.

The print data signal SI is synchronized with the clock signal SCK. The print data signal SI is composed of 2p bits in total, serially including 2-bit print data [SIH, SIL] for each of the p ejecting sections 600. The print data [SIH, SIL] are for selecting one from the large-sized dot LD, medium-sized dot MD, small-sized dot SD, and non-recorded dot ND. The print data [SIH, SIL] included in the print data signal SI are held in the respective registers 212, corresponding to the p ejecting sections 600.

To be specific, in the selection control circuit 210, the registers 212 are cascade-coupled to each other to constitute a p-step shift resistor. The print data [SIH, SIL] serially inputted to each register 212 as the print data signal SI are sequentially transferred to the subsequent register 212 in response to the clock signal SCK. When the supply of the clock signal SCK stops, the print data [SIH, SIL] for the respective p ejecting sections 600 are held in the corresponding registers 212. In the following description, the p registers 212 constituting the shift register are sometimes referred to as first, second, . . . , and p-th registers 212 from upstream to downstream of transmission of the print data signal SI for distinguishing the p registers 212.

The p latch circuits 214 are provided, corresponding to the respective p registers 212. The latch circuits 214 simultaneously latch the print data [SIH, SIL] held in the individual p registers 212 at the rising edge of the latch signal LAT and output the latched print data [SIH, SIL] to the corresponding decoders 216.

Figures 7, 8:
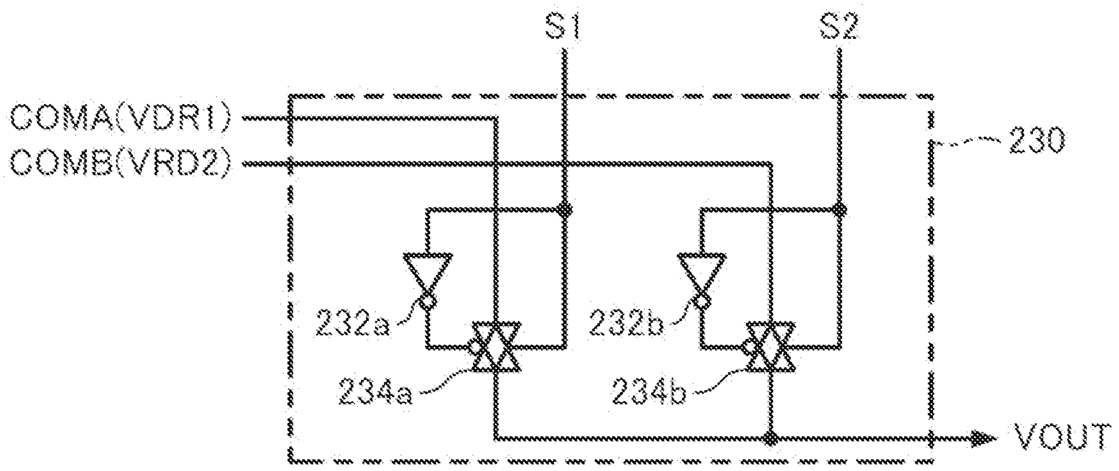
FIG. 7 is a diagram illustrating decoded data examples.
FIG. 8 is a diagram illustrating the configuration of a selection circuit.

FIG. 7 is a diagram illustrating decoded data examples in the decoder 216. Each decoder 216 decodes the print data [SIH, SIL] latched by the latch circuit 214 as illustrated in FIG. 7 to generate and output selection signals S1 and S2. When the inputted print data [SIH, SIL] are [1, 0], for example, the decoder 216 outputs to the selection circuit 230, the selection signal S1 with the logic level set as high level in the time period T1 and as low level in the time period T2 and outputs to the selection circuit 230, the selection signal S2 with the logic level set as low level in the time period T1 and as high level in the time period T2.

The selection circuits 230 are provided corresponding to the respective p ejecting sections 600. In other words, the number of p selection circuits 230, which is included in the drive signal selection circuit 200, is the same as the number of p ejecting sections 600. FIG. 8 is a diagram illustrating the configuration of the selection circuit 230 corresponding to any one of the ejecting sections 600. As illustrated in FIG. 8, the selection circuit 230 includes inverters 232*a* and 232*b* as NOT circuits and transfer gates 234*a* and 234*b*.

The positive control terminal (no circle) of the transfer gate 234*a* receives the selection signal S1 while the negative control terminal (with a circle) of the transfer gate 234*a* receives the selection signal S1 with the logic inverted by the inverter 232*a*. The input terminal of the transfer gate 234*a* is supplied with the drive signal COMA as the drive voltage signal VDR1. The positive control terminal (no circle mark) of the transfer gate 234*b* receives the selection signal S2 while the negative control terminal (with a circle) of the transfer gate 234*b* receives the selection signal S2 with the logic inverted by the inverter 232*b*. The input terminal of the transfer gate 234*b* is supplied with the drive signal COMB as the drive voltage signal VDR2. The output terminals of the transfer gates 234*a* and 234*b* are coupled in common. The signal at a terminal coupled in common to the output terminals of the transfer gates 234*a* and 234*b* is outputted as the drive signal VOUT.

Specifically, when the selection signal S1 is high level, the transfer gate 234*a* is conducting between the input and output terminals, and when the selection signal S1 is low level, the transfer gate 234*a* is not conducting between the input and output terminals. When the selection signal S2 is high level, the transfer gate 234*b* is conducting between the input and output terminals, and when the selection signal S2 is low level, the transfer gate 234*b* is not conducting between the input and output terminals. The selection circuit 230 switches the conducting status between the input and output terminals of the transfer gates 234*a* and 234*b* based on the selection signals S1 and S2, thereby setting as selected or unselected, the signal waveforms of the drive signals COMA and COMB supplied to the input terminals of the transfer gates 234*a* and 234*b*. The selection circuit 230 thereby generates the drive signal VOUT at the terminal coupled in common to the output terminals of the transfer gates 234*a* and 234*b*.

Figure 9:
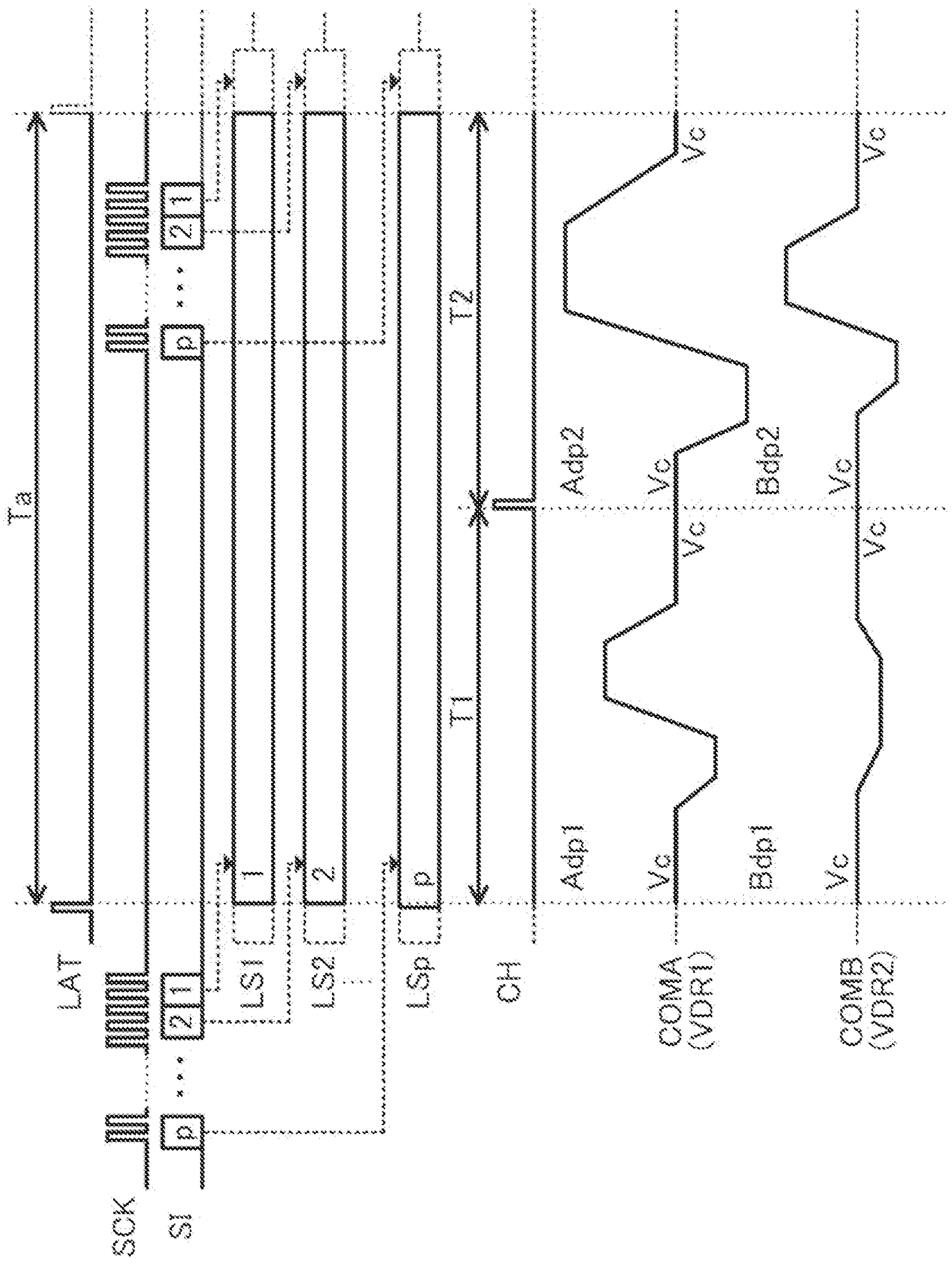
FIG. 9 is a diagram for explaining the operation of the drive signal selection circuit.

Using FIG. 9, the operation of the drive signal selection circuit 200 is described. FIG. 9 is a diagram for explaining the operation of the drive signal selection circuit 200. The print data [SIH, SIL] included in the print data signal SI are serially inputted in synchronization with the clock signal SCK. The print data [SIH, SIL] are sequentially transferred in synchronization with the clock signal SCK by the registers 212 constituting the shift register corresponding to the p ejecting sections 600. The supply of the clock signal SCK then stops, and the respective registers 212 hold the print data [SIH, SIL] corresponding to the respective p ejecting sections 600. The print data [SIH, SIL] included in the print data signal SI are sequentially inputted to the p-th, . . . , second, and first registers 212 constituting the shift register in this order corresponding to the ejecting sections 600.

At the rising edge of the latch signal LAT, the latch circuits 214 latch the print data [SIH, SIL] held in the registers 212 simultaneously. In FIG. 9, LS1, LS2, . . . , and LSp indicate the print data [SIH, SIL] latched by the respective latch circuits 214 corresponding to the first, second, . . . , and p-th registers 212.

The decoder 216 outputs the selection signals S1 and S2 with the logic level set as illustrated in FIG. 7, in the respective time periods T1 and T2 depending on the dot size specified by the latched print data [SIH, SIL].

Specifically, when the inputted print data [SIH, SIL] is [1, 1], the decoder 216 sets the selection signal S1 as high level in the time period T1 and as high level in the time period T2 and sets the selection signal S2 as low level in the time period T1 and as low level in the time period T2. In this case, the selection circuit 230 selects the trapezoidal waveform Adp1 in the time period T1 and selects the trapezoidal waveform Adp2 in the time period T2. At the output terminal of the selection circuit 230, therefore, the drive signal VOUT corresponding to the large-sized dot LD illustrated in FIG. 5 is generated.

When the inputted print data [SIH, SIL] is [1, 0], the decoder 216 sets the selection signal S1 as high level in the time period T1 and as low level in the time period T2 and sets the selection signal S2 as low level in the time period T1 and as high level in the time period T2. In this case, the selection circuit 230 selects the trapezoidal waveform Adp1 in the time period T1 and selects the trapezoidal waveform Bdp2 in the time period T2. At the output terminal of the selection circuit 230, therefore, the drive signal VOUT corresponding to the medium-sized dot MD illustrated in FIG. 5 is generated.

When the inputted print data [SIH, SIL] is [0, 1], the decoder 216 sets the selection signal S1 as high level in the time period T1 and as low level in the time period T2 and sets the selection signal S2 as low level in the time period T1 and as low level in the time period T2. In this case, the selection circuit 230 selects the trapezoidal waveform Adp1 in the time period T1 and selects neither the trapezoidal waveforms Adp2 nor Bdp2 in the time period T2. At the output terminal of the selection circuit 230, therefore, the drive signal VOUT corresponding to the small-sized dot SD illustrated in FIG. 5 is generated.

When the inputted print data [SIH, SIL] is [0, 0], the decoder 216 sets the selection signal S1 as low level in the time period T1 and as low level in the time period T2 and sets the selection signal S2 as high level in the time period T1 and as low level in the time period T2. In this case, the selection circuit 230 selects the trapezoidal waveform Bdp1 in the time period T1 and selects neither the trapezoidal waveforms Adp2 nor Bdp2 in the time period T2. At the output terminal of the selection circuit 230, therefore, the drive signal VOUT corresponding to the non-recorded dot ND illustrated in FIG. 5 is generated.

As described above, based on the print data signal SI, clock signal SCK, latch signal LAT, and change signal CH, the drive signal selection circuit 200 generates and outputs the drive signal VOUT by setting as selected or unselected, the signal waveforms of the drive signal COMA as the drive voltage signal VDR1 in the print process and the drive signal COMB as the drive voltage signal VDR2 in the print process. This means that the drive signal VOUT is an example of the drive signal. In light of the drive signal VOUT being generated by selection of the waveforms of the drive signals COMA and COMB, the drive signals COMA and COMB are examples of the drive signal.

Figure 10:
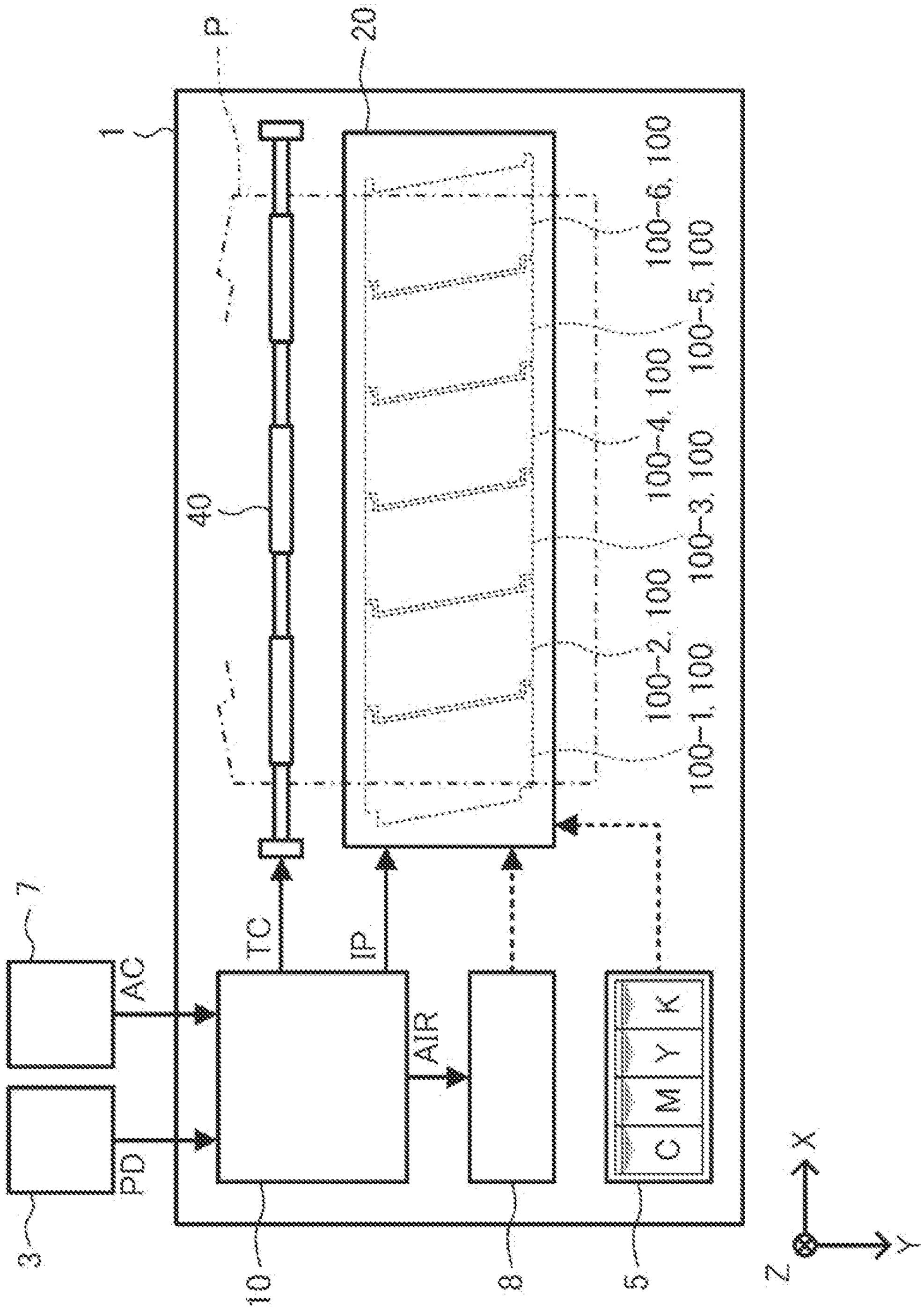
FIG. 10 is a diagram illustrating a schematic structure of the liquid ejecting apparatus.

1. 5 Structure of Liquid Ejecting Apparatus 1. 5. 1 Structure of Liquid Ejecting Apparatus Next, an example structure of the liquid ejecting apparatus 1 is described. FIG. 10 is a diagram illustrating a schematic structure of the liquid ejecting apparatus 1. FIG. 10 illustrates arrows representing X-, Y-, and Z-directions (X-, Y-, and Z-axes) orthogonal to each other. Herein, the Y-direction corresponds to the transporting direction of a medium P; the X-direction is orthogonal to the Y-direction and is parallel to the horizontal plane, which corresponds to a main scanning direction; and the Z-direction is vertical and corresponds to a top-bottom direction of the liquid ejecting apparatus 1. To specify directions along the X-, Y-, and Z-axes in the following description, the head's side of the arrow representing the X-direction is referred to as +X side while the tail's side thereof is referred to as −X side; the head's side of the arrow representing the Y-direction is referred to as +Y side while the tail's side thereof is referred to as −Y side; and the head's side of the arrow representing the Z-direction is referred to as +Z side while the tail's side is referred to as −Z side.

As illustrated in FIG. 10, in addition to the aforementioned main control unit 10, ejection control unit 20, and m printheads 100, the liquid ejecting apparatus 1 includes a liquid container section 5, a pump 8, and a transportation mechanism 40. In the following description, the liquid ejecting apparatus 1 includes six printheads 100, printheads 100-1 to 100-6, as the plural printheads 100.

The main control unit 10 is supplied with the alternating-current voltage AC as commercial alternating-current voltage from a commercial alternating-current power supply 7 provided outside of the liquid ejecting apparatus 1. The liquid ejecting apparatus 1 starts operating with the alternating-current voltage AC as the power supply voltage. The main control unit 10 receives the image data PD from an external device 3, such as a host computer, provided outside of the liquid ejecting apparatus 1, via a local area network (LAN) cable or a universal serial bus (USB) cable. Based on the received image data PD, the main control unit 10 generates the image information signal IP and outputs the generated image information signal IP to the ejection control unit 20. The main control unit 10 outputs a transportation control signal TC to the transportation mechanism 40 configured to transport the medium P, to control transportation of the medium P and outputs a pump control signal AIR to the pump 8 to control operation of the pump 8.

The liquid container section 5 stores ink to be ejected onto the medium P. Specifically, the liquid container section 5 includes four containers storing ink of four colors (cyan C, magenta M, yellow Y, and black K). The ink stored in the liquid container section 5 is supplied to the ejection control unit 20 through ink channels such as tubes. The number of ink containers included in the liquid container section 5 is not limited to four, and the colors of stored ink are not limited to the four colors of cyan C, magenta M, yellow Y, and black K.

The ejection control unit 20 distributes the ink supplied through the ink channels, such as tubes, to the printheads 100-1 to 100-6. The ejection control unit 20 also generates based on the image information signal IP supplied from the main control unit 10, various signals to individually drive the printheads 100-1 to 100-6 and supplies the generated signals to the printheads 100-1 to 100-6.

The printheads 100-1 to 100-6 are located on the +Z side of the ejection control unit 20. The printheads 100-1 to 100-6 are arranged along the X-axis to cover the width of the medium P, in the sequence of the printheads 100-1, 100-2, 100-3, 100-4, 100-5, and 100-6 from the −X side to the +X side. Based on the signals inputted from the ejection control unit 20, the printheads 100-1 to 100-6 eject ink supplied through the ejection control unit 20 and the ink channels such as tubes. The number of printheads 100 included in the liquid ejecting apparatus 1 is not limited to six and may be not more than five or not less than seven.

The transportation mechanism 40 transports the medium P in the Y-direction based on the transportation control signal TC inputted from the main control unit 10. The transportation mechanism 40 includes not-illustrated rollers for transporting the medium P, a motor for rotationally driving the rollers, and the like.

Based on the pump control signal AIR received from the main control unit 10, the pump 8 controls whether air is supplied to the ejection control unit 20 and the amount of supplied air. The pump 8 is coupled to the ejection control unit 20 through, for example, one or plural tubes. The pump 8 controls air flowing through each tube to control the opening/closing operation of the valves included in the ejection control unit 20. In the following description, the pump 8 is coupled to the ejection control unit 20 through two tubes.

As described above, in the liquid ejecting apparatus 1, the main control unit 10 generates the image information signal IP based on the image data PD inputted from the external device 3, such as a host computer, and supplies the generated image information signal IP to the ejection control unit 20. The main control unit 10 also controls transportation of the medium P in the transportation mechanism 40 using the transportation control signal TC. The ejection control unit 20 controls ejection of ink from the printheads 100-1 to 100-6 based on the received image information signal IP. The liquid ejecting apparatus 1 controls transportation of the medium P and ink ejection timing so that ink land on a desired position on the medium P, thus forming a desired image on the medium P.

1. 5. 2 Structure of Ejection Control Unit

Next, the description is given of a structure example of the ejection control unit 20 which distributes ink supplied from the liquid container section 5 through ink channels, such as tubes, into the printheads 100-1 to 100-6 and drives the printheads 100-1 to 100-6 based on the image information signal IP supplied from the main control unit 10.

Figure 11:
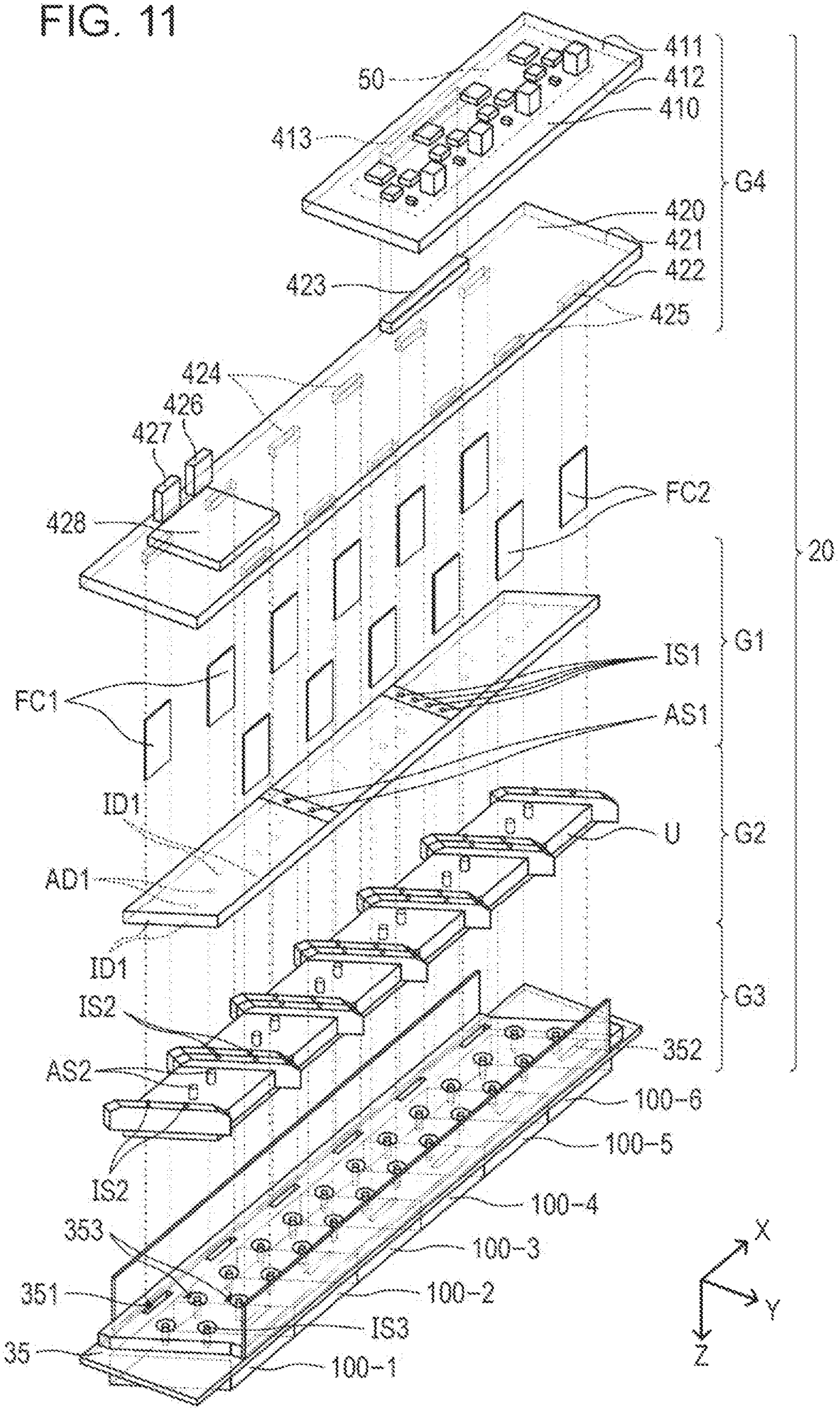
FIG. 11 is a diagram illustrating an example structure of an ejection control unit.

FIG. 11 is a diagram illustrating a structure example of the ejection control unit 20. In addition to the ejection control unit 20, FIG. 11 illustrates the printheads 100-1 to 100-6 located on the +Z side of the ejection control unit 20 and cables FC1 and FC2 electrically coupling the ejection control unit 20 and the respective printheads 100-1 to 100-6.

As illustrated in FIG. 11, the ejection control unit 20 includes: an introduction channel section G1 introducing ink supplied from the liquid container section 5; a supply control section G2 controlling supply of the introduced ink to the printheads 100-1 to 100-6; a printhead support section G3 to which the printheads 100-1 to 100-6 are fixed; and an ejection control section G4 controlling ejection of ink from the printheads 100-1 to 100-6. The introduction channel section G1, supply control section G2, printhead support section G3, and ejection control section G4 are stacked along the Z-axis, from the −Z side to the +Z side, in the sequence of the ejection control section G4, introduction channel section G1, supply control section G2, printhead support section G3 and are fixed with not-illustrated fixing members such as an adhesive or screws.

The introduction channel section G1 includes: plural liquid inlets IS1, the number of which depends on the number of colors of ink supplied to the ejection control unit 20; and plural liquid outlets ID1, the number of which depends on the number of colors of ink and the number of printheads 100. The plural liquid inlets IS1 are located in the −Z side surface of the inlet channel section G1. These plural liquid inlets IS1 are supplied with ink from the liquid container section 5 through not-illustrated tubes and the like. The plural liquid outlets ID1 are located in the +Z side surface of the introduction channel section G1. The plural liquid outlets ID1 eject the ink supplied to the ejection control unit 20, corresponding to the respective plural printheads 100 included in the liquid ejecting apparatus 1. The number of the liquid outlets ID1 included in the introduction channel section G1 is therefore the product of the number of the plural printheads 100 included in the liquid ejecting apparatus 1 and the number of colors of ink supplied to the ejection control unit 20. Specifically, when the liquid ejecting apparatus 1 includes the six printheads 100 and supplies ink of four colors to the ejection control unit 20 as illustrated in the first embodiment, the introduction channel section G1 includes 24 liquid outlets ID1. Within the thus-configured introduction channel section G1, ink channels are formed to communicate with the liquid inlets IS1 and liquid outlets ID1 for each ink color.

The introduction channel section G1 includes plural air inlets AS1 and plural air outlets AD1. The plural air inlets AS1 are provided in the −Z side surface of the introduction channel section G1 and are coupled to the pump 8 through the not-illustrated tubes. The plural air outlets AD1 are provided in the +Z side surface of the introduction channel section G1. The plural air outlets AD1 eject air supplied to the ejection control unit 20, corresponding to the respective plural printheads 100 included in the liquid ejecting apparatus 1. Within the introduction channel section G1, air channels are formed to communicate with the single air inlet AS1 and the plural air outlets AD1 corresponding to the respective printheads 100.

The supply control section G2 includes plural pressure adjustment units U corresponding to the respective plural printheads 100 included in the liquid ejecting apparatus 1. Each of the plural pressure adjustment units U includes plural liquid inlets IS2, the number of which depends on the number of colors of ink supplied to the ejection control unit 20 and not-illustrated plural outlets that correspond one-to-one to the plural liquid inlets IS2.

The plural liquid inlets IS2 are located on the −Z side of the pressure adjustment units U corresponding to the respective liquid outlets ID1 included in the introduction channel section G1 and are coupled to the respective liquid outlets ID1. The not-illustrated plural outlets are located on the −Z side of the pressure adjustment units U. Within the pressure adjustment units U, ink channels are formed to communicate with the single liquid inlets IS2 and the single outlet unillustrated.

Each of the plural pressure adjustment units U includes plural air inlets AS2, the number of which depends on the number of tubes coupled to the pump 8. The plural air inlets AS2 are located on the −Z side of the pressure adjustment unit U corresponding to the air outlets AD1 included in the introduction channel section G1 and are coupled to the corresponding air outlets AD1. Within the pressure adjustment unit U, not-illustrated valves for opening and closing the ink channels and not-illustrated regulation valves adjusting the pressure of ink flowing through the ink channels are provided. The pressure adjustment unit U controls the operation of the valves and regulation valves with air supplied from the air inlets AS2 to control the amount of ink flowing through the not-illustrated ink channels communicating with the liquid inlets IS2 and not-illustrated outlets.

The printhead support section G3 includes a support member 35 supporting the print heads 100-1 to 100-6 included in the liquid ejecting apparatus 1. The support member 35 supports the printheads 100-1 to 100-6 in such a manner the printheads 100-1 to 100-6 are individually fixed to the +Z side thereof with fixing members such as not-illustrated adhesive or screws.

The support member 35 includes openings 353 formed corresponding to later-described liquid inlets IS3 included in the printheads 100-1 to 100-6. The later-described liquid inlets IS3 included in the printheads 100-1 to 100-6 are exposed to the −Z side of the printhead support section G3 through the openings 353. The later-described liquid inlets IS3 included in the printheads 100-1 to 100-6 are coupled to the respective not-illustrated outlets included in the supply control section G2.

The ink stored in the liquid container section 5 is supplied to the printheads 100-1 to 100-6 through the thus-configured instruction channel section G1, supply control section G2, and printhead support section G3. Specifically, the ink stored in the liquid container section 5 is supplied to the liquid inlets IS1 included in the introduction channel section G1 through the not-illustrated tubes and the like. The ink supplied to the liquid inlets IS1 is distributed corresponding to the printheads 100-1 to 100-6 by the not-illustrated ink channels provided within the introduction channel section G1 and is then supplied to the liquid inlets IS2 included in the pressure adjustment units U through the liquid outlets ID1. The ink supplied to the liquid inlets IS2 is supplied to the liquid inlets IS3 of the printheads 100-1 to 100-6 supported by the printhead support section G3, through the ink channels provided within the pressure adjustment units U and the not-illustrated outlets. After the ink supplied from the liquid container section 5 is divided in the introduction channel section G1, the supply rate of the ink is controlled in the supply control section G2, and the ink is supplied to the printheads 100-1 to 100-6 supported by the printhead support section G3.

The ejection control section G4 is located on the −Z side of the introduction channel section G1 and includes circuit boards 410 and 420.

The circuit board 410 includes a surface 411 and a surface 412 located on the opposite side to the surface 411. The circuit board 410 is positioned so that the surface 412 face the introduction channel section G1, supply control section G2, and printhead support section G3 and the surface 411 face the opposite side to the introduction channel section G1, supply control section G2, and printhead support section G3.

On the surface 411 of the circuit board 410, the drive voltage output circuit 50 outputting the drive voltage signals VDR1 and VDR2 is provided. On the surface 412 of the circuit board 410, a coupling section 413 is provided. The coupling section 413 electrically couples the circuit boards 410 and 420 to transmit the drive voltage signals VDR1 and VDR2 generated by the drive voltage output circuit 50 to the circuit board 420 and transmit to the circuit board 410, plural signals including the base-drive signals dA and dB as the basis of the drive voltage signals VDR1 and VDR2 outputted by the drive voltage output circuit 50.

The circuit board 420 includes a surface 421 and a surface 422 located on the opposite side to the surface 421. The circuit board 420 is positioned so that the surface 422 face the introduction channel section G1, supply control section G2, and printhead support section G3 and the surface 421 face in the opposite direction to the introduction channel section G1, supply control section G2, and printhead support section G3.

On the surface 421 of the circuit board 420, a semiconductor device 428 and coupling sections 423, 426, and 427 are provided. The coupling section 423 is coupled to the coupling section 413 provided for the circuit board 410. The circuit board 420 is thereby electrically coupled to the circuit board 410. The thus-configured coupling sections 413 and 423 are board-to-board connectors electrically coupling the circuit boards 410 and 420 directly without using any cable. The semiconductor device 428 is a circuit component constituting at least a part of the aforementioned ejection control circuit 21 and is, for example, composed of a SoC or the like. The semiconductor device 428 is provided in a region of the circuit board 420 on the −X side of the coupling section 423. The coupling section 426 receives the voltages VHV and VDD serving as power supply voltages of the ejection control unit 20. The coupling section 426 is located on the −Y side of the semiconductor device 428. The coupling section 427 receives the image information signal IP outputted from the main control unit 10. The coupling section 427 includes plural terminals configured to transmit the received image information signal IP. The coupling section 427 is located on the −Y side of the semiconductor device 428 and on the −X side of the coupling section 426. The coupling sections 426 and 427 may be composed as a single coupling section.

On the surface 422 of the circuit board 420, plural coupling sections 424 and plural coupling sections 425 are provided. The number of coupling sections 424 and the number of coupling sections 425 are the same as the number of printheads 100 included in the liquid ejecting apparatus 1. The plural coupling sections 424 are arranged along the −Y side edge of the circuit board 420, and the plural coupling sections 425 are arranged along the +Y side edge of the circuit board 420. The control signals generated in the ejection control section G4 are outputted through the coupling sections 424 and 425.

Each of the coupling sections 424 is coupled to one end of the corresponding cable FC1. The cables FC1 run by the −Y side of the introduction channel section G1 and supply control section G2 and run through the respective openings 351 provided in the printhead support sections G3 to be electrically coupled to the respective plural printheads 100 located on the −Z side of the printhead support section G3.

Each of the coupling sections 425 is coupled to an end of the corresponding cable FC2. The cables FC2 run by the +Y side of the introduction channel section G1 and supply control section G2 and run through the respective openings 352 provided in the printhead support sections G3 to be electrically coupled to the respective plural printheads 100 located on the −Z side of the printhead support section G3. The cables FC1 and FC2, the numbers of which are the same as the number of printheads 100, transmit the control signals generated in the ejection control section G4 to the respective printheads 100. Such cables FC1 and FC2 are composed of, for example, flexible flat cables (FFC) or flexible printed circuits (FPC).

In the thus-configured ejection control unit 20, the image information signal IP inputted from the main control unit 10 is supplied to the ejection control section G4. The semiconductor device 428 and not-illustrated peripheral circuits included in the ejection control section G4 generate the voltages VHV and VDD, diagnosis control signals HC1 to HCm, print data signals SI11 to SI1*n*, . . . , and SIm1 to SImn, clock signals SCK1 to SCKm, latch signal LAT, and change signal CH to control operation of the printheads 100-1 to 100-6 and also generate the base-drive signals dA and dB, based on the image information signal IP inputted from the main control unit 10. The base-drive signals dA and dB are supplied to the drive voltage output circuit 50 provided in the circuit board 410. The drive voltage output circuit 50 generates the drive voltage signals VDR1 and VDR2 and reference voltage signal VBS and outputs the generated signals to the circuit board 420. The ejection control section G4 supplies the generated diagnosis control signals HC1 to HCm, print data signals SI11 to SI1*n*, . . . , and SIm1 to SImn, clock signals SCK1 to SCKm, latch signal LAT, change signal CH, drive voltage signals VDR1 and VDR2, reference voltage signal VBS, and voltages VHV and VDD to the corresponding printheads 100-1 to 100-6 through the corresponding cables FC1 and FC2.

In the example illustrated in the first embodiment, the ejection control unit 20 and each printhead 100 are coupled with the two signal cables including the cables FC1 and FC2. However, the ejection control unit 20 and each printhead 100 may be electrically coupled using three or more signal cables or may be electrically coupled with one signal cable. In the following description, the cables FC1 and FC2 are flexible flat cables.

Figure 12:
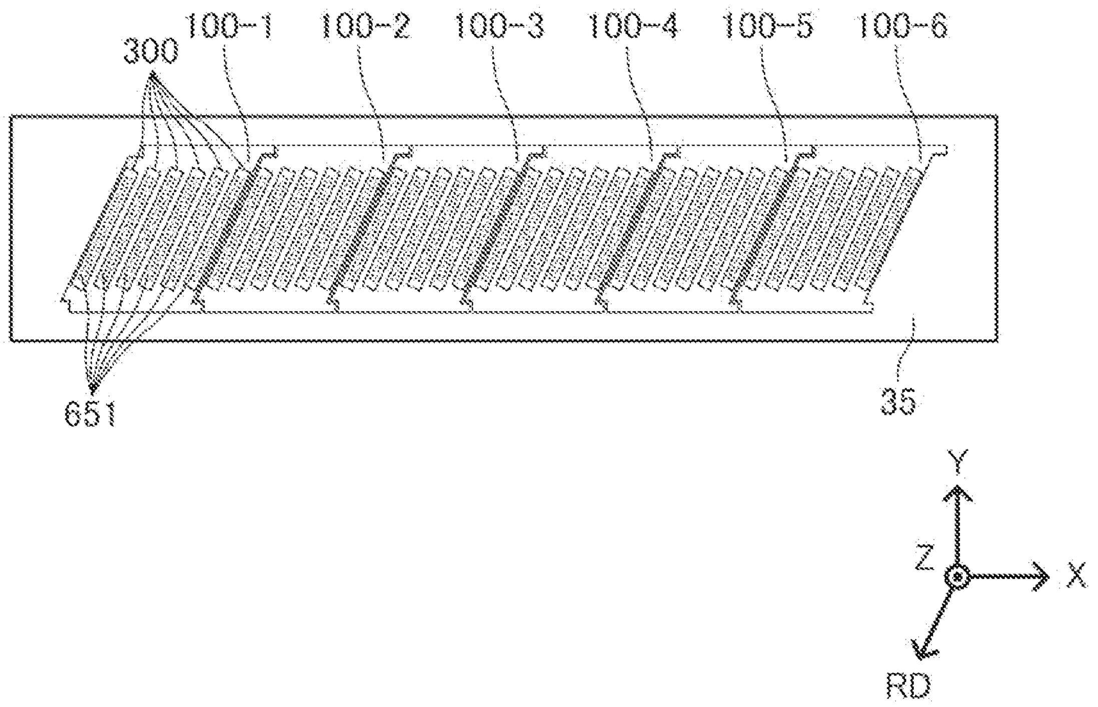
FIG. 12 is a diagram illustrating an example arrangement of a printhead.

Next, an example arrangement of the printheads 100-1 to 100-6 supported by the printhead support section G3 is described. FIG. 12 is a diagram illustrating an example arrangement of the printheads 100-1 to 100-6. As illustrated in FIG. 12, each of the plural printheads 100-1 to 100-6 includes six head chips 300 arranged along the X-axis. The head chips 300 include plural nozzles 651 configured to discharge ink. The plural nozzles 651 are arranged along an RD-axis on a plane that is perpendicular to the Z-axis and is formed by the X- and Y-axes. In the following description, the rows of the plural nozzles 651 along the RD-axis are sometimes referred to as nozzle rows.

Each head chip 300 includes two nozzle rows along the RD-axis. The nozzles 651 in the two rows included in each printhead 100 include a group of nozzles 651 ejecting ink of cyan C, a group of nozzles 651 ejecting ink of magenta M, a group of nozzles 651 ejecting ink of yellow Y, and a group of nozzles 651 ejecting ink of black K. The number of head chips 300 included in each of the printheads 100-1 to 100-6 is not limited to six.

1. 5. 3 Structure of Printhead

Next, the structure of the printheads 100-1 to 100-6 is described. As described above, the printheads 100-1 to 100-6 are of the same configuration and are referred to as just printheads 100 in the following description.

Figure 13:
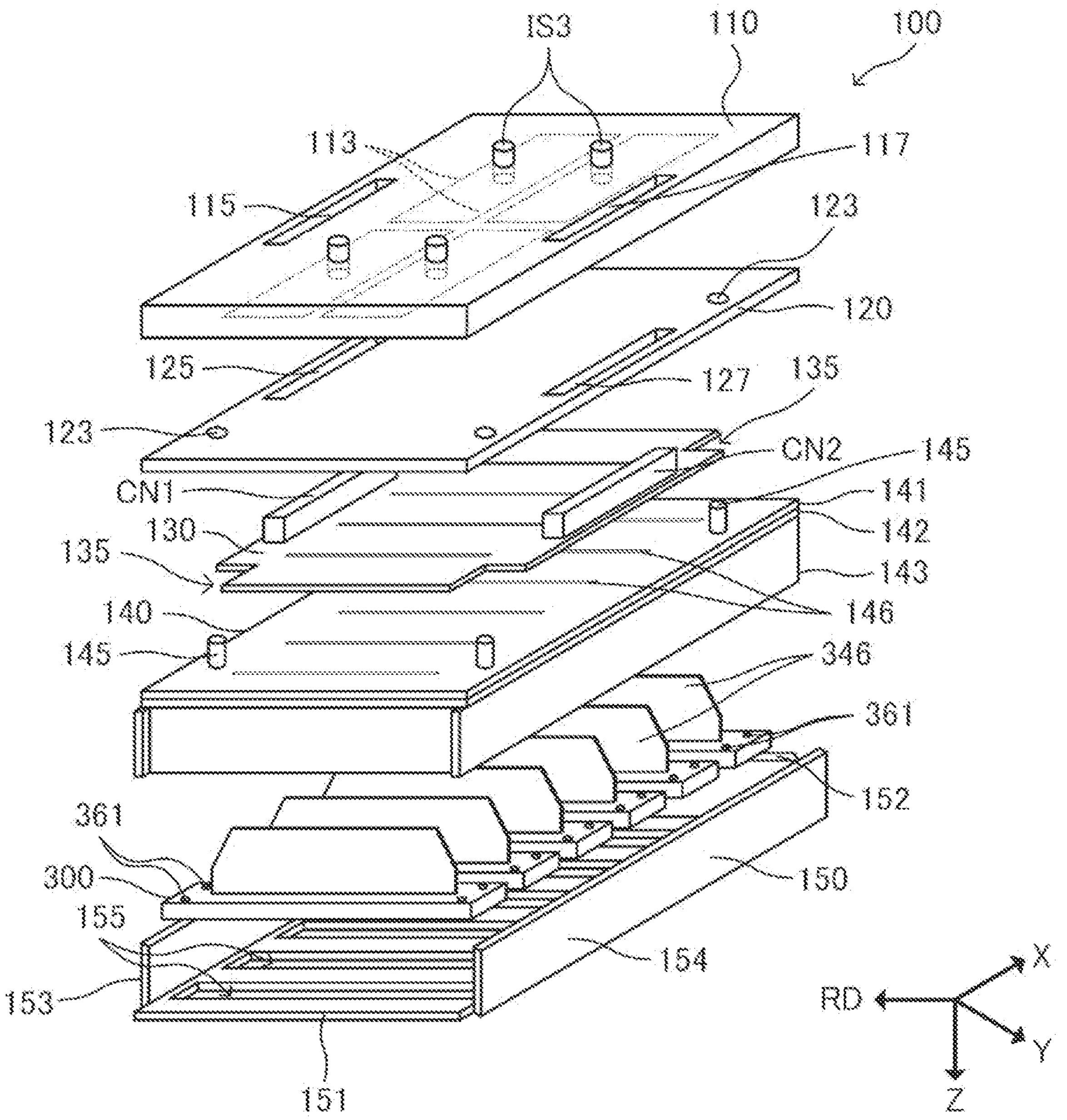
FIG. 13 is a diagram illustrating an example structure of the printhead.

FIG. 13 is a diagram illustrating an example structure of one of the printheads 100. As illustrated in FIG. 13, the printhead 100 includes a filter section 110, a seal member 120, a circuit board 130, a holder 140, the six head chips 300, and a fixing plate 150. The printhead 100 is composed of the filter section 110, seal member 120, circuit board 130, holder 140, and fixing plate 150, which are stacked along the Z-axis, from the −Z side to the +Z side, in this sequence, and the six head chips 300 are accommodated between the holder 140 and fixing plate 150.

The filter section 110 has a substantially parallelogram shape with two opposite edges extending along the X-axis and the other two opposite edges extending along the RD-axis. The filter section 110 includes four filters 113 and the four liquid inlets IS3. The four liquid inlets IS3 are located on the −Z side of the filter section 110 corresponding to the respective four filers 113 located within the filter section 110. The four liquid inlets IS3 are supplied with ink from the liquid container section 5 through the ejection control unit 20, and the filters 113 trap air bubbles and foreign matters contained in ink introduced through the liquid inlets IS3.

The filter section 110 includes openings 115 and 117. The opening 115 is opened along the −Y side edge of the filter section 110. The opening 115 communicates with one of the openings 351 provided in the printhead support section G3 when the printhead 100 is supported by the printhead support section G3. The opening 117 is opened along the +Y side edge of the filter section 110. The opening 117 communicates with one of the openings 352 provided in the printhead support section G3 when the printhead 100 is supported by the printhead support section G3.

The seal member 120 is located on the +Z side of the filter section 110. The seal member 120 has a substantially parallelogram shape with two opposite edges extending along the X-axis and the other two opposite edges extending in the RD-axis. At the four corners of the seal member 120, through-openings 123 that allow passage of later-described liquid channels 145 are provided. The thus-configured seal member 120 is made of an elastic material, for example, such as rubber. The seal member 120 includes openings 125 and 127. The opening 125 is opened along the −Y side edge of the seal member 120 and communicates with the opening 115 formed in the filter section 110. The opening 127 is opened along the +Y side edge of the seal member 120 and communicates with the opening 117 formed in the filter section 110.

Figure 14:
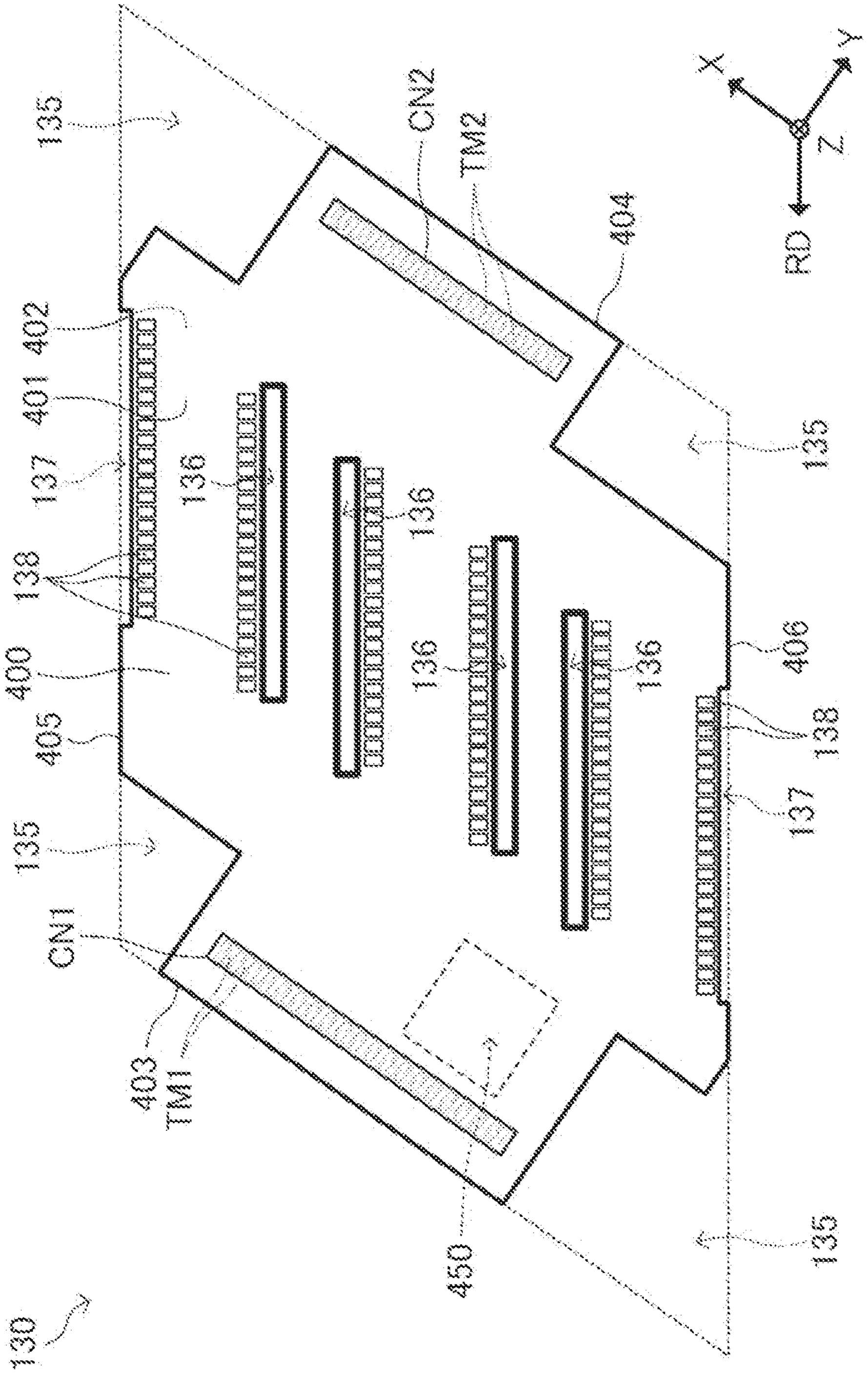
FIG. 14 is a diagram illustrating an example configuration of a circuit board.

The circuit board 130 is located on the +Z side of the seal member 120 and has a substantially parallelogram shape with two opposite edges extending along the X-axis and the other two opposite edges extending along the RD-axis. FIG. 14 is a diagram illustrating an example configuration of the circuit board 130. In FIG. 14, the components of the circuit board 130 are indicated by solid lines as seen in the Z-direction while the component of the circuit board 130 which is invisible from the Z-direction thereof is indicated by a dashed line.

As illustrated in FIG. 14, the circuit board 130 includes a substrate 400, connectors CN1 and CN2, and a semiconductor device 450. In addition to the substrate 400, connectors CN1 and CN2, and semiconductor device 450, the circuit board 130 may include not-illustrated electronic components including resistance elements, capacitance elements, induction elements, and semiconductor elements.

The substrate 400 has a substantially parallelogram shape including edges 403 and 404 opposite to each other and edges 405 and 406 opposite to each other. The substrate 400 includes a surface 401 and a surface 402 that is different from and is opposite to the surface 401. The substrate 400 is provided as follows. The edge 403 extends along the X-axis, and the edge 404 is located on the +Y side of the edge 403 and extends along the X-axis. The edge 405 extends along the RD-axis, and the edge 406 is located on the −X side of the edge 405 and extends along the RD-axis. In addition, the surface 401 is in the −Z side of the substrate 400, and the surface 402 is in the +Z side. In other words, the substrate 400 is positioned so that the edges 403 and 404 is opposite to each other along the Y-axis; the edges 405 and 406 are opposite to each other along the X-axis; the surface 401 faces vertically upward; and the surface 402 faces downward. In this case, the substrate 400 is preferably positioned so that the surface 401 is perpendicular to the vertical axis.

At the four corners of the substrate 400, notches 135 are provided. The notches 135 allow passage of the liquid channels 145 provided for the later-described holder 140. Herein, the notches 135 need to be configured so that the liquid channels 145 provided for the holder 140 located on the +Z side of the substrate 400 and the liquid inlets IS3 included in the filter section 110 located on the −Z side of the substrate 400 are coupled to communicate with each other. For example, the notches 135 may be holes penetrating the surfaces 401 and 402 so as to allow passage of the liquid channels 145.

The substrate 400 includes four FPC holes 136 penetrating the surfaces 401 and 402 of the substrate 400 and two FPC notches 137 formed by partially cutting off the edges 405 and 406 of the substrate 400. The four FPC holes 136 and FPC notches 137 allow passage of flexible printed circuits 346 included in the respective later-described six head chips 300. The flexible printed circuits 346 passing through the respective four FPC holes 136 and FPC notches 137 are electrically coupled to the coupling terminals 138 provided on the surface 401 of the substrate 400.

The substrate 400 may be a so-called multilayer board including multiple wiring layers between the surface 401 and the surface 402 opposite to the surface 401.

The connector CN1 includes plural terminals TM1. The connector CN1 is provided on the surface 401 of the substrate 400 so that the plural terminals TM1 are located in line along the edge 403. In the printhead 100, the connector CN1 passes through the opening 115 formed in the filter section 110 and the opening 125 formed in the seal member 120 to be exposed to the −Z side of the printhead 100. The connector CN2 includes plural terminals TM2. The connector CN2 is provided on the surface 401 of the substrate 400 so that the plural terminals TM2 are located in line along the edge 404. In the printhead 100, the connector CN2 is inserted through the opening 117 formed in the filter section 110 and the opening 127 formed in the seal member 120 to be exposed to the −Z side of the printhead 100.

On the surface 402 of the substrate 400, the semiconductor device 450 is located. The semiconductor device 450 constitutes at least a part of the aforementioned abnormality detection circuit 250. The semiconductor device 450 is a surface mount component and is electrically coupled to the substrate 400, for example, through bump electrodes. The semiconductor device 450 may be a surface mount component, which is, for example, a quad flat no-lead package (QFN) electrically coupled to the substrate 400 via plural electrodes formed along the four sides of the semiconductor device 450 or a quad flat package (QFP) electrically coupled to the substrate 400 via plural terminals instead of the plural electrodes included in the QFN.

When there is an abnormality in the semiconductor device 450 constituting at least a part of the abnormality detection circuit 250, malfunction of the printheads 100 could not be detected normally. In the first embodiment, the semiconductor device 450 constituting at least a part of the abnormality detection circuit 250 is provided on the surface 402 of the substrate 400 on the lower side, in order to reduce the likelihood of adherence of ink mist floating inside to the semiconductor device 450 and reduce the likelihood of adherence of ink leaking within the printhead 100 to the semiconductor device 450, thereby reducing the likelihood of malfunction due to ink mist adhering to the semiconductor device 450 constituting at least a part of the abnormality detection circuit 250.

Back to FIG. 13, the holder 140 is located on the +Z side of the circuit board 130 and has a substantially parallelogram shape with two opposite edges extending along the X-axis and the other two opposite edges extending in the RD-axis. The holder 140 includes holder members 141, 142, and 143. The holder members 141 to 143 are stacked along the Z-axis, from the −Z side to the +Z side, in the sequence of the holder members 141, 142, and 143. The holder members 141 and 142 are joined with an adhesive or the like, and the holder members 142 and 143 are joined with an adhesive or the like.

Within the holder member 143, a not-illustrated accommodation space with an opening on the +Z side thereof is formed. The accommodation space formed within the holder member 143 accommodates the head chips 300. Herein, the accommodation space formed within the holder member 143 may include plural spaces that can accommodate the respective six head chips 300 or may include a single space that can accommodate the six head chips 300 together.

The holder 140 is provided with slits 146 corresponding to the respective six head chips 300. The slits 146 allow passage of the respective flexible printed circuits 346 included in the later-described six head chips 300. The slits 146 formed in the holder 140 are provided corresponding to the four FPC holes 136 and FPC notches 137 included in the circuit board 130.

At the four corners of the −Z side surface of the holder 140, the four liquid channels 145 are provided. The liquid channels 145 run through the respective notches 135 of the circuit board 130 and run through the through-openings 123 provided in the seal member 120 to be coupled to the filter section 110.

The fixing plate 150 is located on the +Z side of the holder 140 and seals the accommodation space that is formed within the holder member 143 and accommodates the six head chips 300. The fixing plate 150 includes a planar section 151 and bent sections 152, 153, and 154. The planar section 151 has a substantially parallelogram shape with two opposite edges extending along the X-axis and the other two opposite edges extending along the RD-axis. The planar section 151 includes six openings 155 to expose the head chips 300. Each head chip 300 is fixed to the fixing plate 150 so that the two nozzle rows thereof are exposed to the +Z side of the printhead 100 through one of the openings 155 provided in the planar section 151.

The bent section 152 is a member combined with the planar section 151. The bent section 152 is coupled to one of the edges of the planar section 151 extending along the X-axis and is bent to the −Z side of the planar section 151. The bent section 153 is a member combined with the planar section 151. The bent section 153 is coupled to one of the edges of the planar section 151 extending along the RD-axis and is bent to the −Z side thereof. The bent section 154 is a member combined with the planar section 151. The bent section 154 is coupled to the other edge of the planar section 151 extending in the RD-axis and is bent to the −Z side thereof.

The head chips 300 are located on the +Z side of the holder 140 and on the −Z side of the fixing plate 150. The head chips 300 are accommodated within the accommodation space formed by the holder member 143 of the holder 140 and the fixing plate 150 and are fixed to the holder member 143 and fixing plate 150.

Figure 15:
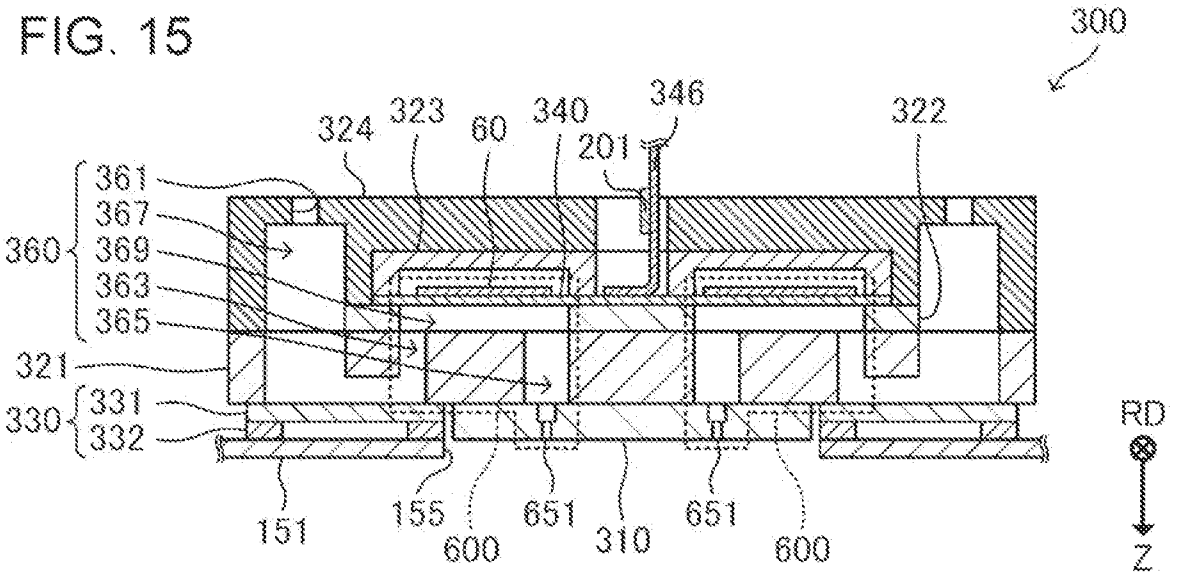
FIG. 15 is a diagram illustrating a schematic structure of a head chip.

FIG. 15 is a diagram illustrating a schematic structure of one of the head chips 300. FIG. 15 illustrates a cross section of the head chip 300 taken perpendicular to the RD-axis, including at least one of the nozzles 651. As illustrated in FIG. 15, the head chip 300 includes: a nozzle plate 310 including the plural nozzles 651 configured to eject ink; a channel forming substrate 321 defining communicating channels 365, individual channels 363, and reservoirs 367; a pressure chamber substrate 322 defining pressure chambers 369; a protection substrate 323; a compliance section 330; a vibrating plate 340; the piezo elements 60; the flexible printed circuit 346; and a case 324 defining the reservoirs 367 and liquid inlets 361. The printhead 100 thus includes the piezo elements 60 as an example of drive elements.

The head chip 300 is supplied with ink through the liquid inlets 361 from the not-illustrated outlets provided for the holder 140. The ink supplied to the head chip 300 reaches each nozzle 651 through an ink channel 360 including the corresponding reservoir 367, individual channel 363, pressure chamber 369, and communicating channel 365. The ink having reached the nozzle 651 is ejected by the piezo element 60 being driven.

Specifically, the ink channel 360 is formed by the channel forming substrate 321, pressure chamber substrate 322, and case 324 stacked along the Z-axis. Ink introduced through the liquid inlet 361 into the case 324 is retained in the reservoir 367. The reservoir 367 is a common channel communicating with the plural individual channels 363 corresponding to the plural nozzles 651 constituting a nozzle row. The ink retained in the reservoir 367 is supplied to the pressure chambers 369 through the individual channels 363.

Each pressure chamber 369 applies pressure to the retained ink. The ink supplied to the pressure chamber 369 is thereby ejected from the nozzle 651 through the communicating channel 365. On the −Z side of the pressure chamber 369, the vibrating plate 340 is located so as to seal the pressure chamber 369, and on the −Z side of the vibrating plate 340, the piezo element 60 is located. The piezo element 60 is composed of a piezoelectric body and a pair of electrodes on both sides of the piezoelectric body. One of the pair of electrodes included in the piezo element 60 is supplied with the drive signal VOUT via the flexible printed circuit 346 while the other electrode of the piezo element 60 is supplied with the reference voltage signal VBS via the flexible printed circuit 346. The piezoelectric body is displaced depending on the potential difference produced between the pair of electrodes. In other words, the piezo element 60 including the piezoelectric body is driven. As the piezo element 60 is driven, the vibrating plate 340 provided with the piezo element 60 deforms to change the internal pressure of the pressure chamber 369. This causes the ink retained in the pressure chamber 369 to be ejected through the communicating channel 365 from the nozzle 651.

On the +Z side of the channel forming substrate 321, the nozzle plate 310 and compliance section 330 are fixed. The nozzle plate 310 is located on the +Z side of the communicating channel 355. In the nozzle plate 310, the plural nozzles 651 are arranged in lines along the RD-axis. In other words, the nozzle plate 310 includes the plural nozzles 651 configured to eject ink. The compliance section 330 is located on the +Z side of the reservoir 367 and individual channels 363 and includes a sealing film 331 and a support 332. The sealing film 331 is a flexible film member and seals the +Z side of the reservoir 367 and individual channels 363. The outer edge of the sealing film 331 is supported by the frame-like support 332. The +Z side of the support 332 is fixed to the planar section 151 of the fixing plate 150. The thus-configured compliance section 330 protects the head chip 300 and reduces fluctuation in pressure of ink within the reservoir 367 and within the individual channels 363.

Herein, the configuration including the piezo element 60, vibrating plate 340, nozzle 651, individual channel 363, pressure chamber 369, and communicating channel 365 corresponds to one of the ejecting sections 600.

In the flexible printed circuit 346, a semiconductor device 201 is mounted as a chip-on-film (COF). The semiconductor device 201 includes the drive signal selection circuit 200. The print data signals SI1 to SIn, clock signal SCK, latch signal LAT, change signal CH, drive voltage signals VDR1 and VDR2, and voltages VHV and VDD are transmitted in the flexible printed circuit 346 to be supplied to the semiconductor device 201. Based on the supplied print data signals SI1 to SIn, clock signal SCK, latch signal LAT, change signal CH, drive voltage signals VDR1 and VDR2, and voltages VHV and VDD, the semiconductor device 201 generates the drive signals VOUT corresponding to the plural piezo elements 60. The semiconductor device 201 supplies the generated drive signals VOUT to the piezo elements 60 via the flexible printed circuit 346.

The ink distributed in the ejection control unit 20 is supplied to the printhead 100 through the four liquid inlets IS3. After air bubbles and foreign matters are removed from the ink supplied to the printhead 100 in the filters 113, the ink is supplied to the holder 140 via the four liquid channels 145. The holder 140 divides the supplied ink corresponding to the head chips 300 and supplies the ink via the not-illustrated outlets provided in the accommodation space formed within the holder member 143, to the liquid inlets 361 included in the head chips 300. The ink distributed in the ejection control unit 20 is thereby supplied to each head chip 300. The ink supplied to the head chip 300 reaches each nozzle 651 via the ink channel 360 including the reservoir 367, individual channel 363, pressure chamber 369, and communicating channel 365.

Each cable FC1 runs by the −Y side of the introduction channel section G1 and supply control section G2, runs through the corresponding opening 351 provided in the printhead support section G3, and runs through the opening 115 included in the filter section 110 and the openings 125 included in the seal member 120. The other end of the cable FC1 is thus electrically coupled to the connector CN1 included in the circuit board 130. Each cable FC2 runs by the +Y side of the introduction channel section G1 and supply control section G2, runs through the corresponding opening 352 provided in the printhead support section G3, and runs through the opening 117 included in the filter section 110 and the opening 127 included in the seal member 120. The other end of the cable F2 is electrically coupled to the connector CN2 included in the circuit board 130. The diagnosis control signal HC, print data signals SI1 to SIn, clock signal SCK, latch signal LAT, change signal CH, drive voltage signals VDR1 and VDR2, reference voltage signal VBS, and voltages VHV and VDD that are outputted from the ejection control unit 20 are thereby supplied to the printhead 100.

The diagnosis control signal HC, print data signals SI1 to SIn, clock signal SCK, latch signal LAT, change signal CH, drive voltage signals VDR1 and VDR2, reference voltage signal VBS, and voltages VHV and VDD supplied to the printhead 100 are transmitted in the substrate 400 and are supplied to the semiconductor device 201 including the drive signal selection circuit 200 via the semiconductor device 450 constituting at least a part of the abnormality detection circuit 250, the coupling terminals 138, and the flexible printed circuit 346. The semiconductor device 201 generates the drive signals VOUT corresponding to the respective piezo elements 60 included in the head chip 300 based on the supplied signals and supplies the generated drive signals VOUT to the corresponding piezo elements 60. The piezo elements 60 are driven based on the drive signals VOUT, so that ink is ejected from the nozzles 651 in response to the piezo elements 60 being driven.

1. 5. 4 Electrical Coupling Structure Between Ejection Control Unit and Printhead As described above, the other end of the cable FC1 included in the ejection control unit 20 is electrically coupled to the connector CN1 provided for the circuit board 130, and the other end of the cable FC2 is electrically coupled to the connector CN2 provided for the circuit board 130. This electrically couples the ejection control unit 20 and printhead 100, thus supplying to the printhead 100, the various signals including the diagnosis control signal HC, print data signals SI1 to SIn, clock signal SCK, latch signal LAT, change signal CH, drive voltage signals VDR1 and VDR2, reference voltage signal VBS, and voltages VHV and VDD that are outputted from the ejection control unit 20. The following description is given of example structures of the cables FC1 and FC2 electrically coupling the ejection control unit 20 and printhead 100 and example structures of the connectors CN1 and CN2 coupled to the cables FC1 and FC2. In addition, the following description includes example electrical coupling of the cables FC1 and FC2 to the connectors CN1 and CN2. In the following description, the cables FC1 and FC2 are flexible flat cables of the same configuration and are just referred to as a cable FC when it is unnecessary to distinguish the same. The connectors CN1 and CN2 are FFC connectors of the same configuration and are just referred to as a connector CN when it is unnecessary to distinguish the same. This means that the other end of the cable FC is electrically coupled to the connector CN in the following description.

Figure 16:
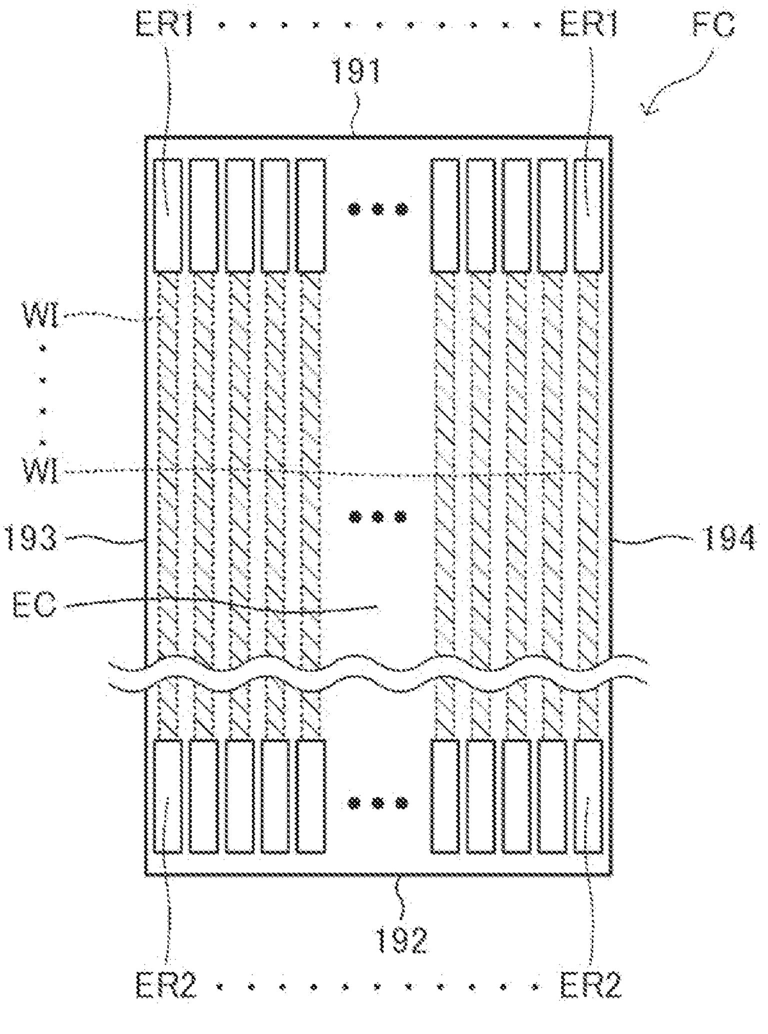
FIG. 16 is a diagram illustrating a schematic structure of a cable.

FIG. 16 is a diagram illustrating a schematic structure of the cable FC. The cable FC has a substantially rectangular shape including short edges 191 and 192 opposite to each other and long edges 193 and 194 opposite to each other. The cable FC includes plural terminals ER1 arranged along the short edge 191, plural terminals ER2 arranged along the short edge 192, and plural wires WI electrically coupling the plural terminals ER1 and plural terminals ER2.

Specifically, q terminals ER1 are arranged on the short edge 191 side of the cable FC, from the long edge 193 side to the long edge 194 side, and q terminals ER2 are arranged on the short edge 192 side of the cable FC, from the long edge 193 side to the long edge 194 side. In the cable FC, q wires WI electrically coupling the terminals ER1 and the respective terminals ER2 are arranged, from the long edge 193 side to the long edge 194 side. The k-th (k is an integer from 1 to q) terminal ER1 from the long edge 193 side toward the long edge 194 side and the k-th terminal ER2 from the long edge 193 side toward the long edge 194 side are electrically coupled with the k-th wire WI from the long edge 193 side toward the long edge 194 side.

The q wires WI are isolated from one another with an insulator EC and are isolated from the outside of the cable FC with the insulator EC. The q terminals ER1 of the cable FC are electrically coupled to the corresponding coupling section 424 or 425 of the ejection control unit 20 while the q terminals ER2 are electrically coupled to the connector CN of the printhead 100. The configuration of the cable FC illustrated in FIG. 16 is just an example, and the cable FC is not limited thereto. For example, the q terminals ER1 may be provided on the different surface of the cable FC from the q terminals ER2. The number of terminals ER1, terminals ER2, or wires WI included in the cable FC1 may be the same as or different from the number of terminals ER1, terminals ER2, or wires WI included in the cable FC2.

Herein, q corresponds to the number of terminals ER1, terminals ER2, or wires WI included in the cable FC, which is an integer not less than 1.

Figure 17:
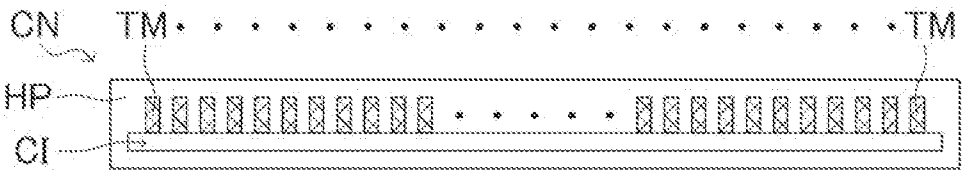
FIG. 17 is a diagram illustrating a schematic structure of a connector.

Next, the configuration of the connector CN is described. FIG. 17 is a diagram illustrating a schematic structure of the connector CN. As illustrated in FIG. 17, the connector CN includes: a cable attachment section CI in which the cable FC is inserted and attached; q terminals TM which are electrically coupled to the q terminals ER2 included in the cable FC; and a housing HP which isolates the q terminals TM from one another, holds the q terminals TM, and forms the cable attachment section CI. The q terminals TM are arranged along a same longitudinal axis of the cable attachment section CI. To the cable attachment section CI, the cable FC is attached. In this case, the k-th terminal ER2 among the q terminals ER2 included in the cable FC comes into electrical contact with the k-th terminal TM among the q terminals TM included in the connector CN. The cable FC and connector CN are thereby electrically coupled. Herein, the q terminals TM correspond to plural terminals TM1 in the connector CN1 and correspond to the plural terminals TM2 in the connector CN2.

Figure 18:
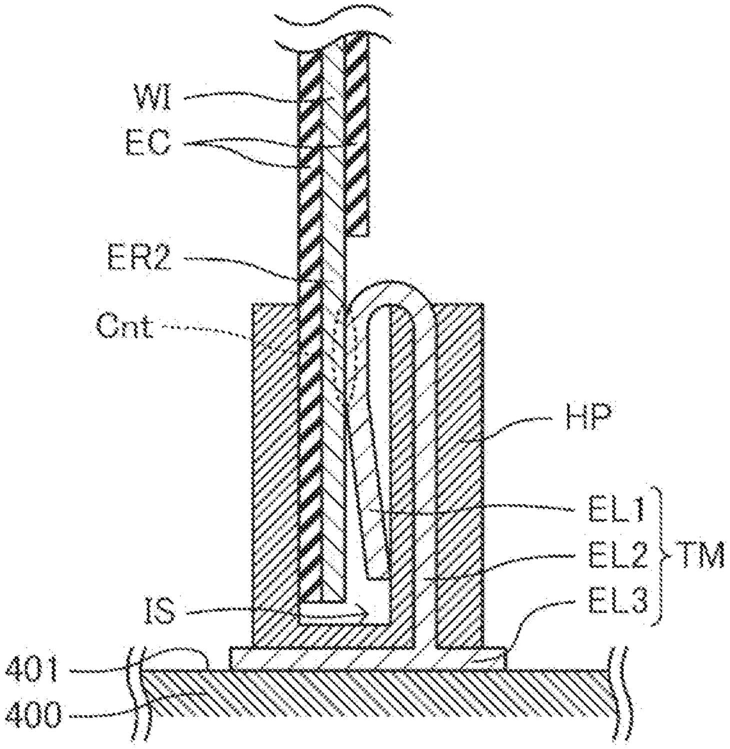
FIG. 18 is a diagram illustrating an example case where the cable is attached to the connector.

A specific example of electrical coupling between the cable FC and connector CN is described using FIG. 18. FIG. 18 is a diagram illustrating an example in which the cable FC is attached to the connector CN. As illustrated in FIG. 18, each terminal TM of the connector CN includes a cable holding section EL1, a housing insertion section EL2, and a substrate attachment section EL3. The substrate attachment section EL3 is located in the bottom of the connector CN and is provided between the housing HP and substrate 400. The substrate attachment section EL3 is electrically coupled to a not-illustrated electrode provided in the substrate 400 with solder or the like, for example. The housing insertion section EL2 penetrates the housing HP. The housing insertion section EL2 electrically couples the substrate attachment section EL3 and cable holding section EL1. The cable holding section EL1 is curved to protrude in the cable attachment section CI. When the cable FC is attached to the cable attachment section CI, the cable holding section EL1 and the terminal ER2 come into electrical contact through a contact Cnt. The cable FC and connector CN are thereby electrically coupled, so that the ejection control unit 20 and the printhead 100 are electrically coupled. This allows transmission of various signals between the ejection control unit 20 and printhead 100.

1. 6 Inspection Method of Printhead 1. 6. 1 Functional Configuration of Abnormality Detection Circuit The description is given of a method of inspecting whether the signals supplied to the printhead 100 are normal in the thus-configured liquid ejecting apparatus 1. In the liquid ejecting apparatus 1 according to the first embodiment, as one of the ways to inspect whether there is an abnormality in the printhead 100, the abnormality detection circuit 250 included in the printhead 100 inspects whether the signals supplied from the ejection control unit 20 to the printhead 100 are normal. When the abnormality detection circuit 250 determines that the signals supplied from the ejection control unit 20 are normal, the abnormality detection circuit 250 permits ejection of ink from the printhead 100. When the abnormality detection circuit 250 determines that any of the signals supplied from the ejection control unit 20 is not normal, the abnormality detection circuit 250 does not permit ejection of ink from the printhead 100. In other words, when determining that the signals supplied to the printhead 100 are normal, the detection circuit 250 permits printing, and when determining that any of the signals supplied to the printhead 100 is not normal, the detection circuit 250 does not permit printing. This reduces the likelihood of erroneous operations, breakdown, or the like occurring in the printhead 100 due to supply of not-intended voltage signal to the printhead 100.

For explanation of the method of inspecting whether the signals supplied to the printhead 100 are normal, first, the functional configuration of the abnormality detection circuit 250 which inspects whether the signals supplied to the printhead 100 are normal is described.

Figure 19A:
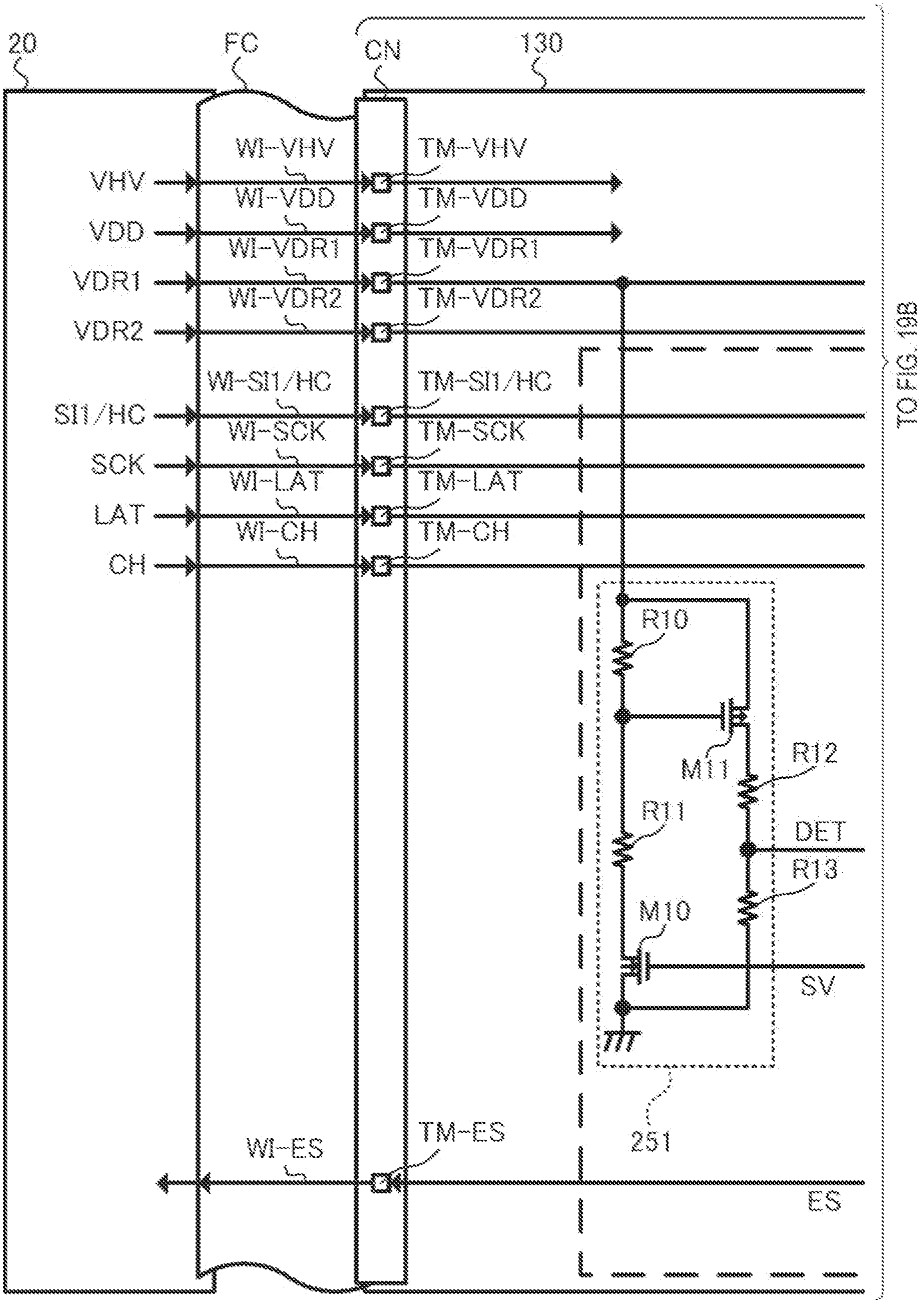
FIGS. 19A and 19B are diagrams illustrating a functional configuration of an abnormality detection circuit.
Figure 19B:
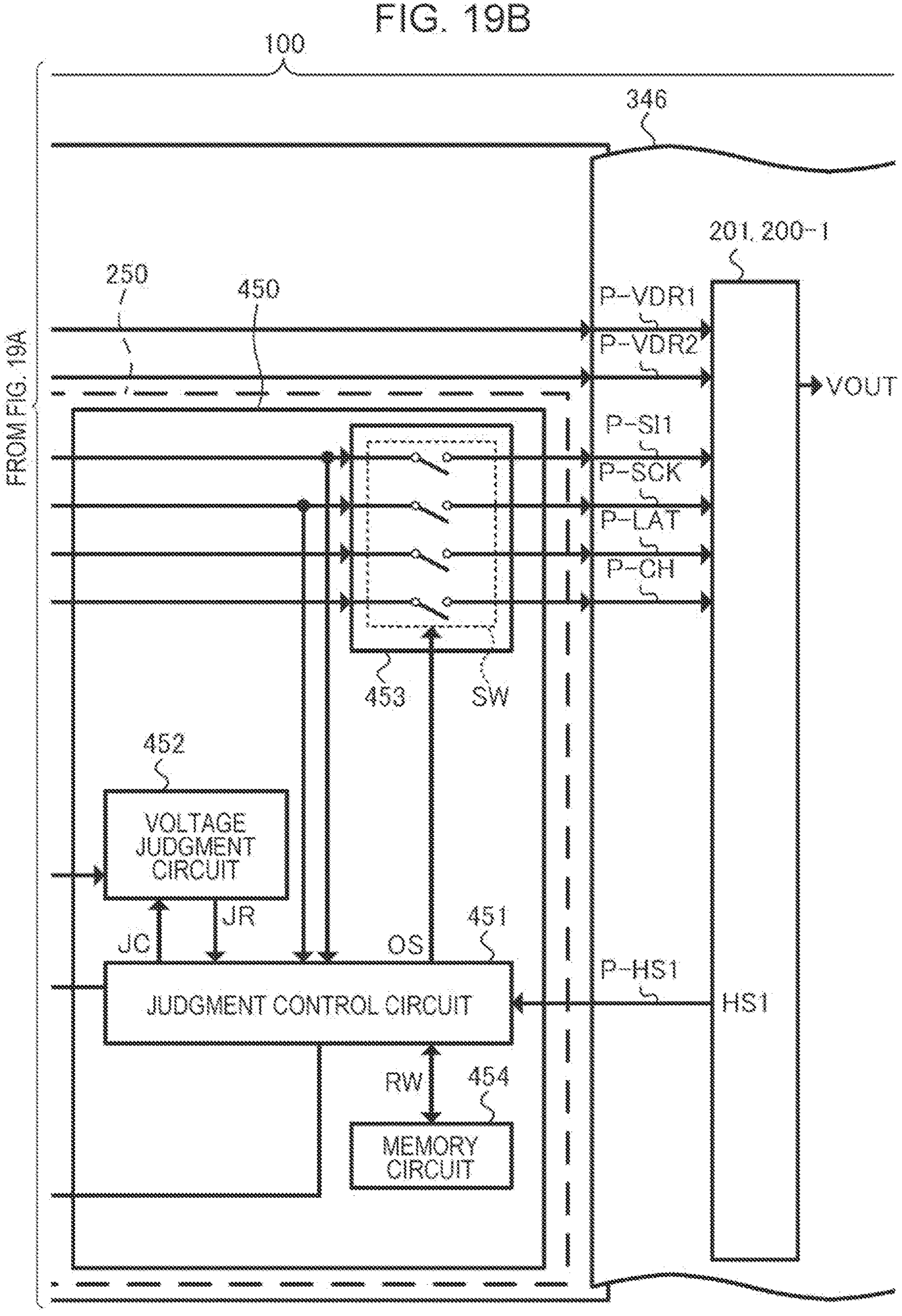

FIGS. 19A and 19B are diagrams illustrating a functional configuration of the abnormality detection circuit 250. In addition to the block diagram of the abnormality detection circuit 250 illustrating the functional configuration thereof, FIGS. 19A and 19B illustrate the ejection control unit 20 outputting the various signals to the printhead 100 including the abnormality detection circuit 250; the cable FC transmitting the signals outputted from the ejection control unit 20 to the printhead 100; the connector CN coupled to the cable FC; the circuit board 130 provided with the semiconductor device 450 included in the abnormality detection circuit 250; the semiconductor device 201 including the drive signal selection circuit 200-1 which is supplied with the outputs of the abnormality detection circuit 250; and the flexible printed circuit 346 on which the semiconductor device 201 is mounted. In FIGS. 19A and 19B, illustration of the drive signal selection circuits 200-2 to 200-6 included in the printhead 100, the print data signals SI2 to SI6 inputted to the drive signal selection circuits 200-2 to 200-6, and the head status signals HS2 to HS6 outputted by the drive signal selection circuits 200-2 to 200-6 is omitted.

In the following description, among the plural wires WI included in the cable FC and the plural terminals TM included in the connector CN, the wire WI and terminal TM transmitting the voltage VHV are referred to as a wire WI-VHV and a terminal TM-VHV, respectively. The wire WI and terminal TM transmitting the voltage VDD are referred to as a wire WI-VDD and a terminal TM-VDD, respectively. The wire WI and terminal TM transmitting the drive voltage signal VDR1 are referred to as a wire WI-VDR1 and a terminal TM-VDR1, respectively. The wire WI and terminal TM transmitting the drive voltage signal VDR2 are referred to as a wire WI-VDR2 and a terminal TM-VDR2, respectively. The wire WI and terminal TM transmitting the print data signal SI1 and diagnosis control signal HC are referred to as a wire WI-SI1/HC and a terminal TM-SI1/HC, respectively. The wire WI and terminal TM transmitting the clock signal SCK are referred to as a wire WI-SCK and a terminal TM-SCK, respectively. The wire WI and terminal TM transmitting the latch signal LAT are referred to as a wire WI-LAT and a terminal TM-LAT, respectively. The wire WI and terminal TM transmitting the change signal CH are referred to as a wire WI-CH and a terminal TM-CH, respectively. The wire WI and terminal TM transmitting the judgment result signal ES are referred to as a wire WI-ES and a terminal TM-ES, respectively.

The cable FC as a flexible flat cable includes: the wire WI-VDR1 transmitting the drive voltage signal VDR1 including the drive signal COMA to be supplied to the piezo elements 60; the wire WI-VDR2 transmitting the drive voltage signal VDR2 including the drive signal COMB to be supplied to the piezo elements 60; the wire WI-SI1/HC transmitting the print data signal SI1 for allowing the printhead 100 to execute printing and the diagnosis control signal HC; the wire WI-VHV transmitting the voltage VHV as one of the power supply voltages; the wire WI-VDD transmitting the voltage VDD as another one of the power supply voltages; the wire WI-SCK transmitting the clock signal SCK; and the wire WI-ES transmitting the judgment result signal ES indicating whether there is an abnormality in the printhead 100.

The connector CN to which the cable FC is attached includes: the terminal TM-VDR1 transmitting the drive voltage signal VDR1 including the drive signal COMA to be supplied to the piezo elements 60; the terminal TM-VDR2 transmitting the drive voltage signal VDR2 including the drive signal COMB to be supplied to the piezo elements 60; the terminal TM-SI1/HC transmitting the print data signal SI1 for allowing the printhead 100 to execute printing and the diagnosis control signal HC; the terminal TM-VHV transmitting the voltage VHV as one of the power supply voltages; the terminal TM-VDD transmitting the voltage VDD as another one of the power supply voltages; the terminal TM-SCK transmitting the clock signal SCK; and the terminal TM-ES transmitting the judgment result signal ES indicating whether there is an abnormality in the printhead 100.

In the following description, among traces formed on the flexible printed circuit 346, the trace transmitting the drive voltage signal VDR1 is referred to as a wire P-VDR1; the trace transmitting the drive voltage signal VDR2 is referred to as a wire P-VDR2; the trace transmitting the clock signal SCK is referred to as a wire P-SCK; the trace transmitting the latch signal LAT is referred to as a wire P-LAT; the trace transmitting the change signal CH is referred to as a wire P-CH; the trace transmitting the print data signal SI1 is referred to as a wire P-SI1; and the trace transmitting the head status signal HS1 is referred to as a wire P-HS1.

As illustrated in FIGS. 19A and 19B, the abnormality detection circuit 250 includes the semiconductor device 450 and a voltage input switching circuit 251. The semiconductor device 450 includes a judgment control circuit 451, a voltage judgment circuit 452, an output switching circuit 453, and a memory circuit 454.

The judgment control circuit 451 is electrically coupled to the terminals TM-SI1/HC and TM-SCK. The judgment control circuit 451 acquires the signal inputted from the ejection control unit 20 through the wire WI-SI1/HC and terminal TM-SI1/HC at the timing based on the signal inputted from the ejection control unit 20 through the wire WI-SCK and terminal TM-SCK. In response to the acquired signal inputted from the ejection control unit 20 through the wire WI-SI1/HC and terminal TM-SI1/HC, the judgment control circuit 451 controls operation of each configuration of the semiconductor device 450.

In response to the signal inputted from the ejection control unit 20 through the wire WI-SI1/HC and terminal TM-SI1/HC, the judgment control circuit 451 reads information stored in the memory circuit 454 and generates a memory circuit control signal RW for storing a desired information in the memory circuit 454. The judgment control circuit 451 outputs the generated memory circuit control signal RW to the memory circuit 454. The memory circuit 454 includes a temporary memory area such as a register or a random access memory (RAM) and a permanent memory area such as a storage or a read only memory (ROM).

In response to the signal inputted from the ejection control unit 20 through the wire WI-SI1/HC and terminal TM-SI1/HC, the judgment control circuit 451 outputs a voltage switching signal SV to the voltage input switching circuit 251 provided outside of the semiconductor device 450.

The voltage input switching circuit 251 includes resistors R10, R11, R12, and R13 and transistors M10 and M11. In the description of the first embodiment, the transistor M10 is an n-channel field-effect transistor (FET) while the transistor M11 is a p-channel FET.

One end of the resistor R10 is electrically coupled to the terminal TM-VDR1 transmitting the drive voltage signal VDR1 while the other end thereof is electrically coupled to one end of the resistor R10. The other end of the resistor R11 is electrically coupled to the drain of the transistor M10. The gate of the transistor M10 receives the voltage switching signal SV outputted from the semiconductor device 450, and the source thereof is supplied with the ground potential. The source of the transistor M11 is electrically coupled to the terminal TM-VDR1 transmitting the drive voltage signal VDR1; the gate thereof is electrically coupled to the other end of the resistor R10 and the one end of the resistor R11; and the drain thereof is electrically coupled to one end of the resistor R12. The other end of the resistor R12 is electrically coupled to one end of the resistor R13, and the other end of the resistor R13 is supplied with the ground potential. The voltage input switching circuit 251 outputs the signal produced at a junction coupled to the other end of the resistor R12 and the one end of the resistor R13 as a voltage detection signal DET to the semiconductor device 450. The judgment control circuit 451 uses the voltage switching signal SV to control operations of the transistors M10 and M11 included in the voltage input switching circuit 251. The voltage input switching circuit 251 outputs to the semiconductor device 450, the voltage detection signal DET depending on the potential of the terminal TM-VDR1, based on the voltage switching signal SV.

The judgment control circuit 451 uses the memory circuit control signal RW to read information that is stored in the memory circuit 454 and indicates a judgment condition in the voltage judgment circuit 452. The judgment control circuit 451 generates a judgment condition signal JC including the read information and outputs the judgment condition signal JC to the voltage judgment circuit 452. Together with the judgment condition signal JC outputted from the judgment control circuit 451, the voltage judgment circuit 452 receives the voltage detection signal DET outputted from the voltage input switching circuit 251. The voltage judgment circuit 452 determines based on the received judgment condition signal JC and voltage detection signal DET, whether the voltage detection signal DET is normal. The voltage judgment circuit 452 then generates a judgment result signal JR indicating the result of determination and outputs the judgment result signal JR to the judgment control circuit 451.

The judgment control circuit 451 generates a switch control signal OS based on the judgment result signal JR received from the voltage judgment circuit 452 and outputs the switch control signal OS to the output switching circuit 453.

The output switching circuit 453 includes a switch group SW including plural switches. One end of one of the plural switches included in the switch group SW is electrically coupled to the terminal TM-SI1/HC while the other end thereof is electrically coupled to the wire P-SI1. One end of another one of the plural switches included in the switch group SW is electrically coupled to the terminal TM-SCK while the other end thereof is electrically coupled to the wire P-SCK. Similarly, one end of still another one of the plural switches included in the switch group SW is electrically coupled to the terminal TM-LAT while the other end thereof is electrically coupled to the wire P-LAT. One end of still another one of the plural switches included in the switch group SW is electrically coupled to the terminal TM-CH while the other end thereof is electrically coupled to the wire P-CH.

The plural switches included in the switch group SW of the output switching circuit 453 are controlled to switch between conducting and non-conducting states, depending on the switch control signal OS received from the judgment control circuit 451. Specifically, the output switching circuit 453 switches between the signals from the terminals TM-SI1/HC, TM-SCK, TM-LAT, and TM-CH are transmitted to the corresponding wires P-SI1, P-SCK, P-LAT, and P-CH, respectively.

The switch group SW may additionally include a switch with one end electrically coupled to the terminal TM-VDR1 and the other end electrically coupled to the wire P-VDR1 and a switch with one end electrically coupled to the terminal TM-VDR2 and the other end electrically coupled to the wire P-VDR2. The switch group SW does not need to include all the switches with the respective ends electrically coupled to the terminals TM-SI1/HC, TM-SCK, TM-LAT, and TM-CH, and the other ends electrically coupled to the wire P-SI1, P-SCK, P-LAT, and P-CH. The output switching circuit 453 needs to include switches configured to control electrical coupling of at least any one of the terminals TM-SCK, TM-LAT, TM-CH, TM-VDR1, and TM-VDR2 to the corresponding one of the wires P-SCK, P-LAT, P-CH, P-VDR1, and P-VDR2.

The plural switches included in the switch group SW may include a transistor, such as an FET, for example. In this case, the plural switches included in the switch group SW are controlled to switch between the conducting and non-conducting states, depending on the logic level of the switch control signal OS outputted from the judgment control circuit 451. The switches included in the switch group SW is not limited to the configuration illustrated in FIG. 19B. For example, the signal transmission between the terminals TM-SCK, TM-LAT, TM-CH, TM-VDR1, and TM-VDR2 and the respective wires P-SCK, P-LAT, P-CH, P-VDR1, and P-VDR2 may be controlled by, for example, coupling and decoupling the ground potential and each of the wires transmitting the signals.

In the following description, the plural switches included in the switch group SW according to the first embodiment are controlled to the conducting state between the one end and the other end when the received switch control signal OS from the judgment control circuit 451 is high level and are controlled to the non-conducting state between the one end and the other end when the received switch control signal OS is low level.

On the other hand, the judgment control circuit 451 receives the head status signal HS1 indicating the status of the head chip 300-1 corresponding to the drive signal selection circuit 200-1. The judgment control circuit 451 also receives the head status signals HS2 to HS6 indicating the statuses of the head chips 300-2 to 300-6 corresponding to the drive signal selection circuits 200-2 to 200-6, which are not illustrated in FIGS. 19A and 19B. Based on the judgment result signal JR and the head status signals HS1 to HS6, the judgment control circuit 451 generates the judgment result signal ES indicating whether the signals supplied to the printhead 100 are normal and whether the drive signal selection circuits 200-1 to 200-6 included in the printhead 100 are normal and outputs the judgment result signal ES to the ejection control unit 20 via the terminal TM-ES and wire WI-ES.

In the thus-configured abnormality detection circuit 250, the voltage input switching circuit 251, judgment control circuit 451, and voltage judgment circuit 452 determines, based on the signal transmitted by the terminal TM-SI1/HC, whether the potential of the signal transmitted by the wire WI-VDR1 and terminal TM-VDR1 is normal. Based on the result of determination, the judgment control circuit 451 and output switching circuit 453 control the plural switches included in the switch group SW of the output switching circuit 453 to switch whether or not to supply the signals transmitted by the terminals TM-SI1/HC, TM-SCK, TM-LAT, and TM-CH to the drive signal selection circuit 200-1 via the wires P-SI1, P-SCK, P-LAT, and P-CH. This controls generation of the drive signals VOUT by the drive signal selection circuits 200-1 to 200-6. The abnormality detection circuit 250 thus permits ejection of ink from the printhead 100 when the signals supplied to the printhead 100 are normal and does not permit ejection of ink from the printhead 100 when any of the signals supplied to the printhead 100 is not normal.

As illustrated in FIGS. 11 to 14, in the liquid ejecting apparatus 1 according to the first embodiment, the ejection control unit 20 transmits the drive voltage signals VDR1 and VDR2, voltages VHV and VDD, diagnosis control signal HC, print data signal SI1, clock signal SCK, latch signal LAT, change signal CH, and judgment result signal ES via the cables FC1 and FC2 as the cables FC and connectors CN1 and CN2 as the connectors CN. In the thus-configured liquid ejecting apparatus 1, preferably, the drive voltage signals VDR1 and VDR2, voltages VHV and VDD, diagnosis control signal HC, print data signal SI, clock signal SCK, latch signal LAT, change signal CH, and judgment result signal ES that are supplied to the abnormality detection circuit 250 included in the printhead 100 are transmitted by the same cable FC and same connector CN. Furthermore, in the circuit board 130 as illustrated in FIG. 14, preferably, the drive voltage signals VDR1 and VDR2, voltages VHV and VDD, diagnosis control signal HC, print data signal SI, clock signal SCK, latch signal LAT, change signal CH, and judgment result signal ES are transmitted by the cable FC1 and connector CN1 provided in the vicinity of the semiconductor device 450 included in the abnormality detection circuit 250.

Such a configuration can shorten the length of wires transmitting the signals to be supplied to the abnormality detection circuit 250 as well as reduce the difference in length between the wires transmitting the various signals. This reduces the likelihood of superposition of noise onto the signals to be supplied to the abnormality detection circuit 250 and reduces the likelihood that the accuracy of the signals to be supplied to the abnormality detection circuit 250 degrades.

1. 6. 2 Operation of Abnormality Detection Circuit

Figure 20:
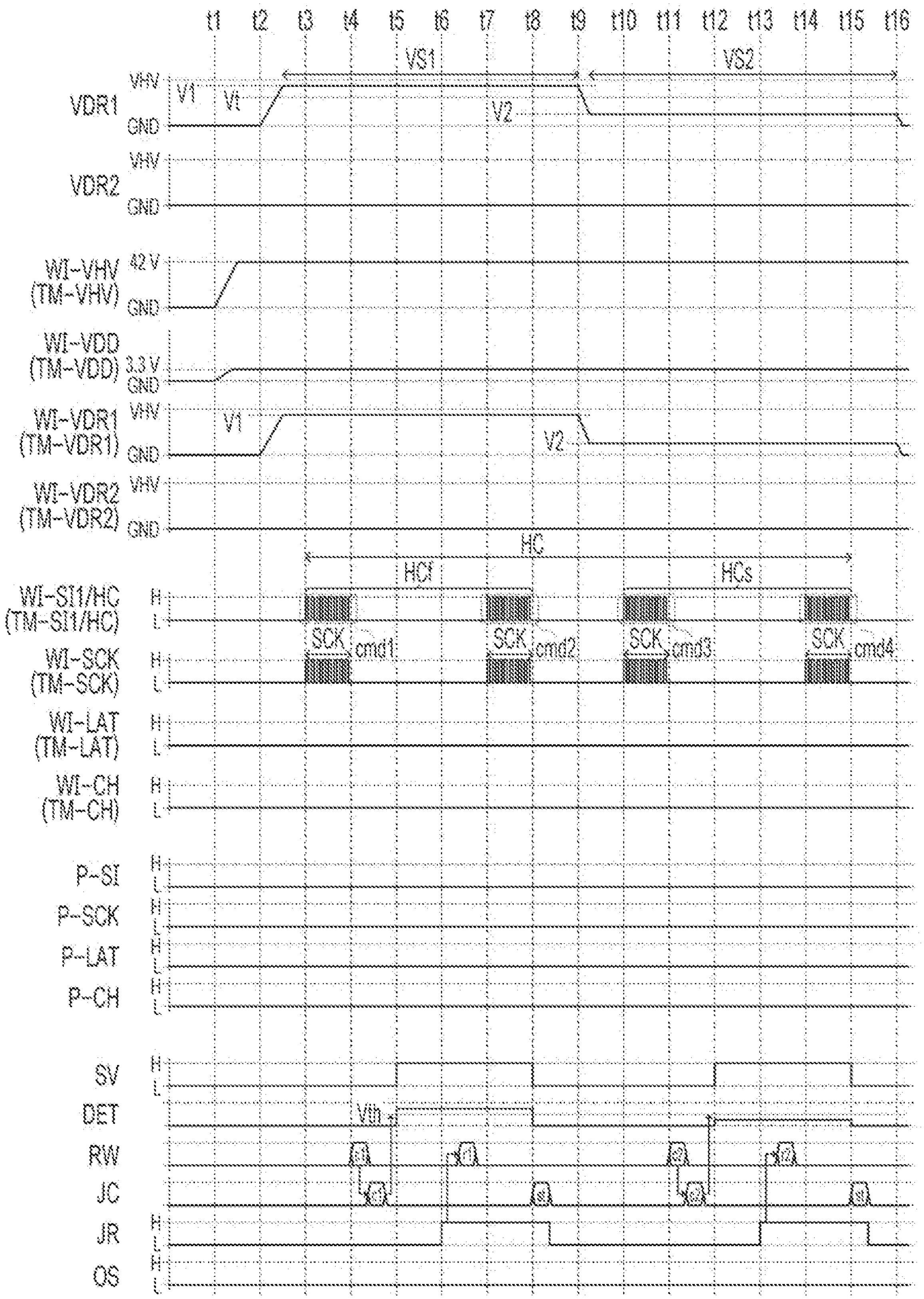
FIG. 20 is a diagram illustrating an example operation of the abnormality detection circuit when signals supplied to the printhead are normal.
Figure 21:
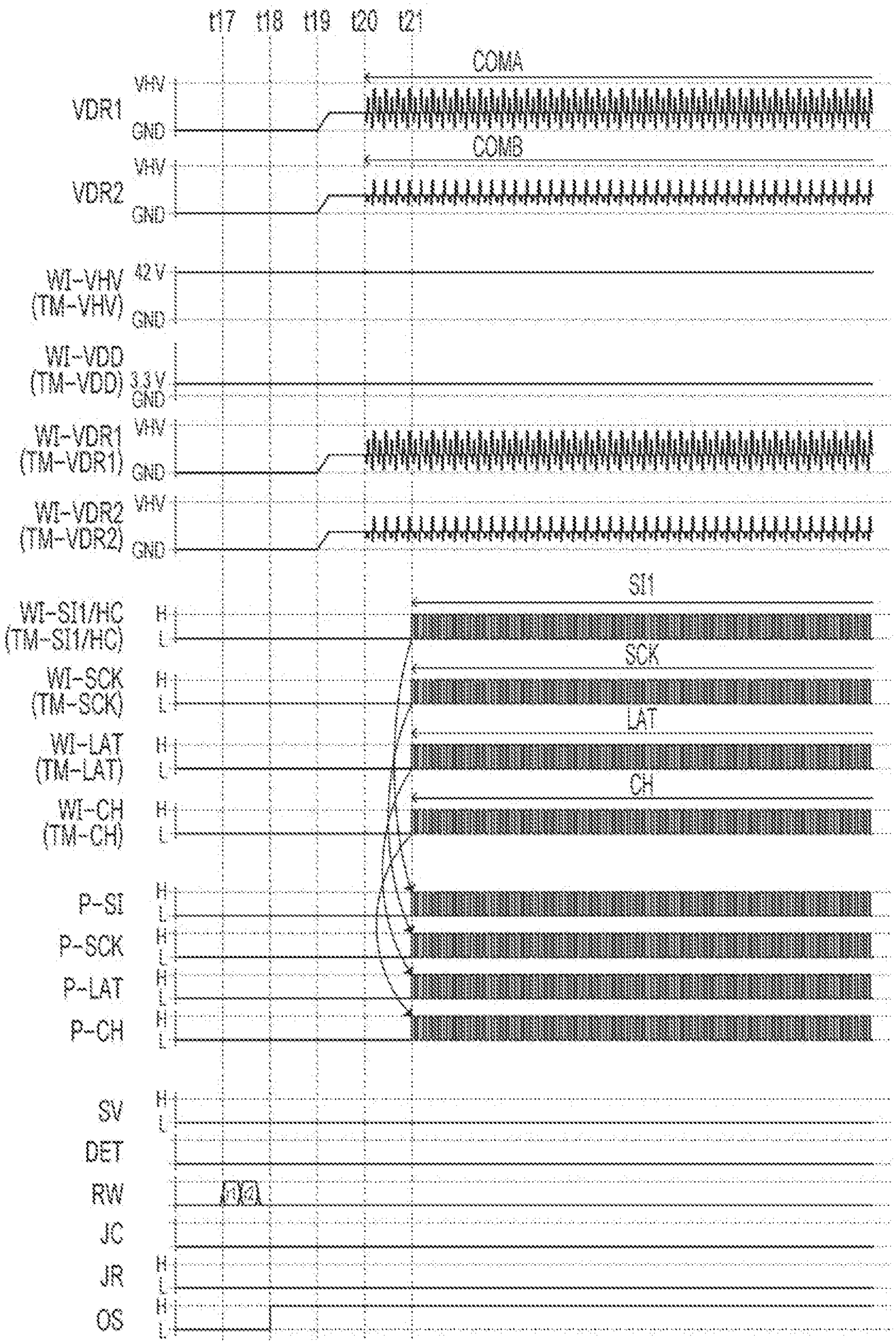
FIG. 21 is a diagram illustrating the example operation of the abnormality detection circuit when the signals supplied to the printhead are normal.

Next, an example operation of the abnormality detection circuit 250 included in the printhead 100 is described. First, the operation of the abnormality detection circuit 250 when the signals supplied to the printhead 100 are normal is described. FIGS. 20 and 21 are diagrams illustrating the example operation of the abnormality detection circuit 250 when the signals supplied to the printhead 100 are normal.

As illustrated in FIG. 20, at time t1, the alternating-current voltage AC, which is for example, a commercial alternating-current voltage of 100 V, is supplied from the commercial alternating-current power supply 7 to the power supply voltage output circuit 12 included in the liquid ejecting apparatus 1. The power supply voltage output circuit 12 generates the voltages VHV and VDD from the supplied alternating-current voltage AC and supplies the voltages VHV and VDD to each section of the liquid ejecting apparatus 1. This starts the operation of the abnormality detection circuit 250 included in the printhead 100 and the semiconductor device 450 included in the abnormality detection circuit 250. At this time, upon being supplied with the power supply voltage, the semiconductor device 450 executes a power-on reset (POR). This initializes information held in the temporary memory area such as a register or a RAM included in the memory circuit 454.

At time t2 after the voltage values of the voltages VHV and VDD supplied to the printhead 100 are stabilized and the semiconductor device 450 executes POR, the ejection control unit 20 generates as the drive voltage signal VDR1, a voltage signal VS1 as a direct-current voltage at a constant potential V1, which is higher than a threshold voltage Vt. The ejection control unit 20 supplies the generated voltage signal VS1 to the printhead 100 via the wire WI-VDR1 and terminal TM-VDR1. At this time, the voltage signal VS1 as the drive voltage signal VDR1 is transmitted by the wire WI-VDR1 and terminal TM-VDR1. The wire WI-VDR1 and terminal TM-VDR1 are thereby held at the potential V1.

Herein, in the liquid ejecting apparatus 1, whether the voltage values of the voltages VHV and VDD are stabilized may be determined as follows. The liquid ejecting apparatus 1 includes a not-illustrated detection circuit, and the detection circuit detects the voltage values of the voltages VHV and VDD and determines whether the voltage values VHV and VDD are stabilized based on whether the fluctuations in the voltage values are within a predetermined range. Alternatively, whether the voltage values of the voltages VHV and VDD are stabilized may be determined based on whether a predetermined time has elapsed since a certain circuit included in the abnormality detection circuit 250, such as the semiconductor device 450, began to operate.

The situation where the voltage values of the voltages VHV and VDD supplied to the printhead 100 are stabilized is not limited to the situation where the voltage values of the voltages VHV and VDD supplied to the printhead 100 are completely constant and includes a situation where the voltage values of the voltages VHV and VDD can be considered substantially constant by taking into account fluctuations in the voltage values that can be caused by errors due to circuit variations, temperature characteristics, noise, and the like. In the following description, the expression of "after the voltage value is stabilized" for signals other than the voltages VHV and VDD is considered in a similar manner.

At time t3 after the voltage value of the voltage signal VS1 as the drive voltage signal VDR1 outputted from the ejection control unit 20 is stabilized at the potential V1, the ejection control unit 20 generates a first command cmd1 corresponding to the voltage signal VS1 at the potential V1, as the diagnosis control signal HC synchronized with the clock signal SCK. The ejection control unit 20 supplies the generated first command cmd1 to the printhead 100 via the wire WI-SI1/HC and terminal TM-SI1/HC and supplies the clock signal SCK to the printhead 100 via the wire WI-SCK and terminal TM-SCK. The first command cmd1 and clock signal SCK supplied to the printhead 100 are inputted to the judgment control circuit 451 included in the semiconductor device 450 of the abnormality detection circuit 250.

The judgment control circuit 451 analyzes the inputted first command cmd1 based on the timing specified by the clock signal SCK. At time t4 after the judgment control circuit 451 recognizes that the first command cmd1 is a normal command, the judgment control circuit 451 generates the memory circuit control signal RW for reading a judgment condition c1 corresponding to the first command cmd1 from the memory circuit 454 and outputs the generated memory circuit control signal RW to the memory circuit 454. The judgment condition c1 corresponding to the voltage signal VS1 at the potential V1 is thereby read from the memory circuit 454. The judgment control circuit 451 generates the judgment condition signal JC including the read judgment condition c1 and outputs the generated judgment condition signal JC to the voltage judgment circuit 452. In the first embodiment, the wire WI-VDR1 and terminal TM-VDR1 are supplied with the potential V1, which is higher than the threshold voltage Vt. The judgment condition c1 includes a judgment condition under which the voltage detection signal DET is determined to be normal when the voltage value of the voltage detection signal DET depending on the potential held by the wire WI-VDR1 and terminal TM-VDR1 exceeds a threshold voltage Vth that depends to the threshold voltage Vt. Herein, the threshold voltage Vth corresponds to the potential obtained by dividing the threshold voltage Vt with the resistors R12 and R13.

At time t5 after the judgment control circuit 451 recognizes that the first command cmd1 is a normal command, the judgment control circuit 451 generates the high-level voltage switching signal SV and outputs the same to the voltage input switching circuit 251. The transistor M10 included in the voltage input switching circuit 251 is thereby controlled to the conducting state between the drain and source, and the transistor M11 is accordingly controlled to the conducting state between the drain and source. The voltage input switching circuit 251 therefore outputs to the voltage judgment circuit 452, the voltage detection signal DET having a voltage value obtained by dividing with the resistors R12 and R13, the potential V1 of the voltage signal VS1 held by the wire WI-VDR1 and terminal TM-VDR1.

In the example operation of the abnormality detection circuit 250 illustrated in FIG. 20, after recognizing that the first command cmd1 is a normal command, the judgment control circuit 451 reads the judgment condition c1 stored in the memory circuit 454 based on the first command cmd1, outputs the judgment condition signal JC including the judgment condition c1 to the voltage judgment circuit 452, and then outputs the high-level voltage switching signal SV to the voltage input switching circuit 251 so that the voltage judgment circuit 452 is supplied with the voltage detection signal DET having a voltage value depending on the potential held by the wire WI-VDR1 and terminal TM-VDR1. However, the abnormality detection circuit 250 may be configured to operate in the following manner: after recognizing that the first command cmd1 is a normal command, the judgment control circuit 451 outputs the high-level voltage switching signal SV to the voltage input switching circuit 251 so that the voltage judgment circuit 452 is supplied with the voltage detection signal DET having a voltage value depending on the potential held by the wire WI-VDR1 and terminal TM-VDR1. The judgment control circuit 451 then reads the judgment condition c1 stored in the memory circuit 454 based on the first command cmd1 and outputs the judgment condition signal JC including the judgment condition c1 to the voltage judgment circuit 452. Alternatively, the abnormality detection circuit 250 may be configured to operate in the following manner: after recognizing that the first command cmd1 is a normal command, the judgment control circuit 451 executes in parallel, the operation to read the judgment condition c1 stored in the memory circuit 454 based on the first command cmd1 and output the judgment condition signal JC including the judgment condition c1 to the voltage judgment circuit 452 and the operation to output the high-level voltage switching signal SV to the voltage input switching circuit 251 so that the voltage judgment circuit 452 is supplied with the voltage detection signal DET having a voltage value depending on the potential held by the wire WI-VDR1 and terminal TM-VDR1.

In short, the operation executed at time t4 in FIG. 20 and the operation executed at time t5 may be executed in any order or may be executed in parallel.

At time t6 after the voltage judgment circuit 452 receives the judgment condition signal JC including the judgment condition c1 and the voltage detection signal DET having a voltage value depending on the potential held by the wire WI-VDR1 and terminal TM-VDR1, the voltage judgment circuit 452 compares the voltage detection signal DET with the judgment condition c1 included in the judgment condition signal JC. In the example operation of the abnormality detection circuit 250 illustrated in FIG. 20, the wire WI-VDR1 and terminal TM-VDR1 are held at the potential V1, which is higher than the threshold voltage Vt. The voltage judgment circuit 452 accordingly receives the voltage detection signal DET at a higher potential than the threshold voltage Vth. The voltage judgment circuit 452 therefore determines that the potential held by the wire WI-VDR1 and terminal TM-VDR1 is normal and generates the judgment result signal JR indicating that the potential held by the wire WI-VDR1 and terminal TM-VDR1 is normal. The voltage judgment circuit 452 then outputs the generated judgment result signal JR to the judgment control circuit 451. In FIG. 20, the judgment result signal JR indicating that the potential held by the wire WI-VDR1 and terminal TM-VDR1 is normal is illustrated as a high-level signal. However, the judgment result signal JR indicating that the potential held by the wire WI-VDR1 and terminal TM-VDR1 is normal is not limited to such a signal and may be a special command.

The judgment control circuit 451 then generates, based on the received judgment result signal JR, a judgment result r1 indicating that the potential held by the wire WI-VDR1 and terminal TM-VDR1 is normal. The judgment control circuit 451 outputs to the memory circuit 454, the memory circuit control signal RW for storing the generated judgment result r1 in the memory circuit 454. The memory circuit 454 thereby stores the judgment result r1 indicating that the potential held by the wire WI-VDR1 and terminal TM-VDR1 is normal.

At time t7 after the judgment result r1 is stored in the memory circuit 454, the ejection control unit 20 generates a second command cmd2 as the diagnosis control signal HC synchronized with the clock signal SCK. The ejection control unit 20 supplies the generated second command cmd2 to the printhead 100 via the wire WI-SI1/HC and terminal TM-SI1/HC and supplies the clock signal SCK to the printhead 100 via the wire WI-SCK and terminal TM-SCK. The second command cmd2 and clock signal SCK supplied to the printhead 100 are inputted to the judgment control circuit 451 included in the semiconductor device 450 of the abnormality detection circuit 250.

The judgment control circuit 451 analyzes the inputted second command cmd2 based on the timing specified by the clock signal SCK. At time t8 after the judgment control circuit 451 recognizes that the second command cmd2 is a normal command, the judgment control circuit 451 generates the low-level voltage switching signal SV and outputs the same to the voltage input switching circuit 251. The transistor M10 included in the voltage input switching circuit 251 is thereby controlled to the non-conducting state between the drain and source, and the transistor M11 accordingly is controlled to the non-conducting state between the drain and source. The junction between the resistors R12 and R13 included in the voltage input switching circuit 251 is thereby electrically decoupled from the wire WI-VDR1 and terminal TM-VDR1. The voltage input switching circuit 251 therefore outputs to the voltage judgment circuit 452, the voltage detection signal DET at the ground potential coupled via the resistor R13.

At time t8 after the judgment control circuit 451 recognizes that the second command cmd2 is a normal command, the judgment control circuit 451 generates the judgment condition signal JC including stop information st for terminating the determination processing executed based on the first command cmd1 to determine whether the potential held by the wire WI-VDR1 and terminal TM-VDR1 is normal. The judgment control circuit 451 then outputs the generated judgment condition signal JC to the voltage judgment circuit 452. Upon receiving the judgment condition signal JC including the stop information st, the voltage judgment circuit 452 terminates the determination and sets the logic level of the judgment result signal JR as low level.

At time t9 after the voltage judgment circuit 452 stops outputting the judgment result signal JR, the ejection control unit 20 generates as the drive voltage signal VDR1, a voltage signal VS2 as a direct-current voltage at a constant potential V2, which is lower than the threshold voltage Vt. The ejection control unit 20 supplies the generated voltage signal VS2 to the printhead 100 via the wire WI-VDR1 and terminal TM-VDR1. At this time, the voltage signal VS2 as the drive voltage signal VDR1 is transmitted by the wire WI-VDR1 and terminal TM-VDR1. The wire WI-VDR1 and terminal TM-VDR1 are therefore held at the potential V2.

At time t10 after the voltage value of the voltage signal VS2 as the drive voltage signal VDR1 outputted from the ejection control unit 20 is stabilized at the potential V2, the ejection control unit 20 generates a third command cmd3 corresponding to the voltage signal VS2 at the potential V2, as the diagnosis control signal HC synchronized with the clock signal SCK. The ejection control unit 20 supplies the generated third command cmd3 to the printhead 100 via the wire WI-SI1/HC and terminal TM-SI1/HC and supplies the clock signal SCK to the printhead 100 via the wire WI-SCK and terminal TM-SCK. The third command cmd3 and clock signal SCK supplied to the printhead 100 are inputted to the judgment control circuit 451 included in the semiconductor device 450 of the abnormality detection circuit 250.

The judgment control circuit 451 analyzes the inputted third command cmd3 based on the timing specified by the clock signal SCK. At time t11 after the judgment control circuit 451 recognizes that the third command cmd3 is a normal command, the judgment control circuit 451 generates the memory circuit control signal RW for reading a judgment condition c2 corresponding to the third command cmd3 from the memory circuit 454 and outputs the generated memory circuit control signal RW to the memory circuit 454. The judgment condition c2 corresponding to the voltage signal VS2 at the potential V2 is thereby read from the memory circuit 454. The judgment control circuit 451 generates the judgment condition signal JC including the read judgment condition c2 and outputs the generated judgment condition signal JC to the voltage judgment circuit 452. In the first embodiment, the wire WI-VDR1 and terminal TM-VDR1 are supplied with the potential V2, which is lower than the threshold voltage Vt. The judgment condition c2 includes a judgment condition under which the potential of the voltage detection signal DET is determined to be normal when the voltage value of the voltage detection signal DET depending on the potential held by the wire WI-VDR1 and terminal TM-VDR1 is below a threshold voltage Vth that depends on the threshold voltage Vt.

At time t12 after the judgment control circuit 451 recognizes that the third command cmd3 is a normal command, the judgment control circuit 451 generates the high-level voltage switching signal SV and outputs the same to the voltage input switching circuit 251. The transistor M10 included in the voltage input switching circuit 251 is thereby controlled to the conducting state between the drain and source, and the transistor M11 is accordingly controlled to the conducting state between the drain and source. The voltage input switching circuit 251 therefore outputs to the voltage judgment circuit 452, the voltage detection signal DET having a voltage value obtained by dividing with the resistors R12 and R13, the potential V2 of the voltage signal VS2 held by the wire WI-VDR1 and terminal TM-VDR1.

Herein, the operation executed at time t11 in FIG. 20 and the operation executed at time t12 may be executed in any order or may be executed in parallel in a similar manner to the aforementioned operations executed at time t4 and time t5.

At time t13 after the voltage judgment circuit 452 receives the judgment condition signal JC including the judgment condition c2 and the voltage detection signal DET having a voltage value depending on the potential held by the wire WI-VDR1 and terminal TM-VDR1, the voltage judgment circuit 452 compares the voltage detection signal DET with the judgment condition c2 included in the judgment condition signal JC. In the example operation of the abnormality detection circuit 250 illustrated in FIG. 20, the wire WI-VDR1 and terminal TM-VDR1 are held at the potential V2, which is lower than the threshold voltage Vt. The voltage judgment circuit 452 accordingly receives the voltage detection signal DET at a lower potential than the threshold voltage Vth. The voltage judgment circuit 452 therefore determines that the potential held by the wire WI-VDR1 and terminal TM-VDR1 is normal and generates the high-level judgment result signal JR indicating that the potential held by the wire WI-VDR1 and terminal TM-VDR1 is normal. The voltage judgment circuit 452 then outputs the generated judgment result signal JR to the judgment control circuit 451.

The judgment control circuit 451 then generates, based on the received judgment result signal JR, a judgment result r2 indicating that the potential held by the wire WI-VDR1 and terminal TM-VDR1 is normal. The judgment control circuit 451 outputs to the memory circuit 454, the memory circuit control signal RW for storing the generated judgment result r2 in the memory circuit 454. The memory circuit 454 thereby stores the judgment result r2 indicating that the potential held by the wire WI-VDR1 and terminal TM-VDR1 is normal.

At time t14 after the judgment result r2 is stored in the memory circuit 454, the ejection control unit 20 generates a fourth command cmd4 as the diagnosis control signal HC synchronized with the clock signal SCK. The ejection control unit 20 supplies the generated fourth command cmd4 to the printhead 100 via the wire WI-SI1/HC and terminal TM-SI1/HC and supplies the clock signal SCK to the printhead 100 via the wire WI-SCK and terminal TM-SCK. The fourth command cmd4 and clock signal SCK supplied to the printhead 100 are inputted to the judgment control circuit 451 included in the semiconductor device 450 of the abnormality detection circuit 250.

The judgment control circuit 451 analyzes the inputted fourth command cmd4 based on the timing specified by the clock signal SCK. At time t15 after the judgment control circuit 451 recognizes that the fourth command cmd4 is a normal command, the judgment control circuit 451 generates the low-level voltage switching signal SV and outputs the same to the voltage input switching circuit 251. The transistor M10 included in the voltage input switching circuit 251 is thereby controlled to the non-conducting state between the drain and source, and the transistor M11 accordingly is controlled to the non-conducting state between the drain and source. The junction between the resistors R12 and R13 included in the voltage input switching circuit 251 is electrically decoupled from the wire WI-VDR1 and terminal TM-VDR1. The voltage input switching circuit 251 therefore outputs to the voltage judgment circuit 452, the voltage detection signal DET at the ground potential coupled via the resistor R13.

At time t15 after the judgment control circuit 451 recognizes that the fourth command cmd4 is a normal command, the judgment control circuit 451 generates the judgment condition signal JC including the stop information st for terminating the process executed based on the third command cmd3 to determine whether the potential held by the wire WI-VDR1 and terminal TM-VDR1 is normal. The judgment control circuit 451 then outputs the generated judgment condition signal JC to the voltage judgment circuit 452. Upon receiving the judgment condition signal JC including the stop information st, the voltage judgment circuit 452 sets the logic level of the judgment result signal JR as low level.

At time t16 after the voltage judgment circuit 452 stops outputting the judgment result signal JR, the ejection control unit 20 stops generating the voltage signal VS2 at the constant potential V2 as the drive voltage signal VDR1. The wire WI-VDR1 and terminal TM-VDR1 are held at the ground potential.

As illustrated in FIG. 21, at time t17 after the ejection control unit 20 stops generating the drive voltage signal VDR1, the judgment control circuit 451 generates the memory circuit control signal RW for reading the judgment results r1 and r2 stored in the memory circuit 454 and outputs the generated memory circuit control signal RW to the memory circuit 454.

In the example operation of the abnormality detection circuit 250 illustrated in FIGS. 20 and 21, the memory circuit 454 stores at time t6, the judgment result r1 indicating that the signals inputted to the printhead 100 are normal and at time t13, the judgment result r2 indicating that the signals inputted to the printhead 100 are normal. In other words, both the judgment results r1 and r2 that the judgment control circuit 451 read from the memory circuit 454 include information indicating that the signals inputted to the printhead 100 are normal. At time t18 after the judgment control circuit 451 determines that both the read judgment results r1 and r2 at time t17 is normal, the judgment control circuit 451 outputs the high-level switch control signal OS. The plural switches included in the switch group SW of the output switching circuit 453 are thereby controlled to the conducting state. This allows conduction between the wire WI-SU/SC and terminal TM-SI1/HC and the wire P-SI1, between the wire WI-SCK and terminal TM-SCK and the wire P-SCK, between the wire WI-LAT and terminal TM-LAT and the wire P-LAT, and between the wire WI-CH and terminal TM-CH and the wire P-CH.

At time t19 after the judgment control circuit 451 outputs the high-level switch control signal OS, the ejection control unit 20 generates the drive voltage signal VDR1 having a constant voltage value of voltage Vc and supplies the generated drive voltage signal VDR1 to the wire WI-VDR1 and terminal TM-VDR1. The ejection control unit 20 also generates the drive voltage signal VDR2 having a constant voltage value of the voltage Vc and supplies the generated drive voltage signal VDR2 to the wire WI-VDR2 and terminal TM-VDR2. At time t20 when the liquid ejecting apparatus 1 receives the image data PD, the ejection control unit 20 generates the drive signal COMA including the trapezoidal waveforms Adp1 and Adp2 as the drive voltage signal VDR1 and supplies the generated drive signal COMA to the wire WI-VDR1 and terminal TM-VDR1. The ejection control unit 20 also generates the drive signal COMB including the trapezoidal waveforms Bdp1 and Bdp2 as the drive voltage signal VDR2 and supplies the generated drive signal COMB to the wire WI-VDR2 and terminal TM-VDR2. The drive signal COMA is thereby transmitted by the wire WI-VDR1 and terminal TM-VDR1 to be supplied to the drive signal selection circuit 200-1, and the drive signal COMB is transmitted by the wire WI-VDR2 and terminal TM-VDR2 to be supplied to the drive signal selection circuit 200-1.

At time t21 after the drive signals COMA and COMB start to be supplied, the ejection control unit 20 generates the print data signal SI1, clock signal SCK, latch signal LAT, and change signal CH for forming an image based on the image data PD on the medium P. The ejection control unit 20 outputs the generated print data signal SI1, clock signal SCK, latch signal LAT, and change signal CH to the wire WI-SI1/HC and terminal TM-SI1/HC, the wire WI-SCK and terminal TM-SCK, the wire WI-LAT and terminal TM-LAT, and the wire WI-CH and terminal TM-CH, respectively. This means that the wire WI-SI1/HC and terminal TM-SI1/HC transmit the diagnosis control signal HC1 including the first, second, third, and fourth commands cmd1, cmd2, cmd3, and cmd4 and then transmit the print data signal SI for causing the printhead 100 to execute printing.

In this case, since the plural switches included in the switch group SW of the output switching circuit 453 are controlled to the conducting state by the switch control signal OS, the print data signal SI1 transmitted by the wire WI-SI1/HC and terminal TM-SI1/HC is supplied to the drive signal selection circuit 200-1 via the wire P-SI1, the clock signal SCK transmitted by the wire WI-SCK and terminal TM-SCK is supplied to the drive signal selection circuit 200-1 via the wire P-SCK, the latch signal LAT transmitted by the wire WI-LAT and terminal TM-LAT is supplied to the drive signal selection circuit 200-1 via the wire P-LAT, and the change signal CH transmitted by the wire WI-CH and terminal TM-CH is supplied to the drive signal selection circuit 200-1 via the wire P-CH.

Based on the inputted print data signal SI1, the clock signal SCK, the latch signal LAT, the change signal CH, the drive signal COMA as the drive voltage signal VDR1, and the drive signal COMB as the drive voltage signal VDR2, the drive signal selection circuit 200-1 generates the drive signals VOUT. The drive signal selection circuit 200-1 supplies the generated drive signals VOUT to the piezo elements 60.

The drive signal selection circuits 200-2 to 200-6 are similarly supplied with the clock signal SCK, latch signal LAT, and change signal CH which are outputted from the abnormality detection circuit 250, the corresponding print data signals SI2 to SI6 outputted from the ejection control unit 20, the drive signal COMA as the drive voltage signal VDR1, and the drive signal COMB as the drive voltage signal VDR2, which are not illustrated in FIGS. 19 to 21. The drive signal selection circuits 200-2 to 200-6 thereby similarly generate the drive signals VOUT and supply the generated drive signals VOUT to the corresponding piezo elements 60.

This causes ink to be ejected from the nozzles 651 corresponding to the piezo elements 60 included in the printhead 100, forming a desired image on the medium P.

Figure 22:
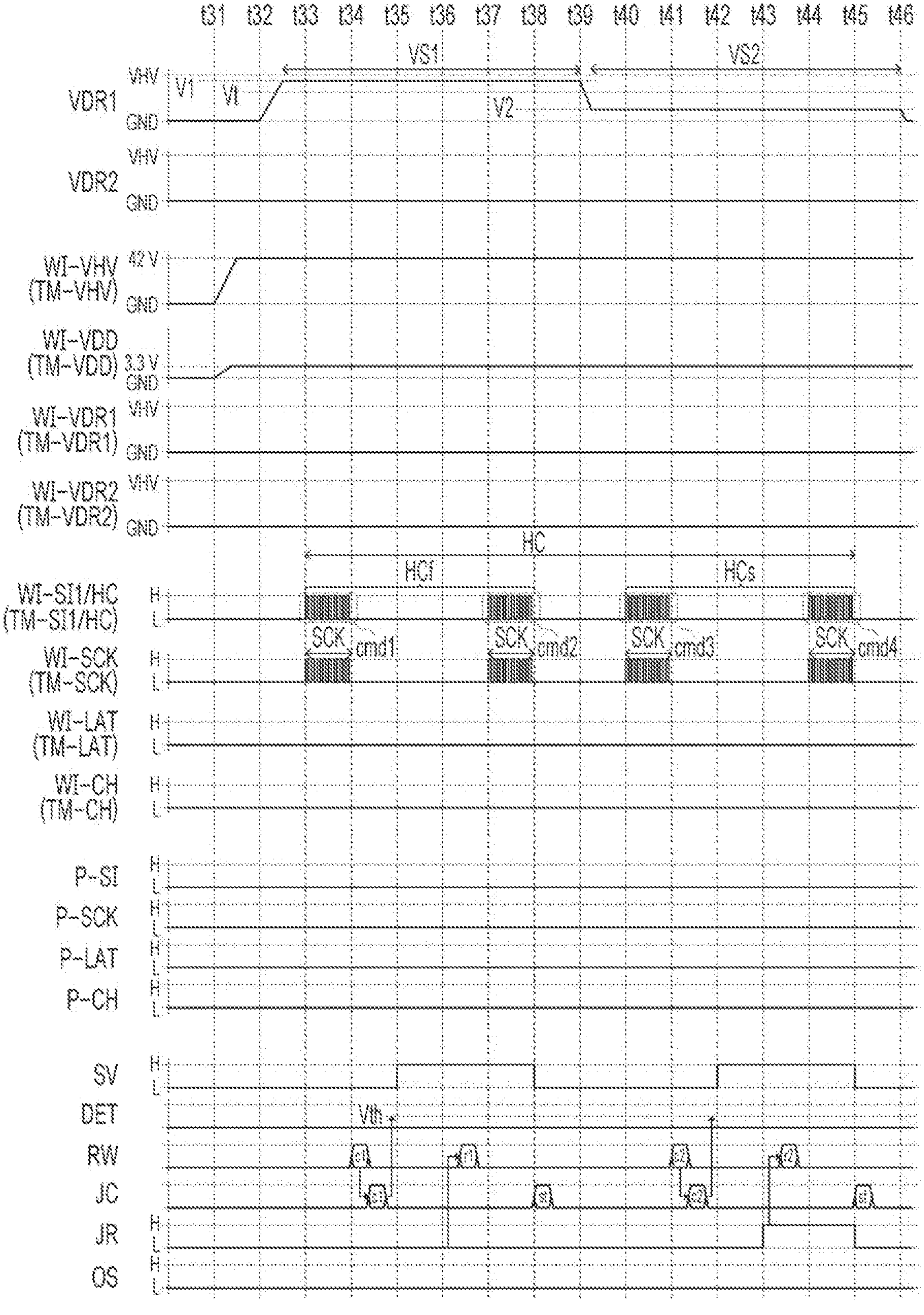
FIG. 22 is a diagram illustrating an example operation of the abnormality detection circuit when any signal supplied to the printhead is not normal.
Figure 23:
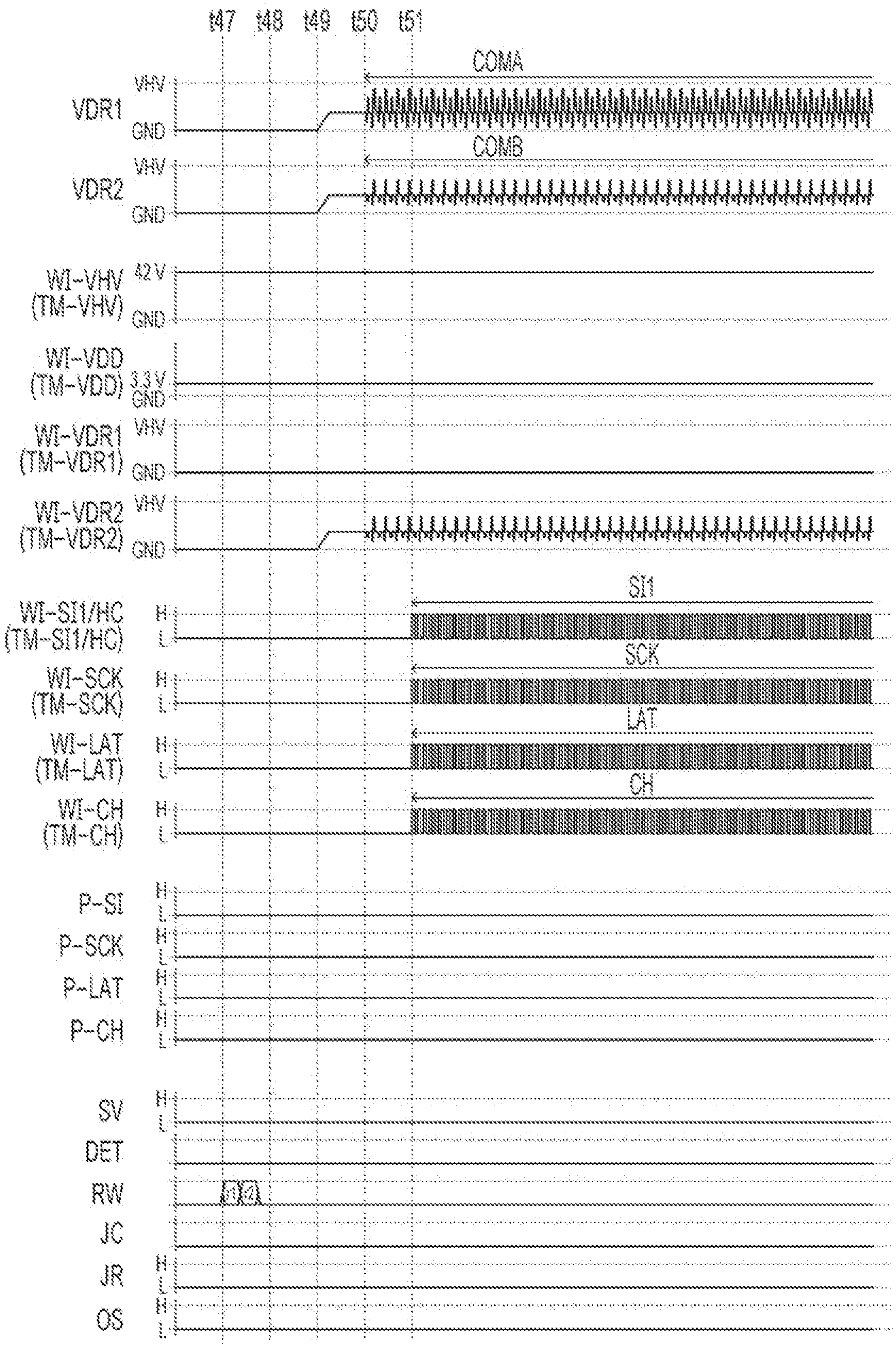
FIG. 23 is a diagram illustrating the example operation of the abnormality detection circuit when any signal supplied to the printhead is not normal.

The following description is given of the operation of the abnormality detection circuit 250 when there is an abnormality in a signal supplied to the printhead 100 and there is a short-circuit between some wires WI of the cable FC transmitting the various signals to the printhead 100 or between some terminals TM of the connector CN. FIGS. 22 and 23 are diagrams illustrating an example operation of the abnormality detection circuit 250 when any signal supplied to the printhead 100 is not normal. In the example operation of the abnormality detection circuit 250 illustrated in FIGS. 22 and 23, the wire WI-VDR1 or terminal TM-VDR1 transmitting the drive voltage signal VDR1 and the wire WI or terminal TM transmitting the ground potential are shorted.

As illustrated in FIG. 22, at time t31, the alternating-current voltage AC, which is for example, a commercial alternating-current voltage of 100 V, is supplied from the commercial alternating-current power supply 7 to the power supply voltage output circuit 12 included in the liquid ejecting apparatus 1. The power supply voltage output circuit 12 generates the voltages VHV and VDD from the supplied alternating-current voltage AC and supplies the voltages VHV and VDD to each section of the liquid ejecting apparatus 1. This starts operation of the abnormality detection circuit 250 included in the printhead 100 and the semiconductor device 450 included in the abnormality detection circuit 250. At this time, the semiconductor device 450 executes a POR. This initializes information held in the temporary memory area such as a register or a RAM included in the memory circuit 454.

At time t32 after the voltage values of the voltages VHV and VDD supplied to the printhead 100 are stabilized and the semiconductor device 450 executes a POR, the ejection control unit 20 generates as the drive voltage signal VDR1, the voltage signal VS1 as a direct-current voltage at the constant potential V1, which is higher than the threshold voltage Vt. The ejection control unit 20 supplies the generated voltage signal VS1 to the wire WI-VDR1 and terminal TM-VDR1. Herein, the wire WI-VDR1 or terminal TM-VDR1 and the wire WI or terminal TM transmitting the ground potential are short-circuited. The wire WI-VDR1 and terminal TM-VDR1 are therefore held at the ground potential.

At time t33 after the voltage value of the voltage signal VS1 as the drive voltage signal VDR1 outputted from the ejection control unit 20 is stabilized at the potential V1, the ejection control unit 20 generates the first command cmd1 corresponding to the voltage signal VS1 at the potential V1 as the diagnosis control signal HC synchronized with the clock signal SCK. The ejection control unit 20 supplies the generated first command cmd1 to the printhead 100 via the wire WI-SI1/HC and terminal TM-SI1/HC and supplies the clock signal SCK to the printhead 100 via the wire WI-SCK and terminal TM-SCK. The first command cmd1 and clock signal SCK supplied to the printhead 100 are inputted to the judgment control circuit 451 included in the semiconductor device 450 of the abnormality detection circuit 250.

The judgment control circuit 451 analyzes the inputted first command cmd1 based on the timing specified by the clock signal SCK. At time t34 after the judgment control circuit 451 recognizes that the first command cmd1 is a normal command, the judgment control circuit 451 generates the memory circuit control signal RW for reading the judgment condition c1 corresponding to the first command cmd1 from the memory circuit 454 and outputs the generated memory circuit control signal RW to the memory circuit 454. The judgment condition c1 corresponding to the voltage signal VS1 at the potential V1 is thereby read from the memory circuit 454. The judgment control circuit 451 generates the judgment condition signal JC including the read judgment condition c1 and outputs the generated judgment condition signal JC to the voltage judgment circuit 452. In the first embodiment, when there is no short-circuit fault in the wire WI-VDR1 and terminal TM-VDR1, the wire WI-VDR1 and terminal TM-VDR1 are supplied with the potential V1, which is higher than the threshold voltage Vt. The judgment condition c1 accordingly includes the judgment condition under which the voltage detection signal DET is determined to be normal when the voltage value of the voltage detection signal DET depending on the potential held by the wire WI-VDR1 and terminal TM-VDR1 exceeds the threshold voltage Vth that depends on the threshold voltage Vt.

At time t35 after the judgment control circuit 451 recognizes that the first command cmd1 is a normal command, the judgment control circuit 451 generates the high-level voltage switching signal SV and outputs the same to the voltage input switching circuit 251. The transistor M10 included in the voltage input switching circuit 251 is thereby controlled to the conducting state between the drain and source, and the transistor M11 is accordingly controlled to the conducting state between the drain and source. The voltage input switching circuit 251 therefore outputs to the voltage judgment circuit 452, the voltage detection signal DET at the ground potential held by the wire WI-VDR1 and terminal TM-VDR1.

Herein, the operation executed at time t34 and the operation executed at time t35 may be executed in any order or may be executed in parallel in a similar manner to the aforementioned operations executed at time t4 and time t5.

At time t36 after the voltage judgment circuit 452 receives the judgment condition signal JC including the judgment condition c1 and the voltage detection signal DET at the ground potential, the voltage judgment circuit 452 compares the voltage detection signal DET with the judgment condition c1 included in the judgment condition signal JC. In the example operation of the abnormality detection circuit 250 illustrated in FIG. 22, the wire WI-VDR1 and terminal TM-VDR1 are held at the ground potential, which is lower than the threshold voltage Vt. The voltage judgment circuit 452 accordingly receives the voltage detection signal DET at the ground potential, which is lower than the threshold voltage Vth. The voltage judgment circuit 452 therefore determines that the potential held by the wire WI-VDR1 and terminal TM-VDR1 is not normal and does not generate the high-level judgment result signal JR indicating that the potential held by the wire WI-VDR1 and terminal TM-VDR1 is normal. In other words, the voltage judgment circuit 452 keeps low level, the logic level of the judgment result signal JR. In FIG. 22, the judgment result signal JR indicating that the potential held by the wire WI-VDR1 and terminal TM-VDR1 is not normal is illustrated as a low-level signal. However, the judgment result signal JR indicating that the potential held by the wire WI-VDR1 and terminal TM-VDR1 is not normal is not limited to such a signal and may be a special command.

The judgment control circuit 451 then generates, based on the received judgment result signal JR, the judgment result r1 indicating that the potential held by the wire WI-VDR1 and terminal TM-VDR1 is not normal. The judgment control circuit 451 outputs to the memory circuit 454, the memory circuit control signal RW for storing the generated judgment result r1 in the memory circuit 454. The memory circuit 454 thereby stores the judgment result r1 indicating that the potential held by the wire WI-VDR1 and terminal TM-VDR1 is not normal.

At time t37 after the judgment result r1 is stored in the memory circuit 454, the ejection control unit 20 generates the second command cmd2 as the diagnosis control signal HC synchronized with the clock signal SCK. The ejection control unit 20 supplies the generated second command cmd2 to the printhead 100 via the wire WI-SI1/HC and terminal TM-SI1/HC and supplies the clock signal SCK to the printhead 100 via the wire WI-SCK and terminal TM-SCK. The second command cmd2 and clock signal SCK supplied to the printhead 100 are inputted to the judgment control circuit 451 included in the semiconductor device 450 of the abnormality detection circuit 250.

The judgment control circuit 451 analyzes the inputted second command cmd2 based on the timing specified by the clock signal SCK. At time t38 after the judgment control circuit 451 recognizes that the second command cmd2 is a normal command, the judgment control circuit 451 generates the low-level voltage switching signal SV and outputs the same to the voltage input switching circuit 251. The transistor M10 included in the voltage input switching circuit 251 is thereby controlled to the non-conducting state between the drain and source, and the transistor M11 is accordingly controlled to the non-conducting state between the drain and source. The junction between the resistors R12 and R13 included in the voltage input switching circuit 251 is thereby electrically decoupled from the wire WI-VDR1 and terminal TM-VDR1. The voltage input switching circuit 251 therefore outputs to the voltage judgment circuit 452, the voltage detection signal DET at the ground potential coupled via the resistor R13.

At time t38 after the judgment control circuit 451 recognizes that the second command cmd2 is a normal command, the judgment control circuit 451 generates the judgment condition signal JC including the stop information st for terminating the process executed based on the first command cmd1 to determine whether the potential held by the wire WI-VDR1 and terminal TM-VDR1 is normal. The judgment control circuit 451 then outputs the generated judgment condition signal JC to the voltage judgment circuit 452. Upon receiving the judgment condition signal JC including the stop information st, the voltage judgment circuit 452 terminates the determination processing and sets the logic level of the judgment result signal JR as low level.

At time t39 after the voltage judgment circuit 452 stops outputting the judgment result signal JR, the ejection control unit 20 generates as the drive voltage signal VDR1, the voltage signal VS2 as a direct-current voltage at the constant potential V2, which is lower than the threshold voltage Vt. The ejection control unit 20 supplies the generated voltage signal VS2 to the wire WI-VDR1 and terminal TM-VDR1. At this time, the wire WI-VDR1 or terminal TM-VDR1 and the wire WI or terminal TM transmitting the ground potential are short-circuited. The wire WI-VDR1 and terminal TM-VDR1 are therefore held at the ground potential.

At time t40 after the voltage value of the voltage signal VS2 as the drive voltage signal VDR1 outputted from the ejection control unit 20 is stabilized at the potential V2, the ejection control unit 20 generates the third command cmd3 corresponding to the voltage signal VS2 at the potential V2 as the diagnosis control signal HC synchronized with the clock signal SCK. The ejection control unit 20 supplies the generated third command cmd3 to the printhead 100 via the wire WI-SI1/HC and terminal TM-SI1/HC and supplies the clock signal SCK to the printhead 100 via the wire WI-SCK and terminal TM-SCK. The third command cmd3 and clock signal SCK supplied to the printhead 100 are inputted to the judgment control circuit 451 included in the semiconductor device 450 of the abnormality detection circuit 250.

The judgment control circuit 451 analyzes the inputted third command cmd3 based on the timing specified by the clock signal SCK. At time t41 after the judgment control circuit 451 recognizes that the third command cmd3 is a normal command, the judgment control circuit 451 generates the memory circuit control signal RW for reading the judgment condition c2 corresponding to the third command cmd3 from the memory circuit 454 and outputs the generated memory circuit control signal RW to the memory circuit 454. The judgment condition c2 corresponding to the voltage signal VS2 at the potential V2 is thereby read from the memory circuit 454. The judgment control circuit 451 generates the judgment condition signal JC including the read judgment condition c2 and outputs the generated judgment condition signal JC to the voltage judgment circuit 452. In the first embodiment, when there is no short-circuit fault in the wire WI-VDR1 and terminal TM-VDR1, the wire WI-VDR1 and terminal TM-VDR1 are supplied with the potential V2, which is lower than the threshold voltage Vt. The judgment condition c2 accordingly includes the judgment condition under which the voltage detection signal DET is determined to be normal when the potential of the voltage detection signal DET depending on the potential held by the wire WI-VDR1 and terminal TM-VDR1 is below the threshold voltage Vth that depends on the threshold voltage Vt.

At time t42 after the judgment control circuit 451 recognizes that the third command cmd3 is a normal command, the judgment control circuit 451 generates the high-level voltage switching signal SV and outputs the same to the voltage input switching circuit 251. The transistor M10 included in the voltage input switching circuit 251 is thereby controlled to the conducting state between the drain and source, and the transistor M11 is accordingly controlled to the conducting state between the drain and source. The voltage input switching circuit 251 therefore outputs to the voltage judgment circuit 452, the voltage detection signal DET at the ground potential that is held by the wire WI-VDR1 and terminal TM-VDR1.

Herein, the operation at time t41 and the operation at time t42 may be executed in any order or may be executed in parallel in a similar manner to the aforementioned operations at time t11 and time t12.

At time t43 after the voltage judgment circuit 452 receives the judgment condition signal JC including the judgment condition c2 and the voltage detection signal DET at the ground potential, the voltage judgment circuit 452 compares the voltage detection signal DET with the judgment condition c2 included in the judgment condition signal JC. In the example operation of the abnormality detection circuit 250 illustrated in FIG. 22, the wire WI-VDR1 and terminal TM-VDR1 are held at the ground potential, which is lower than the threshold voltage Vt. The voltage judgment circuit 452 accordingly receives the voltage detection signal DET at a lower potential than the threshold voltage Vth. The voltage judgment circuit 452 therefore determines that the potential held by the wire WI-VDR1 and terminal TM-VDR1 is normal and generates the high-level judgment result signal JR indicating that the potential held by the wire WI-VDR1 and terminal TM-VDR1 is normal. The voltage judgment circuit 452 then outputs the generated judgment result signal JR to the judgment control circuit 451.

The judgment control circuit 451 then generates, based on the received judgment result signal JR, the judgment result r2 indicating that the potential held by the wire WI-VDR1 and terminal TM-VDR1 is normal. The judgment control circuit 451 outputs to the memory circuit 454, the memory circuit control signal RW for storing the generated judgment result r2 in the memory circuit 454. The memory circuit 454 thereby stores the judgment result r2 indicating that the potential held by the wire WI-VDR1 and terminal TM-VDR1 is normal.

At time t44 after the judgment result r2 is stored in the memory circuit 454, the ejection control unit 20 generates the fourth command cmd4 as the diagnosis control signal HC synchronized with the clock signal SCK. The ejection control unit 20 supplies the generated fourth command cmd4 to the printhead 100 via the wire WI-SI1/HC and terminal TM-SI1/HC and supplies the clock signal SCK to the printhead 100 via the wire WI-SCK and terminal TM-SCK. The fourth command cmd4 and clock signal SCK supplied to the printhead 100 are inputted to the judgment control circuit 451 included in the semiconductor device 450 of the abnormality detection circuit 250.

The judgment control circuit 451 analyzes the inputted fourth command cmd4 based on the timing specified by the clock signal SCK. At time t45 after the judgment control circuit 451 recognizes that the fourth command cmd4 is a normal command, the judgment control circuit 451 generates the low-level voltage switching signal SV and outputs the same to the voltage input switching circuit 251. The transistor M10 included in the voltage input switching circuit 251 is thereby controlled to the non-conducting state between the drain and source, and the transistor M11 is accordingly controlled to the non-conducting state between the drain and source. The junction between the resistors R12 and R13 included in the voltage input switching circuit 251 is thereby electrically decoupled from the wire WI-VDR1 and terminal TM-VDR1. The voltage input switching circuit 251 therefore outputs to the voltage judgment circuit 452, the voltage detection signal DET at the ground potential coupled via the resistor R13.

At time t45 after the judgment control circuit 451 recognizes that the fourth command cmd4 is a normal command, the judgment control circuit 451 generates the judgment condition signal JC including the stop information st for terminating the process executed based on the third command cmd3 to determine whether the potential held by the wire WI-VDR1 and terminal TM-VDR1 is normal. The judgment control circuit 451 then outputs the generated judgment condition signal JC to the voltage judgment circuit 452. Upon receiving the judgment condition signal JC including the stop information st, the voltage judgment circuit 452 sets the logic level of the judgment result signal JR as low level.

At time t46 after the voltage judgment circuit 452 stops outputting the judgment result signal JR, the ejection control unit 20 stops generating the voltage signal VS2 at the constant potential V2 as the drive voltage signal VDR1. The wire WI-VDR1 and terminal TM-VDR1 are therefore held at the ground potential.

As illustrated in FIG. 23, at time t47 after the ejection control unit 20 stops generating the drive voltage signal VDR1, the judgment control circuit 451 generates the memory circuit control signal RW for reading the judgment results r1 and r2 stored in the memory circuit 454 and outputs the generated memory circuit control signal RW to the memory circuit 454.

In the example operation of the abnormality detection circuit 250 illustrated in FIGS. 22 and 23, the memory circuit 454 stores at time t36, the judgment result r1 indicating that any of the signals inputted to the printhead 100 is not normal and at time t43, the judgment result r2 indicating that the signals inputted to the printhead 100 are normal. In other words, either the judgment result r1 or r2 that the judgment control circuit 451 read from the memory circuit 454 includes information indicating that the signal inputted to the printhead 100 is not normal. At time t48 after the judgment control circuit 451 determines that either the read judgment result r1 or r2 is not normal at time t47, the judgment control circuit 451 determines that any of the signals inputted to the printhead 100 is not normal and continues outputting the low-level switch control signal OS. The plural switches included in the switch group SW of the output switching circuit 453 thereby continue in the non-conducting state. This keeps the non-conducting state between the wire WI-SI1/HC and terminal TM-SI1/HC and the wire P-SI1, between the wire WI-SCK and terminal TM-SCK and the wire P-SCK, between the wire WI-LAT and terminal TM-LAT and the wire P-LAT, and between the wire WI-CH and terminal TM-CH and the wire P-CH.

At time t49 after the judgment control circuit 451 outputs the low-level switch control signal OS, the ejection control unit 20 generates the drive voltage signal VDR1 having a constant voltage value of the voltage Vc and supplies the generated drive voltage signal VDR1 to the wire WI-VDR1 and terminal TM-VDR1. The ejection control unit 20 also generates the drive voltage signal VDR2 having a constant voltage value of the voltage Vc and supplies the generated drive voltage signal VDR2 to the wire WI-VDR2 and terminal TM-VDR2. At this time, since the wire WI-VDR1 or terminal TM-VDR1 and the ground potential are short-circuited, the wire WI-VDR1 and terminal TM-VDR1 are held at the ground potential.

At time t50 when the liquid ejecting apparatus 1 receives the image data PD, the ejection control unit 20 generates the drive signal COMA including the trapezoidal waveforms Adp1 and Adp2 as the drive voltage signal VDR1 and supplies the generated drive signal COMA to the wire WI-VDR1 and terminal TM-VDR1. The ejection control unit 20 also generates the drive signal COMB including the trapezoidal waveforms Bdp1 and Bdp2 as the drive voltage signal VDR2 and supplies the generated drive signal COMB to the wire WI-VDR2 and terminal TM-VDR2. At this time, since the wire WI-VDR1 or terminal TM-VDR1 and the ground potential are short-circuited, the drive signal COMA is not supplied to the drive signal selection circuit 200-1, and only the drive signal COMB is transmitted by the wire WI-VDR2 and terminal TM-VDR2 and is supplied to the drive signal selection circuit 200-1.

At time t51 after the drive signals COMA and COMB start to be supplied, the ejection control unit 20 generates the print data signal SI1, clock signal SCK, latch signal LAT, and change signal CH for forming an image based on the image data PD on the medium P. The ejection control unit 20 outputs the generated print data signal SI1, clock signal SCK, latch signal LAT, and change signal CH to the wire WI-SI1/HC and terminal TM-SI1/HC, the wire WI-SCK and terminal TM-SCK, the wire WI-LAT and terminal TM-LAT, and the wire WI-CH and terminal TM-CH, respectively.

In this case, since the plural switches included in the switch group SW of the output switching circuit 453 are controlled to the non-conducting state by the switch control signal OS, the print data signal SI1 transmitted by the wire WI-SI1/HC and terminal TM-SI1/HC is not supplied to the wire P-SI1 and drive signal selection circuit 200-1, the clock signal SCK transmitted by the wire WI-SCK and terminal TM-SCK is not supplied to the wire P-SCK and drive signal selection circuit 200-1, the latch signal LAT transmitted by the wire WI-LAT and terminal TM-LAT is not supplied to the wire P-LAT and drive signal selection circuit 200-1, and the change signal CH transmitted by the wire WI-CH and terminal TM-CH is not supplied to the wire P-CH and drive signal selection circuit 200-1. The drive signal selection circuit 200-1 therefore does not generate the drive signals VOUT, and the piezo elements 60 are not supplied with any drive signal VOUT.

In a similar manner, the drive signal selection circuits 200-2 to 200-6, which are not illustrated in FIGS. 19, 22, and 23, are not supplied with the clock signal SCK, latch signal LAT, and change signal CH that are outputted from the abnormality detection circuit 250. The drive signal selection circuits 200-2 to 200-6 therefore do not generate any drive signals VOUT, and the piezo elements 60 are not supplied with any drive signal VOUT.

Thus, the nozzles 651 corresponding to the piezo elements 60 included in the printhead 100 do not eject ink, not forming any desired image on the medium P.

Herein, the first command cmd1 as the diagnosis control signal HC is a command to execute inspection whether the voltage signal VS1 at the potential V1 is supplied to the wire WI-VDR1 and terminal TM-VDR1, and the second command cmd2 as the diagnosis control signal HC is a command to stop the inspection executed upon the first command cmd1. In other words, the inspection whether the voltage signal VS1 at the potential V1 is supplied to the wire WI-VDR1 and terminal TM-VDR1 is executed upon the first and second commands cmd1 and cmd2. The signal including the first and second commands cmd1 and cmd2 to execute the inspection whether the voltage signal VS1 at the potential V1 is supplied to the wire WI-VDR1 and terminal TM-VDR1 is referred to as a first command signal HCf. The first command signal HCf includes the first command cmd1 and the second command cmd2 subsequent to the first command cmd1.

The third command cmd3 as the diagnosis control signal HC is a command to execute inspection whether the voltage signal VS2 at the potential V2 is supplied to the wire WI-VDR1 and terminal TM-VDR1, and the fourth command cmd4 as the diagnosis control signal HC is a command to stop the inspection executed upon the third command cmd3. In other words, the inspection whether the voltage signal VS2 at the potential V2 is supplied to the wire WI-VDR1 and terminal TM-VDR1 is executed upon the third and fourth commands cmd3 and cmd4. The signal including the third and fourth commands cmd3 and cmd4 to execute the inspection whether the voltage signal VS2 at the potential V2 is supplied to the wire WI-VDR1 and terminal TM-VDR1 is referred to as a second command signal HCs. The second command signal HCs includes the third command cmd3 and the fourth command cmd4 subsequent to the third command cmd3.

Herein, the first command signal HCf is a signal to execute the inspection whether the voltage signal VS1 at the potential V1 is supplied to the wire WI-VDR1 and terminal TM-VDR1, and the first command cmd1 is the command to start the inspection whether the voltage signal VS1 at the potential V1 is supplied to the wire WI-VDR1 and terminal TM-VDR1. On the other hand, the second command signal HCs is a signal to execute the inspection whether the voltage signal VS2 at the potential V2 is supplied to the wire WI-VDR1 and terminal TM-VDR1, and the third command cmd3 is the command to start the inspection whether the voltage signal VS2 at the potential V2 is supplied to the wire WI-VDR1 and terminal TM-VDR1. When receiving the first command cmd1, the judgment control circuit 451 reads the judgment condition c1 corresponding to the voltage signal VS1 at the potential V1 from the memory circuit 454 and when receiving the third command cmd3, the judgment control circuit 451 reads the judgment condition c2 corresponding to the voltage signal VS2 at the potential V2 from the memory circuit 454. In other words, the first and third commands cmd1 and cmd3 are the same in terms of being the command to start the inspection whether the potential supplied to the wire WI-VDR1 and terminal TM-VDR1 is normal, but the judgment condition c1 read by the judgment control circuit 451 upon the first command cmd1 is different from the judgment condition c2 read by the judgment control circuit 451 upon the third command cmd3. The first and third commands cmd1 and cmd3 thus include different pieces of information.

Since the information included in the first command cmd1 of the first command signal HCf is different from the information included in the third command cmd3 of the second command signal HCs, the abnormality detection circuit 250 can execute the inspection whether the potential supplied to the wire WI-VDR1 and terminal TM-VDR1 is normal without being restricted by the potential supplied to the wire WI-VDR1 and terminal TM-VDR1. Since the first and third commands cmd1 and cmd3 include different pieces of information, therefore, the abnormality detection circuit 250 can execute the inspection whether the potential supplied to the wire WI-VDR1 and terminal TM-VDR1 is normal for a wide range of potential supplied to the wire WI-VDR1 and terminal TM-VDR1. This enhances the versatility of the printhead 100 including the abnormality detection circuit 250 as well as the versatility of the printhead drive circuit 2 that outputs the diagnosis control signal HC1 and controls the printhead 100.

The second command cmd2 included in the first command signal HCf is a command to stop the inspection whether the potential supplied to the wire WI-VDR1 and terminal TM-VDR1 is normal, and the fourth command cmd4 included in the second command signal HCs is a command to stop the inspection whether the potential supplied to the wire WI-VDR1 and terminal TM-VDR1 is normal. The second and fourth commands cmd2 and cmd4 are identical commands to terminate the inspection whether the potential supplied to the wire WI-VDR1 and terminal TM-VDR1 is normal. The second and fourth commands cmd2 and cmd4 preferably include same information. The printhead 100 and printhead drive circuit 2 thereby are able to collectively store the information corresponding to the second and fourth commands cmd2 and cmd4. This reduces the likelihood that the number of commands to be managed by the printhead 100 and printhead drive circuit 2 increases and improves the use efficiency of the memory areas included in the printhead 100 and printhead drive circuit 2.

As illustrated in FIGS. 20 to 23, the potential V1 of the voltage signal VS1 and the potential V2 of the voltage signal VS2 outputted from the ejection control unit 20 in the first embodiment are different from each other. The potential V1 of the voltage signal VS1 is higher than the potential V2 of the voltage signal VS2.

Specifically, the potential V1 of the voltage signal VS1 is higher than the high potential level of the image data PD supplied from the external device 3, such as a host computer, provided outside of the liquid ejecting apparatus 1 and is higher than five times the potential of the high level of the first command signal HCf outputted as the diagnosis control signal HC1, or higher than 18.2 V. The thus-configured potential V1 of the voltage signal VS1 is preferably the second highest next to the voltage VHV among the signals transmitted by the cable FC and is higher than 10% of the effective value of the alternating-current voltage AC externally supplied. For example, the potential V1 of the voltage signal VS1 is not lower than 70% of the voltage value of the voltage VHV and is not lower than 29.4 V.

The voltage signal VS1 as the drive voltage signal VDR1 is supplied to the abnormality detection circuit 250 together with the diagnosis control signal HC1. The voltage signal VS1 as the drive voltage signal VDR1 is a direct-current voltage signal while the first command signal HCf outputted as the diagnosis control signal HC1 is a digital signal that carries information with high frequencies. When the potential V1 of the voltage signal VS1 as the drive voltage signal VDR1 is equal to the potential of the high level of the diagnosis control signal HC1 and is close to 3.3 V specified by the voltage VDD, therefore, superposition of the diagnosis control signal HC1 on the voltage signal VS1 will degrade the accuracy of the voltage detection signal DET based on the potential V1 of the voltage signal VS1 inputted to the abnormality detection circuit 250. In the aforementioned configuration, the potential V1 of the voltage signal VS1, which is higher than the potential V2 of the voltage signal VS2, is set to a higher potential than the potential of the high level of the image data PD supplied from the outside of the liquid ejecting apparatus 1 and is higher than five times the potential of the high level of the first command signal HCf outputted as the diagnosis control signal HC1 while the voltage signal VS1 at the potential V1 is outputted as the drive voltage signal VDR1, or greater than 18.2 V. This reduces the likelihood of the accuracy of the voltage detection signal DET degrading even when the low-potential digital signal, including the diagnosis control signal HC1, is superposed on the potential V1 of the voltage signal VS1, improving the accuracy of inspecting the potential of the wire WI-VDR1 and terminal TM-VDR1 in the abnormality detection circuit 250.

On the other hand, the potential V2 of the voltage signal VS2 is lower than five times the potential of the high level of the second command signal HCs outputted as the diagnosis control signal HC1, or lower than 18.2 V. The potential V2 of the voltage signal VS2 is therefore not higher than 30% of the voltage VHV. The potential V2 is, for example, not higher than 12.6 V and, more preferably, the ground potential.

This increases the potential difference between the potential V1 of the voltage signal VS1 and the potential V2 of the voltage signal VS2 as the drive voltage signal VDR1 inputted to the abnormality detection circuit 250, further improving the accuracy of inspecting the potential of the wire WI-VDR1 and terminal TM-VDR1 in the abnormality detection circuit 250.

Furthermore, the potential V2 of the voltage signal VS2, which is lower than the potential V1 of the voltage signal VS1, is set different from the range of the potential V1 determined to be normal. This can reduce the likelihood of the abnormality detection circuit 250 incorrectly detecting an abnormality in the wire WI-VDR1 or terminal TM-VDR1 when there is a short-circuit fault in the wire WI-VDR1 or terminal TM-VDR1 that transmit the drive voltage signal VDR1.

FIGS. 20 to 23 illustrate the situation where the potential V1 of the voltage signal VS1 and the potential V2 of the voltage signal VS2 that are outputted from the ejection control unit 20 are different from each other and the potential V1 of the voltage signal VS1 is higher than the potential V2 of the voltage signal VS2. However, the potential V2 of the voltage signal VS2 may be higher than the potential V1 of the voltage signal VS1. In this situation, the potential V2 of the voltage signal VS2 may be higher than the potential of the high level of the image data PD supplied from the external device 3, such as a host computer, provided outside of the liquid ejecting apparatus 1 and may be higher than five times the potential of the high level of the second command signal HCs outputted as the diagnosis control signal HC1, or higher than 18.2 V. Furthermore, the potential V2 of the voltage signal VS2 is preferably the second highest next to that of the voltage VHV among the signals transmitted by the cable FC and is higher than 10% of the effective value of the alternating-current voltage AC externally supplied. For example, the potential V2 of the voltage signal VS2 is not lower than 70% of the voltage value of the voltage VHV and is not lower than 29.4 V.

On the other hand, the potential V1 of the voltage signal VS1 is lower than five times the potential of the high level of the first command signal HCf outputted as the diagnosis control signal HC1, or lower than 18.2 V. The potential V1 of the voltage signal VS1 is not higher than 30% of the voltage VHV. The potential V1 is, for example, not higher than 12.6 V and, more preferably, the ground potential. Such a configuration provides the same operation effects.

As described above, in the liquid ejecting apparatus 1 of the first embodiment, the printhead 100 performs abnormality detection in response to the first command signal HCf including the first command cmd1 and second command cmd2 that are inputted to the terminal TM-SI1/HC while the potential of the terminal TM-VDR1 is the potential V1 and the second command signal HCs including the third command cmd3 and fourth command cmd4 that are inputted to the terminal TM-SI1/HC while the potential of the terminal TM-VDR1 is the potential V2. The printhead drive circuit 2 includes: the ejection control unit 20 outputting the first and second command signals HCf and HCs; the wire WI-VDR1 electrically coupled to the terminal TM-VDR1; and the wire WI-SI1/HC electrically coupled to the terminal TM-SI1/HC. The ejection control unit 20 outputs the first command signal HCf to the wire WI-SI1/HC while the wire WI-VDR1 is being supplied with the voltage signal VS1 at the potential V1. After outputting the first command signal HCf, the ejection control unit 20 outputs the second command signal HCs to the wire WI-SI1/HC while the wire WI-VDR1 is being supplied with the voltage signal VS2 at the potential V2, which is different from the potential V1. Thus, the ejection control unit 20 causes the printhead 100 to perform abnormality detection in response to the first and second command signals HCf and HCs and the voltage signals VS1 and VS2.

In the liquid ejecting apparatus 1 of the first embodiment, the drive voltage signal VDR1 based on the high voltage VHV includes the voltage signal VS1 at the potential V1 and the voltage signal VS2 at the potential V2, which is different from the potential V1, and the detection whether the potential of the wire WI-VDR1 is normal is individually performed for the voltage signals VS1 and VS2. This allows detection of the presence of an abnormality in the path transmitting the drive voltage signal VDR1 including the voltage signals VS1 and VS2 at different potentials. In the liquid ejecting apparatus 1 of the first embodiment, it is thus possible to accurately determine whether there is an abnormality in the high-voltage drive voltage signal VDR1.

In the liquid ejecting apparatus 1 of the first embodiment, it is also possible to detect a case where at least one of the inputted first and second command signals HCf and HCs is not inputted to the printhead 100 as the normal command due to an abnormality in at least one of the wires WI-SI1/HC and WI-SCK and terminals TM-SI1/HC and TM-SCK.

As described above, in the liquid ejecting apparatus 1 of the first embodiment, the judgment control circuit 451 included in the abnormality detection circuit 250 controls the operations of the voltage input switching circuit 251, voltage judgment circuit 452, and memory circuit 454 in response to the first or second command signal HCf or HCs inputted in synchronization with the clock signal SCK, to determine whether the voltage values of the voltage signals VS1 and VS2 included in the drive voltage signal VDR1 held by the wire WI-VDR1 or terminal TM-VDR1 are normal. When any abnormality, such as short-circuit fault or poor coupling, in any one of the wire WI-SI1/HC, terminal TM-SI1/HC, wire WI-SCK, and terminal TM-SCK has caused an abnormality in at least any one of the clock signal SCK, first command signal HCf, and second command signal HCs inputted to the printhead 100, the judgment control circuit 451 does not determine whether the voltage values of the voltage signals VS1 and VS2 included in the drive voltage signal VDR1 held by the wire WI-VDR1 or terminal TM-VDR1 are normal. When the judgment control circuit 451 does not receive the first and second command signals HCf and HCs for executing the determination whether the voltage values of the voltage signals VS1 and VS2 included in the drive voltage signal VDR1 are normal within a predetermined time period after the semiconductor device 450 executes a POR, the judgment control circuit 451 determines that any abnormality, such as short-circuit fault or poor coupling, in any one of the wire WI-SI1/HC, terminal TM-SI1/HC, wire WI-SCK, and terminal TM-SCK has caused an abnormality in at least any one of the clock signal SCK, first command signal HCf, and second command signal HCs inputted to the printhead 100.

In the liquid ejecting apparatus 1 of the first embodiment, it is possible to determine whether there is an abnormality in at least one of the clock signal SCK, first command signal HCf, and second command signal HCs based on whether the first and second command signals HCf and HCs for executing the determination whether the voltage values of the voltage signals VS1 and VS2 included in the drive voltage signal VDR1 are normal are inputted to the abnormality detection circuit 250 within a predetermined time period.

As described above, in the liquid ejecting apparatus 1 of the first embodiment, the printhead 100 performs abnormality detection in response to the first command signal HCf including the first and second commands cmd1 and cmd2 that are inputted to the terminal TM-SI1/HC while the potential of the terminal TM-VDR1 is the potential V1 and the second command signal HCs including the third and fourth commands cmd3 and cmd4 that are inputted to the terminal TM-SI1/HC while the potential of the terminal TM-VDR1 is the potential V2. The ejection control unit 20 included in the printhead drive circuit 2 outputs the first command signal HCf to the wire WI-SI1/HC while the wire WI-VDR1 is being supplied with the voltage signal VS1 at the potential V1 and outputs the second command signal HCs to the wire WI-SI1/HC after outputting the first command signal HCf while the wire WI-VDR1 is being supplied with the voltage signal VS2 at the potential V2, which is different from the potential V1, thus causing the printhead 100 to perform abnormality detection based on the first and second command signals HCf and HCs and the voltage signals VS1 and VS2. It is therefore possible to determine whether the high- and low-voltage signals supplied to the printhead 100 are normal and reduce the likelihood of the printhead 100 malfunctioning.

Herein, the predetermined time period used by the judgment control circuit 451 to determine whether there is an abnormality in at least one of the low-voltage clock signal SCK, first command signal HCf, and second command signal HCs is not limited to the time period after the semiconductor device 450 executes a POR and may be, for example, a time period from when the first command cmd1 is inputted to when the second command cmd2 is inputted, a time period from when the second command cmd2 is inputted to when the third command cmd3 is inputted, or a time period from when the third command cmd3 is inputted to when the fourth command cmd4 is inputted.

1. 6. 3 Printhead Inspection Method

As described above, the liquid ejecting apparatus 1, in the first embodiment, including the printhead 100 including the abnormality detection circuit 250 includes: the printhead 100 which executes printing by supplying the drive signal COMA as the drive voltage signal VDR1 inputted to the terminal TM-VDR1, to the piezo elements 60 as the drive element depending on the print data signal SI1 inputted to the terminal TM-SI1/HC; and the printhead drive circuit 2 which causes the printhead 100 to execute printing.

The printhead drive circuit 2 includes: the ejection control unit 20 outputting the first and second command signals HCf and HCs; the wire WI-VDR1 electrically coupled to the terminal TM-VDR1; and the wire WI-SI1/HC electrically coupled to the terminal TM-SI1/HC. The ejection control unit 20 outputs the first command signal HCf to the wire WI-SI1/HC while the wire WI-VDR1 is being supplied with the voltage signal VS1 at the potential V1 and after outputting the first command signal HCf, outputs the second command signal HCs to the wire WI-SI1/HC while the wire WI-VDR1 is being supplied with the voltage signal VS2 at the potential V2, which is different from the potential V1.

The printhead 100 processes the outputs from the circuits including the voltage input switching circuit 251 and voltage judgment circuit 452 electrically coupled to the terminal TM-VDR1 in response to the first command signal HCf that is inputted to the terminal TM-SI1/HC while the potential of the terminal TM-VDR1 is the potential V1 and processes the outputs from the circuits including the voltage input switching circuit 251 and voltage judgment circuit 452 electrically coupled to the terminal TM-VDR1 in response to the second command signal HCs that is inputted to the terminal TM-SI1/HC while the potential of the terminal TM-VDR1 is the potential V2.

Specifically, the printhead 100 includes the terminals TM-SI1/HC and TM-VDR1, voltage input switching circuit 251, voltage judgment circuit 452, and output switching circuit 453. The voltage input switching circuit 251 and voltage judgment circuit 452 determine whether the potential of the terminal TM-VDR1 is normal in response to the first command signal HCf inputted to the terminal TM-SI1/HC and determine whether the potential of the terminal TM-VDR1 is normal in response to the second command signal HCs inputted to the terminal TM-SI1/HC. In this case, the voltage input switching circuit 251 and voltage judgment circuit 452 execute the determination whether the potential of the terminal TM-VDR1 is normal in response to the first command signal HCf inputted to the terminal TM-SI1/HC based on the criterion specified by the judgment condition c1. The voltage input switching circuit 251 and voltage judgment circuit 452 also execute the determination whether the potential of the terminal TM-VDR1 is normal in response to the second command signal HCs inputted to the terminal TM-SI1/HC based on the criterion specified by the judgment condition c2, which is different from the judgment condition c1. The voltage input switching circuit 251 and voltage judgment circuit 452 execute the determination whether the potential of the terminal TM-VDR1 is normal in response to the first command signal HCf inputted to the terminal TM-SI1/HC and the determination whether the potential of the terminal TM-VDR1 is normal in response to the second command signal HCs inputted to the terminal TM-SI1/HC, based on the different criteria.

When the potential of the terminal TM-VDR1 is determined to be normal at both of the determination whether the potential of the terminal TM-VDR1 is normal in response to the first command signal HCf inputted to the terminal TM-SI1/HC and the determination whether the potential of the terminal TM-VDR1 is normal in response to the second command signal HCs inputted to the terminal TM-SI1/HC, the output switching circuit 453 allows printing. When the potential of the terminal TM-VDR1 is determined to be not normal at at least one of the determination whether the potential of the terminal TM-VDR1 is normal in response to the first command signal HCf inputted to the terminal TM-SI1/HC and the determination whether the potential of the terminal TM-VDR1 is normal in response to the second command signal HCs inputted to the terminal TM-SI1/HC, the output switching circuit 453 does not permit printing.

In the thus-configured liquid ejecting apparatus 1 according to the first embodiment, it is possible to inspect whether the signals supplied to the printhead 100 are normal, by using the high-voltage drive voltage signal VDR1 and low-voltage diagnosis control signal HC1 that are outputted by the ejection control unit 20 toward the printhead 100. This allows for accurate determination whether high- and low-voltage signals supplied to the printhead 100 are normal. It is therefore possible to reduce the likelihood of the printhead 100 malfunctioning due to an abnormal signal supplied to the printhead 100. The printhead drive circuit 2 can control the printhead 100 depending on whether there is an abnormality in the printhead 100.

Figure 24:
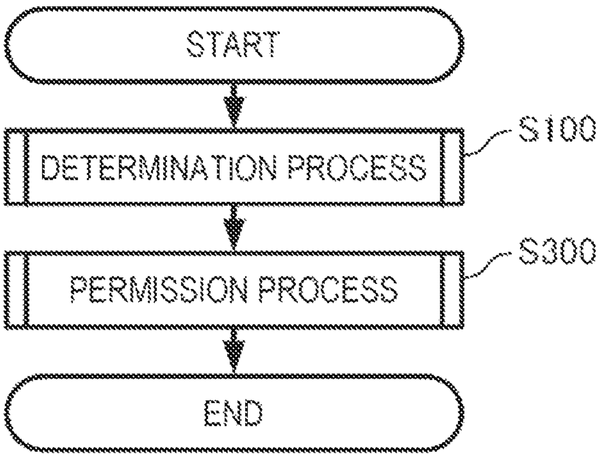
FIG. 24 is a diagram illustrating an inspection method of a printhead in the liquid ejecting apparatus.

The thus-configured inspection method of the printhead 100 is described in detail. FIG. 24 is a diagram illustrating the inspection method of the printhead 100 in the liquid ejecting apparatus 1. As illustrated in FIG. 24, the inspection method of the printhead 100 in the liquid ejecting apparatus 1 includes a determination process (step S100) and a permission process (step S300) subsequent to the determination process (step S100).

Figure 25:
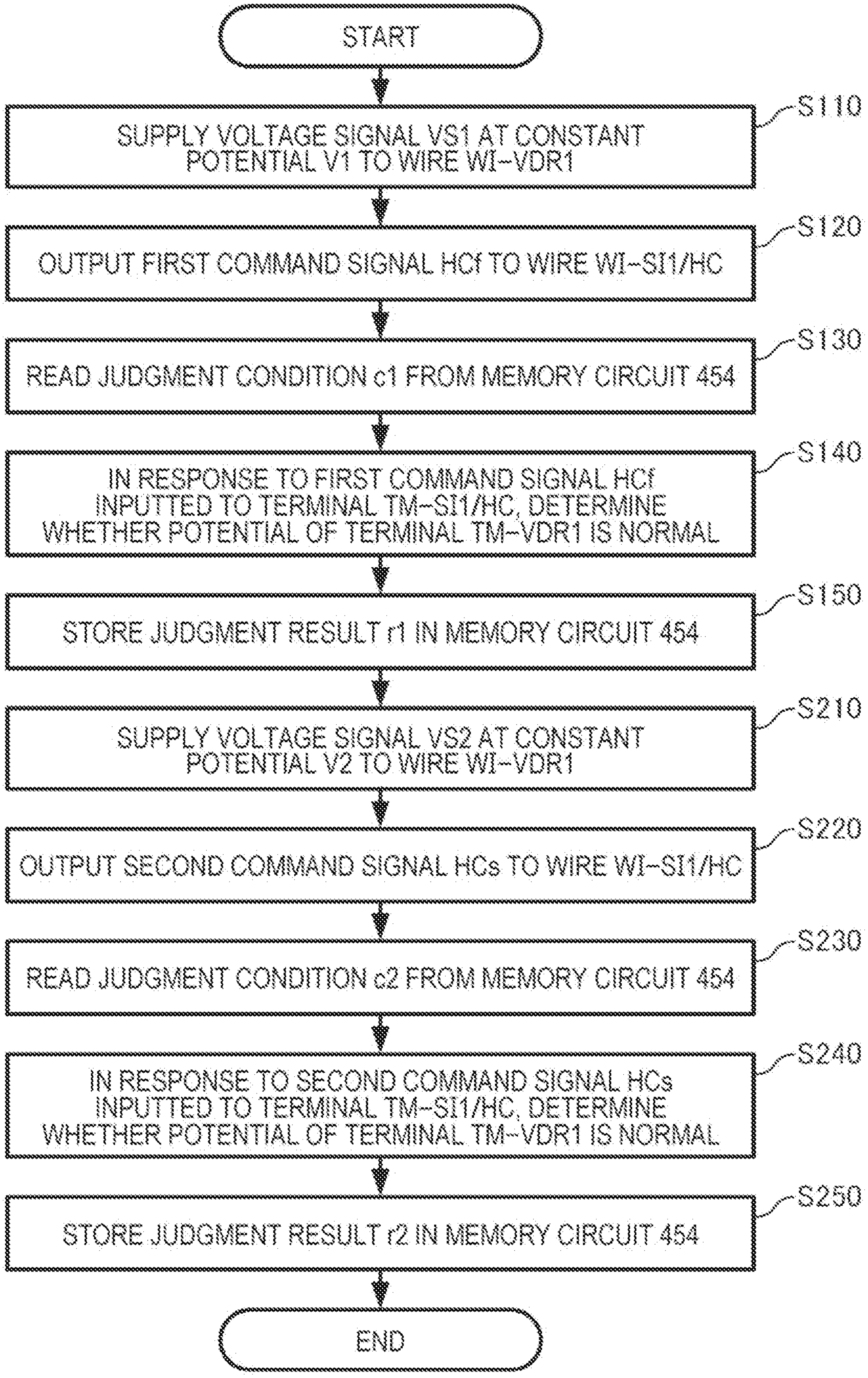
FIG. 25 is a diagram illustrating an example determination process.

FIG. 25 is a diagram illustrating an example of the determination process. As illustrated in FIG. 25, in the determination process (step S100), the ejection control unit 20 generates the voltage signal VS1 of a direct-current voltage at the constant potential V1 as the drive voltage signal VDR1. The ejection control unit 20 supplies the voltage signal VS1 at the constant potential V1 to the wire WI-VDR1 and terminal TM-VDR1 (step S110). The ejection control unit 20 generates the first command signal HCf as the diagnosis control signal HC. The ejection control unit 20 outputs the first command signal HCf to the wire WI-SI1/HC and terminal TM-SI1/HC (step S120).

The first command signal HCf outputted from the ejection control unit 20 is inputted to the judgment control circuit 451 included in the abnormality detection circuit 250 via the wire WI-SI1/HC and terminal TM-SI1/HC. The judgment control circuit 451 reads the judgment condition c1 stored in the memory circuit 454 based on the first command signal HCf. That is, the judgment control circuit 451 reads the judgment condition c1 from the memory circuit 454 (step S130). In step S130, when the first command signal HCf is not inputted to the judgment control circuit 451 within a predetermined time period, the judgment control circuit 451 determines that there is an abnormality in the first command signal HCf. The judgment control circuit 451 generates the judgment result signal ES indicating that there is an abnormality in the printhead 100 and outputs the generated judgment result signal ES to the ejection control unit 20. The judgment control circuit 451 may terminate the inspection of the printhead 100.

The judgment control circuit 451 performs control based on the first command signal HCf so that the voltage input switching circuit 251 generates the voltage detection signal DET depending on the potential held by the wire WI-VDR1 and terminal TM-VDR1 and performs control so that the voltage judgment circuit 452 determines based on the voltage detection signal DET and judgment condition c1 whether the potential of the voltage detection signal DET is normal. The judgment control circuit 451 thus determines whether the potential of the terminal TM-VDR1 is normal in response to the first command signal HCf inputted to the terminal TM-SI1/HC (step S140).

The judgment control circuit 451 then stores in the memory circuit 454, the judgment result r1 including the result of determination whether the potential of the terminal TM-VDR1 is normal, in response to the first command signal HCf inputted to the terminal TM-SI1/HC; that is, the judgment control circuit 451 stores the judgment result r1 in the memory circuit 454 (step S150).

The ejection control unit 20 then generates the voltage signal VS2 as a direct-current voltage at the constant potential V2, which is different from the potential V1, as the drive voltage signal VDR1. The ejection control unit 20 supplies the voltage signal VS2 at the constant potential V2 to the wire WI-VDR1 and terminal TM-VDR1 (step S210). The ejection control unit 20 generates the second command signal HCs as the diagnosis control signal HC. The ejection control unit 20 outputs the second command signal HCs to the wire WI-SI1/HC and terminal TM-SI1/HC (step S220).

The second command signal HCs outputted from the ejection control unit 20 is inputted to the judgment control circuit 451 included in the abnormality detection circuit 250 via the wire WI-SI1/HC and terminal TM-SI1/HC. The judgment control circuit 451 reads the judgment condition c2 stored in the memory circuit 454 based on the second command signal HCs; that is, the judgment control circuit 451 reads the judgment condition c2 from the memory circuit 454 (step S230). In step S230, when the second command signal HCs is not inputted to the judgment control circuit 451 within a predetermined time period, the judgment control circuit 451 determines that there is an abnormality in the second command signal HCs. The judgment control circuit 451 generates the judgment result signal ES indicating that there is an abnormality in the printhead 100 and outputs the generated judgment result signal ES to the ejection control unit 20. At this time, the judgment control circuit 451 may terminate the inspection of the printhead 100.

The judgment control circuit 451 performs control based on the second command signal HCs so that the voltage input switching circuit 251 generates the voltage detection signal DET depending on the potential held by the wire WI-VDR1 and terminal TM-VDR1 and performs control so that the voltage judgment circuit 452 determines based on the voltage detection signal DET and judgment condition c2 whether the potential of the voltage detection signal DET is normal. The judgment control circuit 451 thus determines whether the potential of the terminal TM-VDR1 is normal in response to the second command signal HCs inputted to the terminal TM-SI1/HC (step S240).

The judgment control circuit 451 then stores in the memory circuit 454, the judgment result r2 including the result of determination whether the potential of the terminal TM-VDR1 is normal in response to the second command signal HCs inputted to the terminal TM-SI1/HC; that is, the judgment control circuit 451 stores the judgment result r2 in the memory circuit 454 (step S250). The judgment control circuit 451 terminates the determination process (step S100).

As described above, in the determination process (step S100), the determination including step S140 of determining whether the potential of the terminal TM-VDR1 is normal in response to the first command signal HCf inputted to the terminal TM-SI1/HC and the determination including S240 of determining whether the potential of the terminal TM-VDR1 is normal in response to the second command signal HCs inputted to the terminal TM-SI1/HC are performed based on different criteria individually specified by the judgment conditions c1 and c2.

Figure 26:
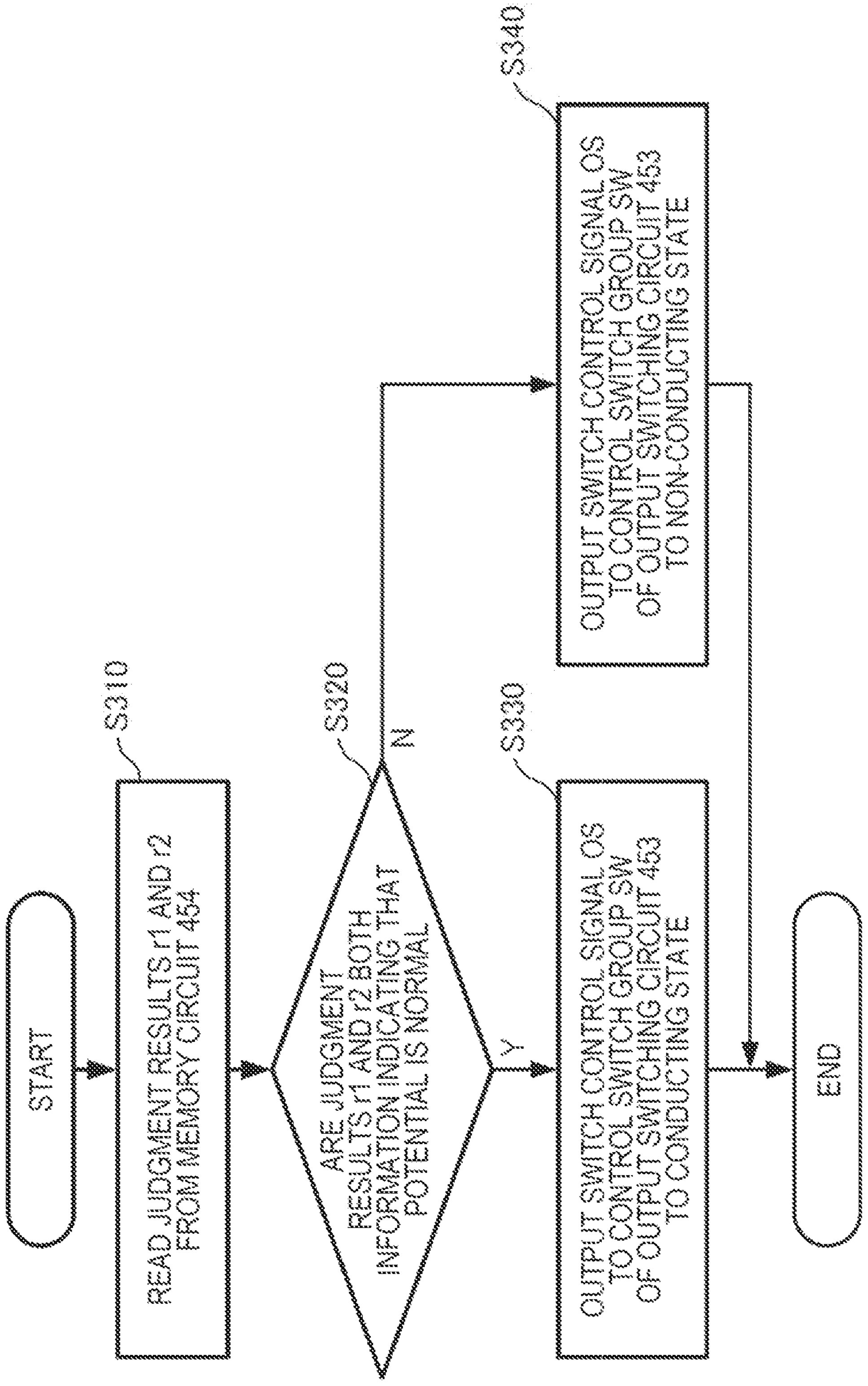
FIG. 26 is a diagram illustrating an example permission process.

Next, an example of the permission process (step S300) is described. FIG. 26 is a diagram illustrating an example of the permission process. As illustrated in FIG. 26, in the permission process (step S300), the judgment control circuit 451 reads the judgment result r1 and judgment result r2 from the memory circuit 454 (step S310). The judgment control circuit 451 determines whether both read judgment results r1 and r2 indicate that the potential of the terminal TM-VDR1 is normal (step S320).

When the judgment control circuit 451 determines that both read judgment results r1 and r2 indicate that the potential of the terminal TM-VDR1 is normal (Y in step S320), the judgment control circuit 451 outputs to the output switching circuit 453, the switch control signal OS controlling the switch group SW to the conducting state (step S330). The switches included in the switch group SW of the output switching circuit 453 are thereby controlled to the conducting state, so that the clock signal SCK, latch signal LAT, and change signal CH are inputted to the drive signal selection circuit 200. Upon receiving the clock signal SCK, latch signal LAT, and change signal CH, the drive signal selection circuit 200 supplies the drive signals VOUT to the piezo elements 60. This means that printing on the medium P is permitted.

On the other hand, when the judgment control circuit 451 determines that at least one of the read judgment results r1 and r2 indicates that the potential of the terminal TM-VDR1 is not normal (N in step S320), the judgment control circuit 451 outputs to the output switching circuit 453, the switch control signal OS controlling the switch group SW to the non-conducting state (step S340). The switches included in the switch group SW of the output switching circuit 453 are thereby controlled to the non-conducting state, so that the clock signal SCK, latch signal LAT, and change signal CH are not inputted to the drive signal selection circuit 200. The drive signal selection circuit 200 therefore does not supply any drive signals VOUT to the piezo elements 60. This means that printing on the medium P is not permitted.

As described above, in the permission process (step S300), printing is permitted when the potential of the terminal TM-VDR1 is determined to be normal at both the determination in step S140 and the determination in step S240, and printing is not permitted when the potential of the terminal TM-VDR1 is determined to be not normal at the determination in step S140 or the determination in step S240. Specifically, in the permission process (step S300), the switches included in the switch group SW in the output switching circuit 453 are controlled to control whether the clock signal SCK, latch signal LAT, and change signal CH are supplied to the drive signal selection circuit 200 and therefore control whether the drive signals VOUT based on the drive signals COMA and COMB are supplied to the piezo elements 60. In the permission process (step S300), thus, printing is switched between being permitted and being not permitted by switching whether or not to supply the drive signals VOUT based on the drive signals COMA and COMB to the piezo elements 60.

When the judgment control circuit 451 determines that the potential of the terminal TM-VDR1 is normal in response to the first command signal HCf inputted to the terminal TM-SI1/HC, the terminal TM-VDR1 is held at the potential V1. When the judgment control circuit 451 determines that the potential of the terminal TM-VDR1 is normal in response to the second command signal HCs inputted to the terminal TM-SI1/HC, the terminal TM-VDR1 is held at the potential V2. In this case, the potential V1 held by the terminal TM-VDR1 is a different potential from the potential V2 held by the terminal TM-VDR1.

For example, the potential V1 at the terminal TM-VDR1 when the judgment control circuit 451 determines that the potential of the terminal TM-VDR1 is normal in response to the first command signal HCf inputted to the terminal TM-SI1/HC may be higher than the potential V2 at the terminal TM-VDR1 when the judgment control circuit 451 determines that the potential of the terminal TM-VDR1 is normal in response to the second command signal HCs inputted to the terminal TM-SI1/HC. Alternatively, the potential V2 at the terminal TM-VDR1 when the judgment control circuit 451 determines that the potential of the terminal TM-VDR1 is normal in response to the second command signal HCs inputted to the terminal TM-SI1/HC may be higher than the potential V1 at the terminal TM-VDR1 when the judgment control circuit 451 determines that the potential of the terminal TM-VDR1 is normal in response to the first command signal HCf inputted to the terminal TM-SI1/HC.

Herein, in the example of the inspection method of the printhead 100 illustrated in FIGS. 24 to 26, the determination process (step S100) and the permission process (step S300) are executed by the abnormality detection circuit 250 included in the printhead 100. However, at least a part of the determination process (step S100) and permission process (step S300) may be executed by the printhead drive circuit 2. In other words, a part of the configuration of the abnormality detection circuit 250 may be provided for the printhead drive circuit 2. Such a configuration also provides the same operation effects.

Herein, the terminal TM-VDR1 is an example of a first terminal, the terminal TM-SI1/HC is an example of a second terminal. The wire WI-VDR1 included in the cable FC is an example of a first wire; the wire WI-SI1/HC is an example of a second wire; at least one of the wires WI-VHV and WI-VDD is an example of a third wire; the wire WI-SCK is an example of a fourth wire; and the wire WI-ES is an example of a fifth wire. The potential V1 is an example of a first potential; and the potential V2 is an example of a second potential. The voltage signal VS1 at the potential V1 is an example of a first voltage signal, and the voltage signal VS2 at the potential V2 is an example of a second voltage signal. The first command signal HCf is an example of a first signal; and the second command signal HCs is an example of a second signal. The print data signal SI1 is an example of print data, and the judgment result signal ES1 is an example of an abnormality judgment signal. The printhead drive circuit 2 is an example of a printhead control circuit; and the configuration including the main control unit 10 and ejection control unit 20 included in the printhead drive circuit 2 is an example of a signal circuit. The main control circuit 11 which is included in the main control unit 10 and receives the image data PD as an example of an image signal inputted from the external device 3 as an example of a host computer is an example of a reception circuit. The semiconductor device 450 including the voltage judgment circuit 452 constituting at least a part of the abnormality detection circuit is an example of a semiconductor integrated circuit.

1. 7 Operation Effect

The printhead 100 included in the liquid ejecting apparatus 1 configured as described above includes the voltage input switching circuit 251 and voltage judgment circuit 452, which determine whether the potential of the terminal TM-VDR1 is normal in response to the first command signal HCf inputted to the terminal TM-SI1/HC and the clock signal SCK inputted to the terminal TM-SCK and determine whether the potential of the terminal TM-VDR1 is normal in response to the second command signal HCs inputted to the terminal TM-SI1/HC and the clock signal SCK inputted to the terminal TM-SCK. When there is an abnormality in at least one of the low-voltage first command signal HCf and second command signal HCs inputted to the terminal TM-SI1/HC and the clock signal SCK inputted to the terminal TM-SCK, the printhead 100 fails to determine whether the signals inputted to the printhead 100 are normal. Based on this failure to execute the determination, the printhead 100 determines that there is an abnormality in the signals inputted to the printhead 100. Furthermore, the printhead 100 determines whether the potential of the terminal TM-VDR1 is normal in response to the first command signal HCf inputted to the terminal TM-SI1/HC and the clock signal SCK inputted to the terminal TM-SCK and then determines whether the potential of the terminal TM-VDR1 is normal in response to the second command signal HCs inputted to the terminal TM-SI1/HC and the clock signal SCK inputted to the terminal TM-SCK. The printhead 100 therefore determines whether high-voltage signals supplied to the terminal TM-VDR1 are normal.

Thus the printhead 100 of the first embodiment determines whether there is an abnormality both in the low-voltage diagnosis control signal HC including the first and second command signals HCf and HCs and the high-voltage drive voltage signal VDR1. The printhead 100 thereby determines whether the high- and low-voltage signals supplied to the printhead 100 are normal. This can reduce the likelihood of the printhead 100 malfunctioning.

Furthermore, whether the potential of the terminal TM-VDR1 is normal is determined in response to the first command signal HCf inputted to the terminal TM-SI1/HC and the clock signal inputted to the terminal TM-SCK and is then determined in response to the second command signal HCs inputted to the terminal TM-SI1/HC and the clock signal SCK inputted to the terminal TM-SCK. When the potential of the terminal TM-VDR1 is determined to be normal both in the determination whether the potential of the terminal TM-VDR1 is normal in response to the first command signal HCf and the determination whether the potential of the terminal TM-VDR1 is normal in response to the second command signal HCs, printing is permitted. This improves the accuracy of determining whether the high- and low-voltage signals supplied to the printhead 100 are normal and further reduces the likelihood of the printhead 100 malfunctioning.

In the liquid ejecting apparatus 1 of the first embodiment, the printhead drive circuit 2 causes the printhead 100 to execute printing, the printhead 100 processing the outputs from the voltage input switching circuit 251 and voltage judgment circuit 452, that are electrically coupled to the terminal TM-VDR1, in response to the first command signal HCf that is inputted to the terminal TM-SI1/HC while the potential of the terminal TM-VDR1 is the potential V1 and the clock signal SCK inputted to the terminal TM-SCK and processing the outputs from the voltage input switching circuit 251 and voltage judgment circuit 452 in response to the second command signal HCs that is inputted to the terminal TM-SI1/HC while the potential of the terminal TM-VDR1 is the potential V2 and the clock signal SCK inputted to the terminal TM-SCK. In the thus-configured printhead drive circuit 2, the ejection control unit 20 outputs the first command signal HCf to the wire WI-SI1/HC electrically coupled to the terminal TM-SI1/HC while the wire WI-VDR1 electrically coupled to the terminal TM-VDR1 is being supplied with the voltage signal VS1 at the potential V1 and outputs the second command signal HCs to the wire WI-SI1/HC after outputting the first command signal HCf while the wire WI-VDR1 is being supplied with the voltage signal VS2 at the potential V2 that is different from the potential V1. The printhead 100 thereby executes printing only when the potentials V1 and V2 are inputted to the terminal TM-VDR1 at predetermined timings in predetermined situations and the first and second command signals HCf and HCs are inputted to the terminal TM-SI1/HC at predetermined timings in predetermined situations and does not execute printing when the potential V1 or V2 is inputted to the terminal TM-VDR1 at a different timing or in a different situation, the first or second command signal HCf or HCs is inputted to the terminal TM-SI1/HC at a different timing or in a different situation, or the clock signal SCK is inputted to the terminal TM-SCK at a different timing or in a different situation.

In other words, the printhead drive circuit 2 outputs the first command signal HCf to the wire WI-SI1/HC electrically coupled to the terminal TM-SI1/HC while the wire WI-VDR1 electrically coupled to the terminal TM-VDR1 is being supplied with the voltage signal VS1 at the potential V1, outputs the clock signal SCK to the wire WI-SCK electrically coupled to the terminal TM-SCK, outputs the second command signal HCs to the wire WI-SI1/HC after outputting the first command signal HCf while the wire WI-VDR1 is being supplied with the voltage signal VS2 at the potential V2 that is different from the potential V1, and outputs the clock signal SCK to the wire WI-SCK electrically coupled to the terminal TM-SCK. The printhead drive circuit 2 thereby causes the printhead 100 to diagnose itself whether the received signals are normal. The printhead drive circuit 2 thus controls the printhead 100 based on whether the high- and low-voltage signals supplied to the printhead 100 are normal. This can reduce the likelihood of the printhead 100 malfunctioning.

In the liquid ejecting apparatus 1 of the first embodiment, the printhead 100 and printhead drive circuit 2 determine whether the signals inputted to the printhead 100 are normal, based on the two potentials V1 and V2 different from each other and the first and second command signals HCf and HCs corresponding to the potentials V1 and V2. This improves the accuracy of determining whether the high- and low-voltage signals supplied to the printhead 100 are normal and further reduces the likelihood of the printhead 100 malfunctioning.

1. 8 Modification

In the example illustrated in the aforementioned liquid ejecting apparatus 1 of the first embodiment, the diagnosis control signal HC is transmitted by the same wire WI-SI1/HC as the print data signal SI1 and is supplied to the same terminal TM-SI1/HC as the print data signal SI1. However, the diagnosis control signal HC and print data signal SI1 may be transmitted by different wires WI and may be supplied to different terminals TM.

In the example illustrated in the aforementioned liquid ejecting apparatus 1 of the first embodiment, the voltage signals VS1 and VS2 and the drive signal COMA are transmitted as the drive voltage signal VDR1 by the same wire WI-VDR1 and are supplied to the same terminal TM-VDR1. However, the voltage signals VS1 and VS2 and the drive signal COMA may be transmitted by different wires WI and may be supplied to different terminals TM.

In the example illustrated in the aforementioned liquid ejecting apparatus 1 of the first embodiment, the potential V1 of the voltage signal VS1 included in the drive voltage signal VDR1 is higher than the potential V2 of the voltage signal VS2. However, the potential V2 of the voltage signal VS2 included in the drive voltage signal VDR1 may be higher than the potential V1 of the voltage signal VS1.

The liquid ejecting apparatuses 1 of the modifications as described above also provide the aforementioned operation effects.

2. Second Embodiment

Next, a liquid ejecting apparatus 1 according to a second embodiment is described. For explanation of the liquid ejecting apparatus 1 of the second embodiment, the same configurations as those of the liquid ejecting apparatus 1 of the first embodiment are given the same reference characters, and the description thereof is simplified or omitted in some cases.

Figure 27:
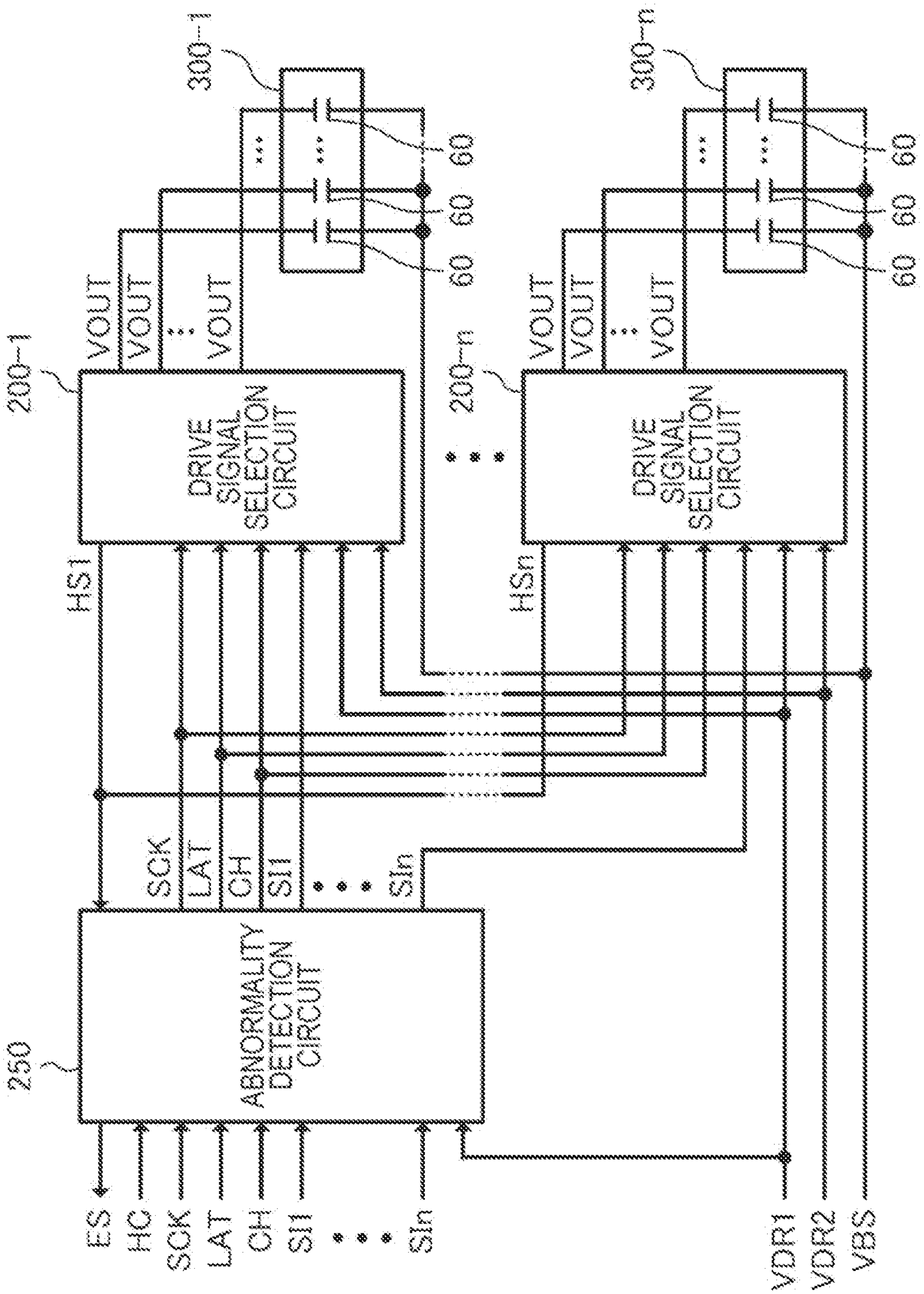
FIG. 27 is a diagram illustrating the functional configuration of a printhead of a second embodiment.

FIG. 27 is a diagram illustrating the functional configuration of a printhead 100 included in the liquid ejecting apparatus 1 of the second embodiment. As illustrated in FIG. 27, the printhead 100 of the second embodiment is different from that of the first embodiment in that the print data signals SI2 to SIn are inputted to the abnormality detection circuit 250 in addition to the print data signal SI1.

Specifically, the abnormality detection circuit 250 receives the diagnosis control signal HC, print data signal SI1 to SIn, clock signal SCK, latch signal LAT, change signal CH, and drive voltage signal VDR1.

The abnormality detection circuit 250 executes determination whether the signals transmitted to the printhead 100 are normal based on the diagnosis control signal HC and drive voltage signal VDR1 in a similar manner to the first embodiment. When determining that the signals transmitted to the printhead 100 are normal, the abnormality detection circuit 250 outputs the print data signals SI1 to SIn, clock signal SCK, latch signal LAT, and change signal CH to the drive signal selection circuits 200-1 to **200-*n***.

The thus-configured liquid ejecting apparatus 1 of the second embodiment also provides the same operation effects as the liquid ejecting apparatus 1 illustrated in the first embodiment.

In the liquid ejecting apparatus 1 of the second embodiment, the diagnosis control signal HC may be transmitted by the respective wires that transmit the print data signals SI1 to SIn. In this case, the diagnosis control signal HC may include, as the first command signal HCf, a first command signal HCf1 corresponding to the print data signal SI1, a first command signal HCfn corresponding to the print data signal SIn, and a first command signal HCfj (j is an integer from 1 to n) corresponding to the print data signal SIj. Similarly, the diagnosis control signal HC may include, as the second command signal HCs, a second command signal HCs1 corresponding to the print data signal SI1, a second command signal HCsn corresponding to the print data signal SIn, and a second command signal HCsj (j is an integer from 1 to n) corresponding to the print data signal SIj.

In the cable FC, the print data signal SI1 and the first and second command signals HCf1 and HCs1 included in the diagnosis control signal HC are transmitted by a same wire WI and a same terminal TM; the print data signal SIn and the first and second command signals HCfn and HCsn included in the diagnosis control signal HC1 are transmitted by a same wire WI and a same terminal TM; and the print data signal SIj and the first and second command signals HCfj and HCsj included in the diagnosis control signal HC1 are transmitted by a same wire WI and a same terminal TM.

When recognizing that all of the inputted first command signals HCf1 to HCfn are normal, the abnormality detection circuit 250 executes determination whether the potential of the wire WI-VDR1 and terminal TM-VDR1 supplied with the voltage signal VS1 at the potential V1 is normal, and when recognizing that all of the second command signals HCs1 to HCsn are normal, the abnormality detection circuit 250 executes determination whether the potential of the wire WI-VDR1 and terminal TM-VDR1 supplied with the voltage signal VS2 at the potential V2 is normal. The abnormality detection circuit 250 thus determines whether the potentials of the wires WI and terminals TM transmitting the respective print data signals SI2 to SIn are normal, in addition to the wire WI and terminal TM transmitting the print data signal SI1. This improves the accuracy of determining whether the high- and low-voltage signals supplied to the printhead 100 are normal and further reduces the likelihood of the printhead 100 malfunctioning.

3. Third Embodiment

Next, a liquid ejecting apparatus 1 according to a third embodiment is described. For explanation of the liquid ejecting apparatus 1 of the third embodiment, the same configurations as those of the liquid ejecting apparatuses 1 of the first and second embodiments are given the same reference characters, and the description thereof is simplified or omitted in some cases.

Figure 28:
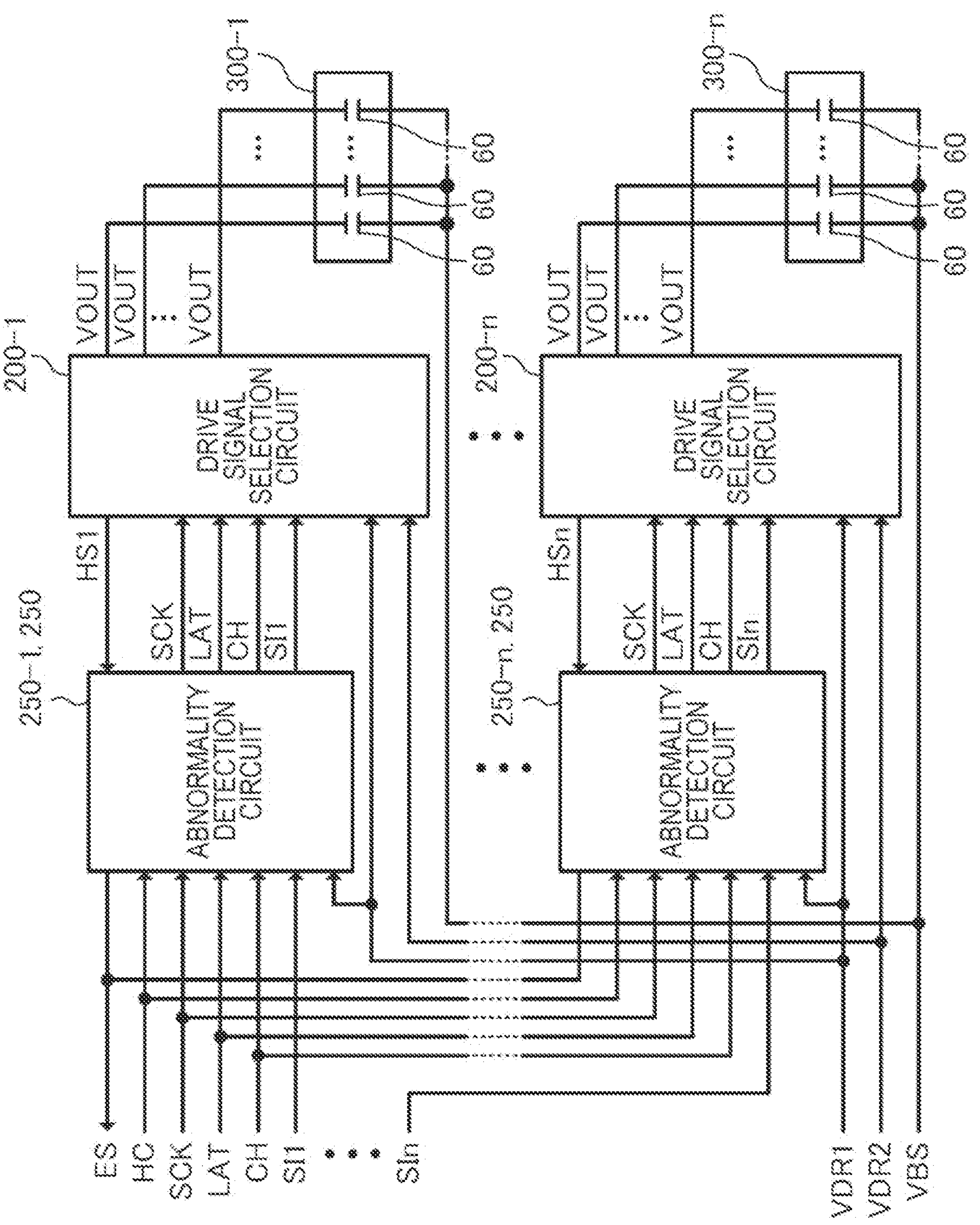
FIG. 28 is a diagram illustrating the functional configuration of a printhead of a third embodiment.

FIG. 28 is a diagram illustrating the functional configuration of the printhead 100 included in the liquid ejecting apparatus 1 of the third embodiment. As illustrated in FIG. 28, the printhead 100 of the third embodiment is different from those of the first and second embodiments in including the n abnormality detection circuits 250 corresponding to the drive signal selection circuits 200-1 to **200-*n*. Herein, the abnormality detection circuit 250 corresponding to the drive signal selection circuit 200-1 is referred to as an abnormality detection circuit 250-1; the abnormality detection circuit 250 corresponding to the drive signal selection circuit 200-*n* is referred to as an abnormality detection circuit 250-*n*; and the abnormality detection circuit 250 corresponding to the drive signal selection circuit 200-*j* (j is an integer from 1 to n) is referred to as an abnormality detection circuit 250-*j***.

Specifically, the abnormality detection circuit 250-1 receives the diagnosis control signal HC, print data signal SI1, clock signal SCK, latch signal LAT, change signal CH, and drive voltage signal VDR1. The abnormality detection circuit 250-1 determines, based on the diagnosis control signal HC and drive voltage signal VDR1, whether the signals transmitted to the printhead 100 are normal. When determining that the signals transmitted to the printhead 100 are normal, the abnormality detection circuit 250-1 outputs the print data signal SI1, clock signal SCK, latch signal LAT, and change signal CH to the drive signal selection circuit 200-1.

In a similar manner, the abnormality detection circuit **250-*n* receives the diagnosis control signal HC, print data signal SIn, clock signal SCK, latch signal LAT, change signal CH, and drive voltage signal VDR1. The abnormality detection circuit 250-*n* determines, based on the diagnosis control signal HC and drive voltage signal VDR1, whether the signals transmitted to the printhead 100 are normal. When determining that the signals transmitted to the printhead 100 are normal, the abnormality detection circuit 250-*n* outputs the print data signal SIn, clock signal SCK, latch signal LAT, and change signal CH to the drive signal selection circuit 200-*n***.

In a similar manner, the abnormality detection circuit **250-*j* receives the diagnosis control signal HC, print data signal SIj, clock signal SCK, latch signal LAT, change signal CH, and drive voltage signal VDR1. The abnormality detection circuit 250-*j* determines, based on the diagnosis control signal HC and drive voltage signal VDR1, whether the signals transmitted to the printhead 100 are normal. When determining that the signals transmitted to the printhead 100 are normal, the abnormality detection circuit 250-*j* outputs the print data signal SIj, clock signal SCK, latch signal LAT, and change signal CH to the drive signal selection circuit 200-*j***.

The thus-configured liquid ejecting apparatus 1 of the third embodiment provides the same operation effects as those of the liquid ejecting apparatus 1 of the first embodiment.

In the liquid ejecting apparatus 1 of the third embodiment, furthermore, the diagnosis control signal HC may be branched in the ejection control unit 20 into multiple diagnosis control signals HC so that one of the multiple diagnosis control signals HC is transmitted by the same wire WI and terminal TM as the print data signal SI1, another diagnosis control signal HC is transmitted by the same wire WI and terminal TM as the print data signal SIn, and still another diagnosis control signal HC is transmitted by the same wire WI and terminal TM as the print data signal SIj. The abnormality detection circuits 250-1 to **250-*n* therefore individually determine whether the potentials of the wires WI and terminals TM transmitting the print data signals SI2 to SIn are normal in addition to the wire WI and terminal TM transmitting the print data signal SI1. This improves the accuracy of determining whether the high- and low-voltage signals supplied to the printhead 100 are normal and further reduces the likelihood of the printhead 100** malfunctioning.

Furthermore, the semiconductor device 450 included in one of the abnormality detection circuits 250-1 to **250-*n* and the semiconductor device 201 including one of the drive signal selection circuits 200-1 to 200-*n* corresponding thereto may be configured as a same integrated circuit. This enables miniaturization of the printhead 100**.

The embodiments and modifications are described hereinabove. The present disclosure is not limited to these embodiments and modifications and can be implemented in various modes without departing from the spirit thereof. For example, the aforementioned embodiments can be properly combined.

The present disclosure includes the substantially same configurations (for example, configurations of the same functions, methods, and results or configurations of the same purposes and effects) as the configurations described in the embodiments. The present disclosure includes configurations that are obtained by replacing some unessential portions in the configurations described in the embodiments. The present disclosure includes configurations that can provide the same operation effects as those of the configurations described in the embodiments and configurations that can achieve the same objectives. The present disclosure includes configurations obtained by adding known techniques to the configurations described in the embodiments.

The aforementioned embodiments lead to the followings.

An aspect according to a printhead control circuit is a printhead control circuit causing a printhead to execute printing, the printhead performing abnormality detection in response to a first signal inputted to a second terminal in a state in which a potential of a first terminal is a first potential and a second signal inputted to the second terminal in a state in which the potential of the first terminal is a second potential, the printhead control circuit including: a signal circuit configured to output the first and second signals; a first wire electrically coupled to the first terminal; and a second wire electrically coupled to the second terminal, in which at least one of the first and second potentials is higher than potentials of the first and second signals, and the signal circuit outputs the first signal to the second wire in a state in which the first wire is being supplied with a first voltage signal at the first potential and outputs the second signal to the second wire after outputting the first signal in a state in which the first wire is being supplied with a second voltage signal at the second potential, which is different from the first potential, to cause the printhead to execute the abnormality detection in response to the first signal, the second signal, the first voltage signal, and the second voltage signal.

According to the above printhead control circuit, the signal circuit outputs the first signal to the second wire electrically coupled to the second terminal in a state in which the first wire electrically coupled to the first terminal is being supplied with the first voltage signal at the first potential and outputs the second signal to the second wire after outputting the first signal in a state in which the first wire is being supplied with the second voltage signal at the second potential that is different from the first potential. The printhead control circuit thereby causes the printhead, which is configured to perform the abnormality detection, to perform the abnormality detection in response to the first signal inputted to the second terminal in a state in which the potential of the first terminal is the first potential and the second signal inputted to the second terminal in a state in which the potential of the first terminal is the second potential. The printhead thereby performs the abnormality detection in response to the first signal inputted to the second terminal in a state in which the potential of the first terminal is the first potential and the second signal inputted to the second terminal in a state in which the potential of the first terminal is the second potential.

Specifically, the printhead control circuit controls the printhead so that the printhead determines in response to the first signal inputted to the second terminal, whether the signal at the first potential inputted to the first terminal is normal and determines in response to the second signal inputted to the second terminal, whether the signal at the second potential inputted to the first terminal is normal. The printhead control circuit thereby causes the printhead to determine whether the high-voltage signals supplied to the printhead are normal.

Furthermore, the printhead determines whether the high-potential signals are normal in response to the low-potential first and second signals. In this light, the printhead performs the determination whether the high-potential signals are normal when the first and second signals inputted to the printhead are normal. The printhead does not perform the determination whether the high-potential signals are normal when the first and second signals inputted to the printhead are not normal. Thus, the printhead control circuit also causes the printhead to determine whether the low-voltage signals are normal depending on whether the printhead performs the determination whether the high-potential signals are normal.

According to the above printhead control circuit, the printhead detects whether both the high-voltage signal at at least one of the first and second potentials and the low-voltage signals including the first and second signals are normal. This reduces the likelihood of the printhead malfunctioning.

In the aspect according to the above printhead control circuit, the printhead may include a drive element, and the first wire may transmit a drive signal to be supplied to the drive element.

According to the above printhead control circuit, the first wire serves as a wire transmitting the drive signal to be supplied to the drive element and a wire transmitting the first and second voltage signals. This reduces the number of wires coupled to the printhead.

In the aspect according to the above printhead control circuit, the first potential may be higher than five times the potential of the high level of the first signal.

According to the above printhead control circuit, the first potential of the first voltage signal is set higher than five times the potential of the high level of the first signal. The first signal therefore less affects the first voltage signal at the first potential even when the first signal is superposed on the first voltage signal. This improves the accuracy of detecting whether both the high- and low-voltage signals supplied to the printhead are normal.

In the aspect according to the above printhead control circuit, the second potential may be lower than five times the potential of the high level of the second signal.

According to the above printhead control circuit, the first voltage signal at the first potential and the second voltage signal at the second potential are set to different voltage values based on a same threshold, and the potential difference between the first and second potentials is large. This improves the accuracy of detecting the first and second potentials in the printhead and improves the accuracy of detecting whether both the high- and low-voltage signals supplied to the printhead are normal.

In the aspect according to the above printhead control circuit, the second potential may be higher than five times the potential of the high level of the second signal.

According to the above printhead control circuit, the second potential of the second voltage signal is set higher than five times the potential of the high level of the second signal. The second signal therefore less affects the second voltage signal at the second potential even when the second signal is superposed on the second voltage signal. This improves the accuracy of detecting whether both the high- and low-voltage signals supplied to the printhead are normal.

In the aspect according to the above printhead control circuit, the first potential may be lower than five times the potential of the high level of the first signal.

According to the above printhead control circuit, the first voltage signal at the first potential and the second voltage signal at the second potential are set to different voltage values based on a same threshold, and the potential difference between the first and second potentials is large. This improves the accuracy of detecting the first and second potentials in the printhead and improves the accuracy of detecting whether both the high- and low-voltage signals supplied to the printhead are normal.

In the aspect according to the above printhead control circuit, the signal circuit may include a reception circuit receiving an image signal supplied from a host computer, and at least one of the first and second potentials may be higher than the potential of the image signal.

In the aspect according to the above printhead control circuit, after transmitting the second signal, the second wire may transmit print data for causing the printhead to execute printing.

According to the above printhead control circuit, the second wire serves as a wire transmitting the print data for causing the printhead to execute a printing operation and a wire transmitting the first and second signals. This reduces the number of wires coupled to the printhead.

In the aspect according to the above printhead control circuit, the first signal may include a first command and a second command subsequent to the first command.

In the aspect according to the above printhead control circuit, the second signal may include a third command and a fourth command subsequent to the third command.

In the aspect according to the above printhead control circuit, the first and third commands may include different pieces of information.

According to the above printhead control circuit, the process configured to be executed by the printhead based on the first signal and the process configured to be executed by the printhead based on the second signal are executed based on different criteria, including a criterion specified by the first command and a criterion specified by the third command. This improves the accuracy of detecting whether both the high- and low-voltage signals supplied to the printhead are normal and enhance the versatility of the detection.

In the aspect according to the above printhead control circuit, the second and fourth commands may include same information.

According to the above printhead control circuit, at least some commands included in the first and second signals are of the same. This reduces command information to be managed by the printhead control circuit.

In the aspect according to the above printhead control circuit, the first and second wires may be included in a same cable.

According to the above printhead control circuit, the first and second wires are less likely to differ from each other in length and in time taken to transmit signals.

In the aspect according to the above printhead control circuit, the cable may be a flexible flat cable.

In the aspect according to the above printhead control circuit, the cable may include a third wire transmitting a power supply voltage.

In the aspect according to the above printhead control circuit, the cable may include a fourth wire transmitting a clock signal.

In the aspect according to the above printhead control circuit, the cable may include a fifth wire transmitting an abnormality judgment signal indicating the presence or absence of an abnormality in the printhead.

In the aspect according to the above printhead control circuit, the first or second potential may be the second highest among signals transmitted by the cable.

In the aspect according to the above printhead control circuit, at least one of the first and second potentials may be higher than 10% of the effective value of a commercial alternating-current voltage externally supplied.

Another aspect according to a liquid ejecting apparatus is a liquid ejecting apparatus including: a printhead configured to perform printing; and a printhead control circuit configured to cause the printhead to execute printing, in which the printhead performs abnormality detection in response to a first signal inputted to a second terminal in a state in which a potential of a first terminal is a first potential and a second signal inputted to the second terminal in a state in which the potential of the first terminal is a second potential, the printhead control circuit includes a signal circuit outputting the first and second signals, a first wire electrically coupled to the first terminal, and a second wire electrically coupled to the second terminal, at least one of the first and second potentials is higher than potentials of the first and second signals, and the signal circuit outputs the first signal to the second wire in a state in which the first wire is being supplied with a first voltage signal at the first potential and outputs the second signal to the second wire after outputting the first signal in a state in which the first wire is being supplied with a second voltage signal at the second potential, which is different from the first potential, to cause the printhead to execute the abnormality detection in response to the first signal, the second signal, the first voltage signal, and the second voltage signal.

According to the above liquid ejecting apparatus, the signal circuit included in the printhead control circuit outputs the first signal to the second wire electrically coupled to the second terminal in a state in which the first wire electrically coupled to the first terminal is being supplied with the first voltage signal at the first potential and outputs the second signal to the second wire after outputting the first signal in a state in which the first wire is being supplied with the second voltage signal at the second potential that is different from the first potential. The printhead control circuit thereby causes the printhead to perform the abnormality detection in response to the first signal inputted to the second terminal in a state in which the potential of the first terminal is the first potential and the second signal inputted to the second terminal in a state in which the potential of the first terminal is the second potential. The printhead thereby performs the abnormality detection in response to the first signal inputted to the second terminal in a state in which the potential of the first terminal is the first potential and the second signal inputted to the second terminal in a state in which the potential of the first terminal is the second potential.

In other words, according to the liquid ejecting apparatus, the printhead control circuit controls the printhead so that the printhead determines in response to the first signal inputted to the second terminal, whether the signal at the first potential inputted to the first terminal is normal and determines in response to the second signal inputted to the second terminal, whether the signal at the second potential inputted to the first terminal is normal. The printhead thereby determines whether the supplied high-voltage signals are normal.

Furthermore, the printhead determines whether the high-potential signals are normal in response to the low-potential first and second signals. In this light, the printhead performs the determination whether the high-potential signals are normal when the first and second signals inputted to the printhead are normal. The printhead does not perform the determination whether the high-potential signals are normal when the first and second signals inputted to the printhead are not normal. Thus, the printhead control circuit also causes the printhead to determine whether the low-voltage signals are normal depending on whether the printhead performs the determination whether the high-potential signals are normal.

According to the above liquid ejecting apparatus, the printhead detects whether both the high-voltage signal at at least one of the first and second potentials and the low-voltage signals including the first and second signals are normal. This reduces the likelihood of the printhead malfunctioning.

In the aspect according to the above liquid ejecting apparatus, the printhead may include a drive element, and the first wire may transmit a drive signal to be supplied to the drive element.

According to the above liquid ejecting apparatus, the first wire serves as a wire transmitting the drive signal to be supplied to the drive element and a wire transmitting the first and second voltage signals. This reduces the number of wires coupling the printhead control circuit to the printhead.

In the aspect according to the above liquid ejecting apparatus, the first potential may be higher than five times the potential of the high level of the first signal.

According to the above liquid ejecting apparatus, the first potential of the first voltage signal is set higher than five times the potential of the high level of the first signal. The first signal therefore less affects the first voltage signal at the first potential even when the first signal is superposed on the first voltage signal. This improves the accuracy of detecting whether both the high- and low-voltage signals supplied to the printhead are normal.

In the aspect according to the above liquid ejecting apparatus, the second potential may be lower than five times the potential of the high level of the second signal.

According to the above liquid ejecting apparatus, the first voltage signal at the first potential and the second voltage signal at the second potential are set to different voltage values based on a same threshold, and the potential difference between the first and second potentials is large. This improves the accuracy of detecting the first and second potentials in the printhead and improves the accuracy of detecting whether both the high- and low-voltage signals supplied to the printhead are normal.

In the aspect according to the above liquid ejecting apparatus, the second potential may be higher than five times the potential of the high level of the second signal.

According to the above liquid ejecting apparatus, the second potential of the second voltage signal is set higher than five times the potential of the high level of the second signal. The second signal therefore less affects the second voltage signal at the second potential even when the second signal is superposed on the second voltage signal. This improves the accuracy of detecting whether both the high- and low-voltage signals supplied to the printhead are normal.

In the aspect according to the above liquid ejecting apparatus, the first potential may be lower than five times the potential of the high level of the first signal.

According to the above liquid ejecting apparatus, the first voltage signal at the first potential and the second voltage signal at the second potential are set to different voltage values based on a same threshold, and the potential difference between the first and second potentials is large. This improves the accuracy of detecting the first and second potentials in the printhead and improves the accuracy of detecting whether both the high- and low-voltage signals supplied to the printhead are normal.

In the aspect according to the above liquid ejecting apparatus, the signal circuit may include a reception circuit receiving an image signal supplied from a host computer, and at least one of the first and second potentials may be higher than the potential of the image signal.

In the aspect according to the above liquid ejecting apparatus, after transmitting the second signal, the second wire may transmit print data for causing the printhead to execute printing.

According to the above liquid ejecting apparatus, the second wire serves as a wire transmitting the print data for causing the printhead to execute a printing operation and a wire transmitting the first and second signals. This reduces the number of wires coupled to the printhead.

In the aspect according to the above liquid ejecting apparatus, the first signal may include a first command and a second command subsequent to the first command.

In the aspect according to the above liquid ejecting apparatus, the second signal may include a third command and a fourth command subsequent to the third command.

In the aspect according to the above liquid ejecting apparatus, the first and third commands may include different pieces of information.

According to the above liquid ejecting apparatus, the process configured to be executed by the printhead based on the first signal and the process configured to be executed by the printhead based on the second signal are executed based on different criteria, including a criterion specified by the first command and a criterion specified by the third command. This improves the accuracy of detecting whether both the high- and low-voltage signals supplied to the printhead are normal and enhance the versatility of the detection.

In the aspect according to the above liquid ejecting apparatus, the second and fourth commands may include same information.

According to the above liquid ejecting apparatus, at least some commands included in the first and second signals are of the same. This reduces command information to be managed by the printhead control circuit.

In the aspect according to the above liquid ejecting apparatus, the first and second wires may be included in a same cable.

According to the above liquid ejecting apparatus, the first and second wires are less likely to differ from each other in length and in time taken to transmit signals.

In the aspect according to the above liquid ejecting apparatus, the cable may be a flexible flat cable.

In the aspect according to the above liquid ejecting apparatus, the cable may include a third wire transmitting a power supply voltage.

In the aspect according to the above liquid ejecting apparatus, the cable may include a fourth wire transmitting a clock signal.

In the aspect according to the above liquid ejecting apparatus, the cable may include a fifth wire transmitting an abnormality judgment signal indicating the presence or absence of an abnormality in the printhead.

In the aspect according to the above liquid ejecting apparatus, the first or second potential may be the second highest among signals transmitted by the cable.

In the aspect according to the above liquid ejecting apparatus, at least one of the first and second potentials may be higher than 10% of the effective value of a commercial alternating-current voltage externally supplied.

In the aspect according to the above liquid ejecting apparatus, the printhead may include an abnormality detection circuit performing the abnormality detection, and at least a part of the abnormality detection circuit may be included in a semiconductor integrated circuit.

What is claimed is:

1. A printhead control circuit causing a printhead to execute printing, the printhead performing abnormality detection in response to a first signal inputted to a second terminal in a state in which a potential of a first terminal is a first potential and a second signal inputted to the second terminal in a state in which the potential of the first terminal is a second potential, the printhead control circuit comprising:

a signal circuit configured to output the first and second signals;

a first wire electrically coupled to the first terminal; and a second wire electrically coupled to the second terminal, wherein at least one of the first and second potentials is higher than potentials of the first and second signals, and the signal circuit outputs the first signal to the second wire in a state in which the first wire is being supplied with a first voltage signal at the first potential and outputs the second signal to the second wire after outputting the first signal in a state in which the first wire is being supplied with a second voltage signal at the second potential, which is different from the first potential, to cause the printhead to execute the abnormality detection in response to the first signal, the second signal, the first voltage signal, and the second voltage signal.

2. The printhead control circuit according to claim 1, wherein the printhead includes a drive element, and the first wire transmits a drive signal to be supplied to the drive element.

3. The printhead control circuit according to claim 1, wherein the first potential is higher than five times the potential of a high level of the first signal.

4. The printhead control circuit according to claim 3, wherein the second potential is lower than five times the potential of a high level of the second signal.

5. The printhead control circuit according to claim 1, wherein the second potential is higher than five times the potential of a high level of the second signal.

6. The printhead control circuit according to claim 5, wherein the first potential is lower than five times the potential of a high level of the first signal.

7. The printhead control circuit according to claim 1, wherein the signal circuit includes a reception circuit receiving an image signal supplied from a host computer, and at least one of the first and second potentials is higher than a potential of the image signal.

8. The printhead control circuit according to claim 1, wherein after transmitting the second signal, the second wire transmits print data for causing the printhead to execute printing.

9. The printhead control circuit according to claim 1, wherein the first signal includes a first command and a second command subsequent to the first command.

10. The printhead control circuit according to claim 9, wherein the second signal includes a third command and a fourth command subsequent to the third command.

11. The printhead control circuit according to claim 10, wherein the first and third commands include different pieces of information.

12. The printhead control circuit according to claim 10, wherein the second and fourth commands include same information.

13. The printhead control circuit according to claim 1, wherein the first and second wires are included in a same cable.

14. The printhead control circuit according to claim 13, wherein the cable is a flexible flat cable.

15. The printhead control circuit according to claim 13, wherein the cable includes a third wire transmitting a power supply voltage.

16. The printhead control circuit according to claim 13, wherein the cable includes a fourth wire transmitting a clock signal.

17. The printhead control circuit according to claim 13, wherein the cable includes a fifth wire transmitting an abnormality judgment signal indicating a presence or absence of an abnormality in the printhead.

18. The printhead control circuit according to claim 13, wherein the first or second potential is a second highest among signals transmitted by the cable.

19. The printhead control circuit according to claim 1, wherein at least one of the first and second potentials is higher than 10% of an effective value of a commercial alternating-current voltage externally supplied.

20. A liquid ejecting apparatus, comprising:

a printhead configured to perform printing; and a printhead control circuit configured to cause the printhead to execute printing, wherein the printhead performs abnormality detection in response to a first signal inputted to a second terminal in a state in which a potential of a first terminal is a first potential and a second signal inputted to the second terminal in a state in which the potential of the first terminal is a second potential, the printhead control circuit includes a signal circuit outputting the first and second signals, a first wire electrically coupled to the first terminal, and a second wire electrically coupled to the second terminal, at least one of the first and second potentials is higher than potentials of the first and second signals, and the signal circuit outputs the first signal to the second wire in a state in which the first wire is being supplied with a first voltage signal at the first potential and outputs the second signal to the second wire after outputting the first signal in a state in which the first wire is being supplied with a second voltage signal at the second potential, which is different from the first potential, to cause the printhead to execute the abnormality detection in response to the first signal, the second signal, the first voltage signal, and the second voltage signal.

* * * * *